(12) United States Patent
Yan et al.

(10) Patent No.: US 12,028,842 B2
(45) Date of Patent: Jul. 2, 2024

(54) DATA TRANSMISSION METHOD AND COMMUNICATIONS APPARATUS

(71) Applicant: Huawei Technologies Co., Ltd., Shenzhen (CN)

(72) Inventors: Min Yan, Shenzhen (CN); Yong Wang, Chengdu (CN); Xianfu Lei, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 486 days.

(21) Appl. No.: 17/313,762

(22) Filed: May 6, 2021

(65) Prior Publication Data

US 2021/0258960 A1    Aug. 19, 2021

Related U.S. Application Data

(63) Continuation of application No. PCT/CN2019/113587, filed on Oct. 28, 2019.

(30) Foreign Application Priority Data

Nov. 6, 2018  (CN) .......................... 201811315446.8

(51) Int. Cl.
*H04W 72/0453*    (2023.01)
*H04L 5/00*    (2006.01)
(Continued)

(52) U.S. Cl.
CPC ......... *H04W 72/0453* (2013.01); *H04L 5/003* (2013.01); *H04W 72/0446* (2013.01); *H04W 80/02* (2013.01)

(58) Field of Classification Search
CPC ......... H04W 72/0453; H04W 72/0446; H04W 80/02; H04W 72/23; H04W 72/53;
(Continued)

(56) References Cited

U.S. PATENT DOCUMENTS

2015/0223247 A1\*  8/2015  Yang .................... H04W 48/00
                                                                   370/329
2016/0366688 A1   12/2016  Chen et al.
(Continued)

FOREIGN PATENT DOCUMENTS

CN        107027145 A      8/2017
CN        107736072 A      2/2018
(Continued)

OTHER PUBLICATIONS

Rohde & Schwarz, "802.11ad-WLAN at 60Ghz A Technology Introduction", 2017, 29 pages. (Year: 2017).\*
(Continued)

*Primary Examiner* — Quoc Thai N Vu
(74) *Attorney, Agent, or Firm* — Leydig, Voit & Mayer, Ltd.

(57) ABSTRACT

This application provides a data transmission method and a communications apparatus. The method includes: generating, by an access point, a physical protocol data unit PPDU, where a data part of the PPDU is carried on at least one resource unit RU; sending, by the access point, the PPDU to at least one station by using a channel bandwidth, where the channel bandwidth includes M basic bandwidths, the basic bandwidth is 2.16 GHz, M is an integer greater than or equal to 1, and the M basic bandwidths are divided into the at least one RU; and parsing, by the station, the data part that is of the PPDU and that is carried on the at least one RU. In embodiments of this application, it can implement an OFDMA technology in a high-frequency scenario, and improve channel utilization and transmission efficiency.

38 Claims, 33 Drawing Sheets

(51) Int. Cl.
*H04W 72/0446* (2023.01)
*H04W 80/02* (2009.01)

(58) Field of Classification Search
CPC ...... H04W 84/12; H04L 5/003; H04L 5/0042; H04L 5/0044; H04L 5/001; H04L 25/0204; H03M 13/6527
See application file for complete search history.

(56) References Cited

U.S. PATENT DOCUMENTS

| | | |
|---|---|---|
| 2017/0230218 A1 | 8/2017 | Park et al. |
| 2018/0255537 A1* | 9/2018 | Park ........................ H04L 5/001 |

FOREIGN PATENT DOCUMENTS

| | | |
|---|---|---|
| CN | 107820683 A | 3/2018 |
| CN | 107947850 A | 4/2018 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11-2016, IEEE Computer Society, total 3534 pages (Dec. 2016).

* cited by examiner

| L-STF | L-CEF | L-Header | RL-Header | FG60-Header-A | FG60-Header-B | FG60-STF | FG60-CEF | FG60-data 1 | FG60-TRN 1 |
|---|---|---|---|---|---|---|---|---|---|
| | | | | | | FG60-STF | FG60-CEF | FG60-data 2 | FG60-TRN 2 |
| | | | | | | FG60-STF | FG60-CEF | FG60-data 3 | FG60-TRN 3 |
| | | | | | | FG60-STF | FG60-CEF | FG60-data 4 | FG60-TRN 4 |

FIG. 17

DATA TRANSMISSION METHOD AND COMMUNICATIONS APPARATUS

CROSS-REFERENCE TO RELATED APPLICATIONS

This application is a continuation of International Application No. PCT/CN2019/113587, filed on Oct. 28, 2019, which claims priority to Chinese Patent Application No. 201811315446.8, filed on Nov. 6, 2018. The disclosures of the aforementioned applications are hereby incorporated by reference in their entireties.

TECHNICAL FIELD

Embodiments of this application relate to the communications field, and in particular, to a data transmission method and a communications apparatus.

BACKGROUND

The institute of electrical and electronics engineers (IEEE) 802.11 is one of mainstream wireless access standards and has been widely used in commercial applications in the past 10 years.

With better integration of internet technologies and mobile communications technologies, various mobile internet services represented by multimedia are flooded in daily life, and people have increasingly higher requirements on communication. Therefore, fast and accurate information transmission is indispensable. To provide a better wireless communications service, for example, a high-rate and large-capacity service such as ultra-high definition video transmission, a large quantity of frequency band resources are required. Therefore, bandwidth becomes a relatively scarce resource in a wireless communications system.

Therefore, in the wireless access standard, how to efficiently use a frequency band resource becomes a problem that needs to be urgently resolved in wireless mobile communication.

SUMMARY

This application provides a data transmission method and a communications apparatus, to efficiently use a frequency band resource and improve transmission efficiency.

According to a first aspect, a data transmission method is provided, and is applied to a 60 gigahertz (GHz) communications system. The method includes the following steps.

An access point generates a physical protocol data unit (phy protocol data unit, PPDU), where a data part of the PPDU is carried on at least one resource unit (RU).

The access point sends the PPDU to at least one station through a channel, where a bandwidth of the channel includes M basic bandwidths, the basic bandwidth is 2.16 GHz, M is an integer greater than or equal to 1, and the M basic bandwidths are divided into the at least one RU.

According to a second aspect, a data transmission method is provided, and is applied to a 60 GHz communications system. The method includes:

A station receives a physical protocol data unit PPDU through a channel, where a data part of the PPDU is carried on at least one RU, a bandwidth of the channel includes M basic bandwidths, the basic bandwidth is 2.16 GHz, M is an integer greater than or equal to 1, and the M basic bandwidths are divided into the at least one RU.

The station parses the data part that is of the PPDU and that is carried on the at least one RU.

In this embodiment of this application, the bandwidth of the channel is divided into one or more RUs, so that different RUs can be allocated to different stations, different frequency resources are allocated to the different stations at a same moment, and a plurality of stations efficiently access the channel, to implement an OFDMA technology in a high-frequency scenario, and improve channel utilization and transmission efficiency.

It should be understood that in this embodiment of this application, one RU may correspond to one station. To be specific, one RU may be allocated to one station for use. Optionally, one station may be allocated to a plurality of inconsecutive RUs. This embodiment of this application is not limited thereto. Optionally, different RUs may be allocated to different stations, so that an access point AP sends data to a plurality of stations in parallel on different RUs, thereby improving transmission efficiency.

It should be understood that in this embodiment of this application, if one RU is allocated to the station, it indicates that the station may receive, on a resource of the RU, data or information sent by the access point to the station, or it indicates that the access point may send data to the station on the RU.

With reference to the first aspect or the second aspect, in an implementation, one basic bandwidth includes four subcarrier unit sets in ascending order of frequencies. Each subcarrier unit set includes 84 subcarriers, each subcarrier unit set includes 80 data subcarriers and four pilot subcarriers, and any two adjacent pilot subcarriers in the four pilot subcarriers are spaced by 20 data subcarriers from each other. Alternatively, each subcarrier unit set includes 80 subcarriers, each subcarrier unit set includes 76 data subcarriers and four pilot subcarriers, and any two adjacent pilot subcarriers in the four pilot subcarriers are spaced by 19 data subcarriers from each other.

In this embodiment of this application, the subcarrier unit set is set to the 84 subcarriers, so that complexity of a resource unit indication can be reduced, information scheduling and a signaling indication are simplified, and spectrum utilization is relatively high.

In this embodiment of this application, the subcarrier unit set is set to the 80 subcarriers, to help design an STF/CEF sequence with a low peak to average power ratio (PAPR).

With reference to the first aspect or the second aspect, in an implementation, the at least one RU includes M−1 center RUs, and each center RU is not an RU located at either end of the at least one RU.

Optionally, in an embodiment, the at least one RU includes the M−1 center RUs, and each center RU is not the RU located at the two ends of the at least one RU. It should be understood that in this embodiment of this application, M may be equal to 1 or may be greater than 1. When M is equal to 1, the at least one RU includes zero center RUs. In other words, the at least one RU does not include a center RU. When M is greater than 1, the at least one RU includes the M−1 center RUs. Each center RU is not an RU located at either end of the at least one RU.

Specifically, when the bandwidth of the channel includes one basic bandwidth, the at least one RU may be one RU or a plurality of RUs. When the bandwidth of the channel includes M (M is greater than 1) basic bandwidths, the at least one RU may include at least a plurality of RUs. The plurality of RUs further include the M−1 center RUs.

In an example, if the basic bandwidth is 2.16 GHz, the bandwidth of the channel may be 2.16 GHz, 4.32 GHz, 6.48 GHz, 8.64 GHz, or the like.

Optionally, in an embodiment, one basic bandwidth includes four subcarrier unit sets in ascending order of frequencies. One subcarrier unit set includes a plurality of subcarriers.

In an example, each subcarrier unit set includes 84 subcarriers, and each subcarrier unit set includes 80 data subcarriers and four pilot subcarriers. Optionally, any two adjacent pilot subcarriers in the four pilot subcarriers are spaced by 20 data subcarriers from each other.

In another example, each subcarrier unit set includes 80 subcarriers, and each subcarrier unit set includes 76 data subcarriers and four pilot subcarriers. Optionally, any two adjacent pilot subcarriers in the four pilot subcarriers are spaced by 19 data subcarriers from each other.

Optionally, in an embodiment, the bandwidth of the channel further includes at least three direct current DC subcarriers.

Optionally, in an embodiment, in this embodiment of this application, a subcarrier spacing in the bandwidth of the channel is 5.15625 MHz.

Optionally, one RU obtained by dividing the bandwidth of the channel includes N subcarrier unit sets, where N is an integer greater than or equal to 1. In other words, one RU may include N subcarrier unit sets.

With reference to the first aspect or the second aspect, in an implementation, one subcarrier unit set constitutes one first RU, two subcarrier unit sets with consecutive frequencies constitute one second RU, three subcarrier unit sets with consecutive frequencies constitute one third RU, and four subcarrier unit sets with consecutive frequencies constitute one fourth RU.

With reference to the first aspect or the second aspect, in an implementation, when the bandwidth of the channel includes M=1 basic bandwidth, and is 2.16 GHz, the at least one RU obtained by dividing the one basic bandwidth includes a first part of RUs.

The first part of RUs in ascending order of frequencies is:
 four first RUs; or
 one second RU, one first RU, and one first RU; or
 one first RU, one second RU, and one first RU; or
 one first RU, one first RU, and one second RU; or
 one second RU and one second RU; or
 one third RU and one first RU; or
 one first RU and one third RU; or
 one fourth RU.

With reference to the first aspect or the second aspect, in an implementation, when the bandwidth of the channel includes M=2 basic bandwidths, which include a first basic bandwidth and a second basic bandwidth, and is 4.32 GHz, the at least one RU obtained by dividing the two basic bandwidths includes a first part of RUs, a second part of RUs, and one center RU.

A frequency of the first part of RUs is lower than that of the center RU, and corresponds to the first basic bandwidth; and a frequency of the second part of RUs is higher than that of the center RU, and corresponds to the second basic bandwidth.

The first part of RUs and the second part of RUs in ascending order of frequencies each include:
 four first RUs; or
 one second RU, one first RU, and one first RU; or
 one first RU, one second RU, and one first RU; or
 one first RU, one first RU, and one second RU; or
 one second RU and one second RU; or
 one third RU and one first RU; or
 one first RU and one third RU; or
 one fourth RU.

A number of subcarriers on the center RU is the same as a number of subcarriers in one subcarrier unit set, the first half of subcarriers on the center RU is located on a left side of a direct current subcarrier and includes two pilot subcarriers, and the second half of subcarriers on the center RU is located on a right side of the direct current subcarrier and includes two pilot subcarriers.

With reference to the first aspect or the second aspect, in an implementation, when the bandwidth of the channel includes M=3 basic bandwidths, which are a first basic bandwidth, a second basic bandwidth, and a third basic bandwidth, and is 6.48 GHz, the at least one RU includes a first part of RUs, a second part of RUs, a third part of RUs, a first center RU, and a second center RU.

A frequency of the first part of RUs is lower than that of the first center RU, and corresponds to the first basic bandwidth; a frequency of the second part of RUs is higher than that of the first center RU, and the frequency of the second part of RUs is lower than that of the second center RU and corresponds to the second basic bandwidth; and a frequency of the third part of RUs is higher than that of the second center RU, and corresponds to the third basic bandwidth.

The first part of RUs, the second part of RUs, and the third part of RUs in ascending order of frequencies each include:
 four first RUs; or
 one second RU, one first RU, and one first RU; or
 one first RU, one second RU, and one first RU; or
 one first RU, one first RU, and one second RU; or
 one second RU and one second RU; or
 one third RU and one first RU; or
 one first RU and one third RU; or
 one fourth RU.

The first center RU is one subcarrier unit set; and the second center RU is one subcarrier unit set.

With reference to the first aspect or the second aspect, in an implementation, when the bandwidth of the channel includes M=4 basic bandwidths, which are a first basic bandwidth, a second basic bandwidth, a third basic bandwidth, and a fourth basic bandwidth, and is 8.64 GHz, the at least one RU includes a first part of RUs, a second part of RUs, a third part of RUs, a fourth part of RUs, a first center RU, a second center RU, and a third center RU.

A frequency of the first part of RUs is lower than that of the first center RU, and corresponds to the first basic bandwidth; a frequency of the second part of RUs is higher than that of the first center RU, and the frequency of the second part of RUs is lower than that of the second center RU and corresponds to the second basic bandwidth; a frequency of the third part of RUs is higher than that of the second center RU, and the frequency of the third part of RUs is lower than that of the third center RU and corresponds to the third basic bandwidth; and a frequency of the fourth part of RUs is higher than that of the third center RU, and corresponds to the fourth basic bandwidth.

The first part of RUs, the second part of RUs, the third part of RUs, and the fourth part of RUs in ascending order of frequencies each include:
 four first RUs; or
 one second RU, one first RU, and one first RU; or
 one first RU, one second RU, and one first RU; or
 one first RU, one first RU, and one second RU; or one second RU and one second RU; or
one third RU and one first RU; or
one first RU and one third RU; or
one fourth RU.

The first center RU is one subcarrier unit set; the third center RU is one subcarrier unit set; and a number of subcarriers on the second center RU is the same as a number of subcarriers in one subcarrier unit set, the first half of subcarriers on the second center RU is located on a left side of a direct current subcarrier and includes two pilot subcarriers, and the second half of subcarriers on the second center RU is located on a right side of the direct current subcarrier and includes two pilot subcarriers.

With reference to the first aspect or the second aspect, in an implementation, when the bandwidth of the channel includes M=1 basic bandwidth, and is 2.16 GHz, the at least one RU includes a first part of RUs.

The first part of RUs is:
four RUs each including one subcarrier unit set; or
two RUs each including one subcarrier unit set, and one RU including two subcarrier unit sets; or
two RUs each including two subcarrier unit sets; or
one RU including one subcarrier unit set, and one RU including three subcarrier unit sets; or
one RU including four subcarrier unit sets.

Specifically, the first part of RUs in ascending order of frequencies is:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

With reference to the first aspect or the second aspect, in an implementation, when the bandwidth of the channel includes M=2 basic bandwidths, which include a first basic bandwidth and a second basic bandwidth, and is 4.32 GHz, the at least one RU obtained by dividing the two basic bandwidths includes a first part of RUs, a second part of RUs, and one center RU. A frequency of the first part of RUs is lower than that of the center RU, and corresponds to the first basic bandwidth; and a frequency of the second part of RUs is higher than that of the center RU, and corresponds to the second basic bandwidth. In other words, the first part of RUs is located on a left side of the center RU, and the second part of RUs is located on a right side of the center RU. In other words, the center RU is located between the first part of RUs and the second part of RUs.

The first part of RUs and the second part of RUs each include:
five RUs each including one subcarrier unit set; or
one RU including two subcarrier unit sets, and three RUs each including one subcarrier unit set; or
two RUs each including two subcarrier unit sets, and one RU including one subcarrier unit set; or
one RU including three subcarrier unit sets, and one RU including two subcarrier unit sets; or
one RU including one subcarrier unit set, and one RU including four subcarrier unit sets; or
one RU including five subcarrier unit sets.

In this embodiment of this application, it is defined that the five subcarrier unit sets with consecutive frequencies constitute one fifth RU. In this case, the first part of RUs and the second part of RUs in ascending order of frequencies each include:
five first RUs; or
one second RU, one first RU, one first RU, and one first RU; or
one first RU, one second RU, one first RU, and one first RU; or
one first RU, one first RU, one second RU, and one first RU; or
one second RU, one first RU, and one second RU; or
one third RU and one second RU; or
one first RU and one fourth RU; or
one fifth RU.

With reference to the first aspect or the second aspect, in an implementation, when the bandwidth of the channel includes M=3 basic bandwidths, which are a first basic bandwidth, a second basic bandwidth, and a third basic bandwidth, and is 6.48 GHz, the at least one RU includes a first part of RUs, a second part of RUs, a third part of RUs, a first center RU, and a second center RU. A frequency of the first part of RUs is lower than that of the first center RU, and corresponds to the first basic bandwidth; a frequency of the second part of RUs is higher than that of the first center RU, and the frequency of the second part of RUs is lower than that of the second center RU and corresponds to the second basic bandwidth; and a frequency of the third part of RUs is higher than that of the second center RU, and corresponds to the third basic bandwidth. In other words, the first part of RUs is located on a left side of the first center RU, the second part of RUs is located on a right side of the first center RU, the second part of RUs is located on a left side of the second center RU, and the third part of RUs is located on a right side of the second center RU. In other words, the first center RU is located between the first part of RUs and the second part of RUs, and the second center RU is located between the second part of RUs and the third part of RUs.

The first part of RUs, the second part of RUs, and the third part of RUs each include:
five RUs each including one subcarrier unit set; or
one RU including two subcarrier unit sets, and three RUs each including one subcarrier unit set; or
two RUs each including two subcarrier unit sets, and one RU including one subcarrier unit set; or
one RU including three subcarrier unit sets, and one RU including one subcarrier unit set; or
one RU including one subcarrier unit set, and one RU including four subcarrier unit sets; or
one RU including five subcarrier unit sets.

In this embodiment of this application, it is defined that the five subcarrier unit sets with consecutive frequencies constitute one fifth RU. In this case, the first part of RUs, the second part of RUs, and the third part of RUs in ascending order of frequencies each include:
five first RUs; or
one second RU, one first RU, one first RU, and one first RU; or
one first RU, one second RU, one first RU, and one first RU; or
one first RU, one first RU, one second RU, and one first RU; or
one second RU, one first RU, and one second RU; or
one third RU and one second RU; or
one first RU and one fourth RU; or
one fifth RU.

The first center RU is one subcarrier unit set; and the second center RU is one subcarrier unit set.

With reference to the first aspect or the second aspect, in an implementation, when the bandwidth of the channel includes M=4 basic bandwidths, which are a first basic bandwidth, a second basic bandwidth, a third basic bandwidth, and a fourth basic bandwidth, and is 8.64 GHz, the at least one RU includes a first part of RUs, a second part of RUs, a third part of RUs, and a fourth part of RUs.

The first part of RUs, the second part of RUs, the third part of RUs, and the fourth part of RUs each include:
five RUs each including one subcarrier unit set; or
one RU including two subcarrier unit sets, and three RUs each including one subcarrier unit set; or
two RUs each including two subcarrier unit sets, and one RU including one subcarrier unit set; or
one RU including three subcarrier unit sets, and one RU including two subcarrier unit sets; or
one RU including one subcarrier unit set, and one RU including four subcarrier unit sets; or
one RU including five subcarrier unit sets.

In this embodiment of this application, it is defined that the five subcarrier unit sets with consecutive frequencies constitute one fifth RU. In this case, the first part of RUs, the second part of RUs, the third part of RUs, and the fourth part of RUs in ascending order of frequencies each include:
five first RUs; or
one second RU, one first RU, one first RU, and one first RU; or
one first RU, one second RU, one first RU, and one first RU; or
one first RU, one first RU, one second RU, and one first RU; or
one second RU, one first RU, and one second RU; or
one third RU and one second RU; or
one first RU and one fourth RU; or
one fifth RU.

With reference to the first aspect or the second aspect, in an implementation, the PPDU includes M resource allocation fields, and all the resource allocation fields are the same and each include M index numbers.

The M index numbers are in a one-to-one correspondence with the M basic bandwidths, and each index number is used to indicate a size of an RU obtained by dividing the basic bandwidth corresponding to the index number and a location of the RU in frequency domain.

With reference to the first aspect or the second aspect, in an implementation, each resource allocation field further includes first indication information used to indicate whether the M−1 center RUs are allocated.

With reference to the first aspect or the second aspect, in an implementation, the first indication information is a bitmap and includes M−1 bits, and the M−1 bits are in a one-to-one correspondence with the M−1 center RUs.

With reference to the first aspect or the second aspect, in an implementation, the PPDU includes M resource allocation fields, the M resource allocation fields are in a one-to-one correspondence with the M basic bandwidths, each resource allocation field includes one index number, and the index number is used to indicate a size of an RU obtained by dividing the basic bandwidth corresponding to the resource allocation field and a location of the RU in frequency domain.

With reference to the first aspect or the second aspect, in an implementation, only M−1 resource allocation fields in the M resource allocation fields further include second indication information used to indicate whether the M−1 center RUs are allocated, and each piece of second indication information corresponds to one of the M−1 center RUs.

With reference to the first aspect or the second aspect, in an implementation, a remaining resource allocation field further includes second indication information, and the second indication information is a reserved value or a null value.

With reference to the first aspect or the second aspect, in an implementation, the second indication includes one bit.

With reference to the first aspect or the second aspect, in an implementation, when a value of the index number is a first value, it indicates that RUs, in ascending order of frequencies, obtained by dividing the corresponding basic bandwidth include four first RUs.

Alternatively, when a value of the index number is a second value, it indicates that RUs, in ascending order of frequencies, obtained by dividing the corresponding basic bandwidth include one second RU, one first RU, and one first RU.

Alternatively, when a value of the index number is a third value, it indicates that RUs, in ascending order of frequencies, obtained by dividing the corresponding basic bandwidth include one first RU, one second RU, and one first RU.

Alternatively, when a value of the index number is a fourth value, it indicates that RUs, in ascending order of frequencies, obtained by dividing the corresponding basic bandwidth include one first RU, one first RU, and one second RU.

Alternatively, when a value of the index number is a fifth value, it indicates that RUs, in ascending order of frequencies, obtained by dividing the corresponding basic bandwidth include two second RUs.

Alternatively, when a value of the index number is a sixth value, it indicates that RUs, in ascending order of frequencies, obtained by dividing the corresponding basic bandwidth include one third RU and one first RU.

Alternatively, when a value of the index number is a seventh value, it indicates that RUs, in ascending order of frequencies, obtained by dividing the corresponding basic bandwidth include one first RU and one third RU.

Alternatively, when a value of the index number is an eighth value, it indicates that RUs, in ascending order of frequencies, obtained by dividing the corresponding basic bandwidth include one fourth RU.

With reference to the first aspect or the second aspect, in an implementation, the index number includes at least three bits.

With reference to the first aspect or the second aspect, in an implementation, the resource allocation field is carried in a header B field.

The bandwidth of the channel is divided into one or more RUs, so that a transmit end can indicate, by using resource indication information, to allocate different RUs to different receive ends, and the receive end can determine the resource unit allocated by the transmit end, and receive data on a corresponding resource unit. In this embodiment of this application, resources of a plurality of stations can be simultaneously indicated, thereby improving resource indication efficiency.

According to a third aspect, a resource unit allocation indication method is provided, and is applied to a 60 GHz wireless local area network communications system. The method includes:

A transmit end generates resource indication information, where the resource indication information is used to indicate a size of at least one resource unit RU obtained by dividing a channel bandwidth and a location of the at least one resource unit RU in frequency domain; and the channel bandwidth includes M basic bandwidths, each of the M basic bandwidths is 2.16 GHz, and M is an integer greater than or equal to 1.

The transmit end sends the resource indication information to a receive end.

According to a fourth aspect, a resource unit allocation indication method is provided, and is applied to a 60 GHz wireless local area network communications system. The method includes:

A receive end receives resource indication information, where the resource indication information is used to indicate a size of at least one resource unit RU obtained by dividing a channel bandwidth and a location of the at least one resource unit RU in frequency domain; and the channel bandwidth includes M basic bandwidths, each of the M basic bandwidths is 2.16 GHz, and M is an integer greater than or equal to 1.

The receive end determines, based on the resource indication information, a resource unit allocated by a transmit end.

In this embodiment of this application, the channel bandwidth is divided into one or more RUs, so that the transmit end can indicate, by using the resource indication information, to allocate different RUs to different receive ends, and the receive end can determine the resource unit allocated by the transmit end, and receive data on a corresponding resource unit. In this embodiment of this application, resources of a plurality of stations can be simultaneously indicated, thereby improving resource indication efficiency.

Optionally, the resource indication information includes M resource allocation fields, and each resource allocation field includes at least one index number. Each index number is used to indicate a size and a location that are of an RU included in any part of RUs of the first part of RUs, the second part of RUs, the third part of RUs, or the fourth part of RUs. In other words, the index number indicates one part of RUs, and each part of RUs corresponds to one basic bandwidth. In other words, the index number indicates a size of an RU obtained by dividing the one basic bandwidth and a location of the RU in frequency domain. In an embodiment, any two of the at least one index number are used to indicate sizes of RUs included in different parts of RUs and locations of the RUs in frequency domain.

It should be understood that in this embodiment of this application, the resource indication information may be independent information, or may be information carried in a PPDU. This embodiment of this application is not limited thereto.

With reference to the third aspect or the fourth aspect, in an implementation, one RU includes N subcarrier unit sets, where N is an integer greater than or equal to 1.

The subcarrier unit set includes 84 subcarriers, each subcarrier unit set includes 80 data subcarriers and four pilot subcarriers, and any two adjacent pilot subcarriers in the four pilot subcarriers are spaced by 20 data subcarriers from each other.

Alternatively, the subcarrier unit set includes 80 subcarriers, each subcarrier unit set includes 76 data subcarriers and four pilot subcarriers, and any two adjacent pilot subcarriers in the four pilot subcarriers are spaced by 19 data subcarriers from each other.

With reference to the third aspect or the fourth aspect, in an implementation, the at least one RU includes M−1 center RUs, and each center RU is not an RU located at either end of the at least one RU.

With reference to the third aspect or the fourth aspect, in an implementation, the resource indication information includes M resource allocation fields, the M resource allocation fields are the same, and each resource allocation field includes M index numbers. The M index numbers are in a one-to-one correspondence with the M basic bandwidths, and one index number is used to indicate a size of an RU obtained by dividing one corresponding basic bandwidth and a location of the RU in frequency domain.

With reference to the third aspect or the fourth aspect, in an implementation, each resource allocation field further includes first indication information used to indicate whether the M−1 center RUs are allocated.

With reference to the third aspect or the fourth aspect, in an implementation, the first indication information is a bitmap and includes M−1 bits, and the M−1 bits are in a one-to-one correspondence with the M−1 center RUs.

In this embodiment of this application, the M resource allocation fields are set to be the same. Therefore, the receive end may obtain, by parsing only one resource allocation field without parsing all the resource allocation fields, allocation statuses of all RUs obtained by dividing the channel bandwidth. This has relatively low implementation complexity.

With reference to the third aspect or the fourth aspect, in an implementation, the resource indication information includes M resource allocation fields, the M resource allocation fields are in a one-to-one correspondence with the M basic bandwidths, each resource allocation field includes one index number, and the index number is used to indicate a size of an RU obtained by dividing the basic bandwidth corresponding to the resource allocation field and a location of the RU in frequency domain.

With reference to the third aspect or the fourth aspect, in an implementation, only M−1 resource allocation fields in the M resource allocation fields further include second indication information used to indicate whether the M−1 center RUs are allocated, and each piece of second indication information corresponds to one of the M−1 center RUs.

With reference to the third aspect or the fourth aspect, in an implementation, a remaining resource allocation field further includes second indication information, and the second indication information is a reserved value or a null value.

With reference to the third aspect or the fourth aspect, in an implementation, the second indication includes one bit.

In this embodiment of this application, a size of the resource allocation field is set to be fixed (each resource allocation field includes one index number and one piece of second indication information). In other words, the size of the resource allocation field does not change with a bandwidth, so that allocation information of the RU can be simply indicated.

With reference to the third aspect or the fourth aspect, in an implementation, one basic bandwidth includes four subcarrier unit sets in ascending order of frequencies. One subcarrier unit set constitutes one first RU, two subcarrier unit sets with consecutive frequencies constitute one second RU, three subcarrier unit sets with consecutive frequencies constitute one third RU, and four subcarrier unit sets with consecutive frequencies constitute one fourth RU.

When a value of the index number is a first value, it indicates that resource units RUs, in ascending order of frequencies, obtained by dividing the corresponding basic bandwidth include four first RUs.

Alternatively, when a value of the index number is a second value, it indicates that resource units RUs, in ascending order of frequencies, obtained by dividing the corresponding basic bandwidth include one second RU, one first RU, and one first RU.

Alternatively, when a value of the index number is a third value, it indicates that resource units RUs, in ascending order of frequencies, obtained by dividing the corresponding basic bandwidth include one first RU, one second RU, and one first RU.

Alternatively, when a value of the index number is a fourth value, it indicates that resource units RUs, in ascending order of frequencies, obtained by dividing the corresponding basic bandwidth include one first RU, one first RU, and one second RU.

Alternatively, when a value of the index number is a fifth value, it indicates that resource units RUs, in ascending order of frequencies, obtained by dividing the corresponding basic bandwidth include two second RUs.

Alternatively, when a value of the index number is a sixth value, it indicates that resource units RUs, in ascending order of frequencies, obtained by dividing the corresponding basic bandwidth include one third RU and one first RU.

Alternatively, when a value of the index number is a seventh value, it indicates that resource units RUs, in ascending order of frequencies, obtained by dividing the corresponding basic bandwidth include one first RU and one third RU.

Alternatively, when a value of the index number is an eighth value, it indicates that resource units RUs, in ascending order of frequencies, obtained by dividing the corresponding basic bandwidth include one fourth RU.

With reference to the third aspect or the fourth aspect, in an implementation, the index number includes at least three bits.

The foregoing describes a case in which the M resource allocation fields are different from each other, and a case in which the M resource allocation fields are the same. However, this embodiment of this application is not limited thereto. In actual application, the M resource allocation fields may alternatively have another form. An example is used below for description.

Specifically, the PPDU includes M resource allocation fields, the M resource allocation fields are in a one-to-one correspondence with the M basic bandwidths, each resource allocation field includes one or two index numbers, and each index number is used to indicate allocation of an RU in the basic bandwidth corresponding to the resource allocation field.

Optionally, each resource allocation field further includes third indication information used to indicate whether the M−1 center RUs are allocated.

Optionally, the third indication information is a bitmap and includes one or two bits.

In this embodiment of this application, only one or two signaling B content channels are included in a channel bonding condition or a channel aggregation condition, so that the receive end needs to decode information from one or two sub-bands. In this embodiment of this application, implementation complexity and implementation efficiency can be balanced, and relatively low implementation complexity can be ensured while relatively high efficiency is achieved.

According to a fifth aspect, a resource scheduling method is provided, and is applied to a 60 GHz wireless local area network communications system. The method includes:

An access point generates resource scheduling information, where the resource scheduling information includes at least one resource unit allocation field and at least one station identifier field; one station identifier field is used to indicate one station, and one resource unit allocation field is used to indicate a resource unit RU allocated to the one station; and the RU is included in M basic bandwidths, the basic bandwidth is 2.16 GHz, and M is a positive integer.

The access point sends the resource scheduling information.

According to a sixth aspect, a resource scheduling method is provided, and is applied to a 60 GHz wireless local area network communications system. The method includes:

A target station receives resource scheduling information, where the resource scheduling information includes at least one resource unit allocation field and at least one station identifier field; one station identifier field is used to indicate an identifier of one scheduled station, and one resource unit allocation field is used to indicate a resource unit RU allocated to the station; and the RU is included in M basic bandwidths, the basic bandwidth is 2.16 GHz, and M is a positive integer.

The target station determines, based on the resource scheduling information, the resource unit allocated to the target station.

In an example, the resource scheduling information may be carried in an RU allocation field of a common field and a user field in a trigger frame. Based on the resource scheduling information, the transmit end can implement flexible uplink scheduling, implement multi-user parallel uplink transmission, and improve communication efficiency and spectrum utilization.

With reference to the fifth aspect or the sixth aspect, in an implementation, the RU includes N subcarrier unit sets, where N is a positive integer.

The subcarrier unit set includes 84 subcarriers, each subcarrier unit set includes 80 data subcarriers and four pilot subcarriers, and any two adjacent pilot subcarriers in the four pilot subcarriers are spaced by 20 data subcarriers from each other.

Alternatively, the subcarrier unit set includes 80 subcarriers, each subcarrier unit set includes 76 data subcarriers and four pilot subcarriers, and any two adjacent pilot subcarriers in the four pilot subcarriers are spaced by 19 data subcarriers from each other.

With reference to the fifth aspect or the sixth aspect, in an implementation, the resource unit allocation field includes a first part of bits and a second part of bits, and the first part of bits and the second part of bits are jointly used to indicate a size of the RU and a location of the RU in the M basic bandwidths.

With reference to the fifth aspect or the sixth aspect, in an implementation, when the first part of bits is a first value, it indicates that the RU is located in the $1^{st}$ basic bandwidth in the M basic bandwidths.

When the first part of bits is a second value, it indicates that the RU is located in the $2^{nd}$ basic bandwidth in the M basic bandwidths.

When the first part of bits is a third value, it indicates that the RU is located in the $3^{rd}$ basic bandwidth in the M basic bandwidths.

When the first part of bits is a fourth value, it indicates that the RU is located in the $4^{th}$ basic bandwidth in the M basic bandwidths.

When the first part of bits is a fifth value, it indicates that the RU is a center RU between the $1^{st}$ basic bandwidth and the $2^{nd}$ basic bandwidth in the M basic bandwidths.

When the first part of bits is a sixth value, it indicates that the RU is a center RU between the $2^{nd}$ basic bandwidth and the $3^{rd}$ basic bandwidth in the M basic bandwidths.

When the first part of bits is a seventh value, it indicates that the RU is a center RU between the $3^{rd}$ basic bandwidth and the $4^{th}$ basic bandwidth in the M basic bandwidths.

With reference to the fifth aspect or the sixth aspect, in an implementation, the first part of bits includes at least three bits.

With reference to the fifth aspect or the sixth aspect, in an implementation, one basic bandwidth includes four subcarrier unit sets, and the four subcarrier unit sets in ascending order of frequencies are a first subcarrier unit set, a second subcarrier unit set, a third subcarrier unit set, and a fourth subcarrier unit set.

In a case in which a value of the first part of bits is a first value to a fourth value,
- when the second part of bits is an eighth value, it indicates that the RU is the first subcarrier unit set;
- when the second part of bits is a ninth value, it indicates that the RU is the second subcarrier unit set;
- when the second part of bits is a tenth value, it indicates that the RU is the third subcarrier unit set;
- when the second part of bits is an eleventh value, it indicates that the RU is the fourth subcarrier unit set;
- when the second part of bits is a twelfth value, it indicates that the RU is an RU including the first subcarrier unit set and the second subcarrier unit set;
- when the second part of bits is a thirteenth value, it indicates that the RU is an RU including the second subcarrier unit set and the third subcarrier unit set;
- when the second part of bits is a fourteenth value, it indicates that the RU is an RU including the third subcarrier unit set and the fourth subcarrier unit set;
- when the second part of bits is a fifteenth value, it indicates that the RU is an RU including the first subcarrier unit set, the second subcarrier unit set, and the third subcarrier unit set;
- when the second part of bits is a sixteenth value, it indicates that the RU is an RU including the second subcarrier unit set, the third subcarrier unit set, and the fourth subcarrier unit set; or
- when the second part of bits is a seventeenth value, it indicates that the RU is an RU including the first subcarrier unit set, the second subcarrier unit set, the third subcarrier unit set, and the fourth subcarrier unit set.

With reference to the fifth aspect or the sixth aspect, in an implementation, the second part of bits includes at least four bits.

With reference to the fifth aspect or the sixth aspect, in an implementation, one basic bandwidth includes four subcarrier unit sets, and the four subcarrier unit sets in ascending order of frequencies are a first subcarrier unit set, a second subcarrier unit set, a third subcarrier unit set, and a fourth subcarrier unit set.

In a case in which a value of the first part of bits is a first value to a fourth value,
- when the second part of bits is an eighth value, it indicates that the RU is the first subcarrier unit set;
- when the second part of bits is a ninth value, it indicates that the RU is the second subcarrier unit set;
- when the second part of bits is a tenth value, it indicates that the RU is the third subcarrier unit set;
- when the second part of bits is an eleventh value, it indicates that the RU is the fourth subcarrier unit set;
- when the second part of bits is a twelfth value, it indicates that the RU is an RU including the first subcarrier unit set and the second subcarrier unit set;
- when the second part of bits is a thirteenth value, it indicates that the RU is an RU including the second subcarrier unit set and the third subcarrier unit set;
- when the second part of bits is a fourteenth value, it indicates that the RU is an RU including the third subcarrier unit set and the fourth subcarrier unit set; or
- when the second part of bits is a fifteenth value, it indicates that the RU is an RU including the first subcarrier unit set, the second subcarrier unit set, the third subcarrier unit set, and the fourth subcarrier unit set.

With reference to the fifth aspect or the sixth aspect, in an implementation, the second part of bits includes at least three bits.

In this embodiment of this application, based on RU allocation of the common field and the user field in the trigger frame and a user physical layer parameter design, flexible uplink scheduling can be implemented, and technical complexity of synchronization can be reduced.

According to a seventh aspect, a communications apparatus is provided and includes each module or unit configured to perform the method according to any one of the first aspect or the possible implementations of the first aspect. In an implementation, the communications apparatus is an access point.

According to an eighth aspect, a communications apparatus is provided and includes each module or unit configured to perform the method according to any one of the second aspect or the possible implementations of the second aspect. In an implementation, the communications apparatus is a station.

According to a ninth aspect, a communications apparatus is provided and includes each module or unit configured to perform the method according to any one of the third aspect or the possible implementations of the third aspect. In an implementation, the communications apparatus is a transmit end, for example, an access point.

According to a tenth aspect, a communications apparatus is provided and includes each module or unit configured to perform the method according to any one of the fourth aspect or the possible implementations of the fourth aspect. In an implementation, the communications apparatus is a receive end, for example, a station.

According to an eleventh aspect, a communications apparatus is provided and includes each module or unit configured to perform the method according to any one of the fifth aspect or the possible implementations of the fifth aspect. In an implementation, the communications apparatus is an access point.

According to a twelfth aspect, a communications apparatus is provided and includes each module or unit configured to perform the method according to any one of the sixth aspect or the possible implementations of the sixth aspect. In an implementation, the communications apparatus is a station.

According to a thirteenth aspect, a communications apparatus is provided and includes a transceiver, a processor, and a memory. The processor is configured to control the transceiver to: receive and send signals, the memory is configured to store a computer program, and the processor is configured to: invoke the computer program from the memory and run the computer program, so that the apparatus performs the method according to the first aspect or the possible implementations of the first aspect. In an implementation, the communications apparatus is an access point.

According to a fourteenth aspect, a data scheduling apparatus is provided and includes a transceiver, a processor, and a memory. The processor is configured to control the transceiver to: receive and send signals, the memory is configured to store a computer program, and the processor is configured to: invoke the computer program from the memory and run the computer program, so that the communications apparatus performs the method according to the second aspect or the possible implementations of the second aspect. In an implementation, the communications apparatus is a station.

According to a fifteenth aspect, a communications apparatus is provided and includes a transceiver, a processor, and a memory. The processor is configured to control the transceiver to: receive and send signals, the memory is configured to store a computer program, and the processor is configured to: invoke the computer program from the memory and run the computer program, so that the apparatus performs the method according to the third aspect or the possible implementations of the third aspect. In an implementation, the communications apparatus is an access point.

According to a sixteenth aspect, a data scheduling apparatus is provided and includes a transceiver, a processor, and a memory. The processor is configured to control the transceiver to: receive and send signals, the memory is configured to store a computer program, and the processor is configured to: invoke the computer program from the memory and run the computer program, so that the communications apparatus performs the method according to the fourth aspect or the possible implementations of the fourth aspect. In an implementation, the communications apparatus is a station.

According to a seventeenth aspect, a communications apparatus is provided and includes a transceiver, a processor, and a memory. The processor is configured to control the transceiver to: receive and send signals, the memory is configured to store a computer program, and the processor is configured to: invoke the computer program from the memory and run the computer program, so that the apparatus performs the method according to the fifth aspect or the possible implementations of the fifth aspect. In an implementation, the communications apparatus is an access point.

According to an eighteenth aspect, a data scheduling apparatus is provided and includes a transceiver, a processor, and a memory. The processor is configured to control the transceiver to: receive and send signals, the memory is configured to store a computer program, and the processor is configured to: invoke the computer program from the memory and run the computer program, so that the communications apparatus performs the method according to the sixth aspect or the possible implementations of the sixth aspect. In an implementation, the communications apparatus is a station.

According to a nineteenth aspect, a computer readable medium is provided, and the computer readable medium stores a computer program. When the computer program is executed by a computer, the method according to any one of the foregoing aspects or the possible implementations of the foregoing aspects is implemented.

According to a twentieth aspect, a computer program product is provided. When the computer program product is executed by a computer, the method according to any one of the foregoing aspects or the possible implementations of the foregoing aspects is implemented.

According to a twenty-first aspect, a processing apparatus is provided and includes a processor and an interface.

The processor is configured to perform the method according to any one of the first aspect to the sixth aspect or the possible implementations of the first aspect to the sixth aspect. A related data exchange process is completed through the interface. In a specific implementation process, the interface may further complete the data exchange process by using a transceiver.

It should be understood that the processing apparatus according to the twenty-first aspect may be a chip. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may exist independently of the processor. The memory and the processor may communicate with each other in a wired or wireless manner.

According to a twenty-second aspect, a chip is provided and includes a processor. The processor is configured to: invoke an instruction stored in a memory from the memory and run the instruction, so that a communications device on which the chip is installed performs the methods according to the foregoing aspects.

According to a twenty-third aspect, a system is provided and includes the foregoing access point and station.

BRIEF DESCRIPTION OF DRAWINGS

FIG. 17 is a schematic structural diagram of a PPDU according to an embodiment of this application;

DESCRIPTION OF EMBODIMENTS

Figure 1:
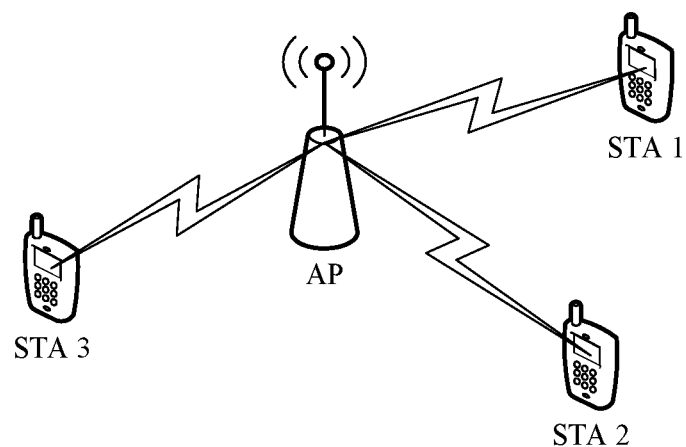
FIG. 1 is a schematic diagram of a scenario to which an embodiment of this application may be applied.

The following describes technical solutions of this application with reference to the accompanying drawings.

The technical solutions in the embodiments of this application may be applied to various communications systems, for example, a wireless local area network (WLAN) system. Optionally, the embodiments of this application may be further applied to a system in which beamforming training needs to be performed, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

Only the WLAN system is used as an example below to describe the application scenario in the embodiments of this application and the method in the embodiments of this application.

Specifically, the embodiments of this application may be applied to a wireless local area network (WLAN), and the embodiments of this application may be applied to any protocol in the institute of electrical and electronics engineers (IEEE) 802.11 series protocols currently used in the WLAN. The WLAN may include one or more basic service sets (BSS). A network node in the basic service set includes an access point (AP) and a station (STA). Based on the original BSS, the IEEE 802.11ad introduces a personal basic service set (PBS S) and a personal basic service set control point (PBS S control point, PCP). Each personal basic service set may include one AP/PCP and a plurality of stations associated with the AP/PCP. It should be understood that in the embodiments of this application, a device that communicates with the station may be an AP or a PCP. For ease of description, only communication between the AP and the station is used as an example below for description. A behavior of communication between the PCP and the station is similar to that of communication between the AP and the station.

It should be understood that in the embodiments of this application, the station is a wireless communications apparatus having a wireless transceiver function, and the station may also be referred to as a subscriber unit, an access terminal, a mobile station, a mobile console, a remote station, a remote terminal, a mobile device, a user terminal, a terminal, a wireless communications device, a user agent, a user apparatus, or user equipment (UE). The station may be a wireless communications chip, a wireless sensor, or a wireless communications terminal. For example, the station is a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communications device supporting a Wi-Fi communication function, or a computer supporting a Wi-Fi communication function. Optionally, the station may support the 802.11ad standard or the 802.11ay standard. Further, with development of communications technologies, optionally, the station supports a next-generation WLAN standard or the like. For ease of description, the foregoing devices are collectively referred to as the station in the embodiments of this application.

The AP in the embodiments of this application is an apparatus that can provide a service for the station and that has a wireless transceiver function, and may be configured to: communicate with an access terminal through a wireless local area network, and transmit data of the access terminal to a network side, or transmit data from a network side to the access terminal. The AP may also be referred to as a wireless access point, a hotspot, or the like. The AP is an access point used by a mobile user to access a wired network, and is mainly deployed in a home, inside a building, and inside a campus, with a typical coverage radius of tens of meters to hundreds of meters. Certainly, the AP may alternatively be deployed outdoors. The AP is equivalent to a bridge that connects a wired network and a wireless network. A main function of the AP is to connect wireless network clients together, and then connect the wireless network to the Ethernet. Specifically, the AP may be a terminal device or a network device with a wireless fidelity (Wi-Fi) chip. Optionally, the AP may be a device that supports the 802.11ad standard or the 802.11ay standard. Further, with development of communications technologies, optionally, the AP may be a device of a next-generation WLAN standard.

In the embodiments of this application, the access point or the station includes a hardware layer, an operating system layer running on the hardware layer, and an application layer running on the operating system layer. The hardware layer includes hardware such as a central processing unit (CPU), a memory management unit (MMU), and memory (also referred to as main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specially limited in the embodiments of this application, provided that a program that records code of the method provided in the embodiments of this application can be run to perform communication according to the method provided in the embodiments of this application. For example, the method provided in the embodiments of this application may be performed by the access point or the station, or a function module that can invoke and execute the program in the access point or the station.

In addition, aspects or features of this application may be implemented as a method, an apparatus or a product that uses standard programming and/or engineering technologies. The term "product" used in this application covers a computer program that can be accessed from any computer readable device, carrier or medium. For example, the computer readable medium may include but is not limited to a magnetic storage device (for example, a hard disk, a floppy disk, or a magnetic tape), an optical disc (for example, a compact disc (CD) or a digital versatile disc (DVD)), or a smart card and a flash memory device (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

FIG. 1 is a schematic diagram of an application scenario according to an embodiment of this application. A scenario system shown in FIG. 1 may be a WLAN system. The WLAN system in FIG. 1 may include one or more APs and one or more STAs. In FIG. 1, one AP and three STAs are used as an example. Wireless communication may be performed between the AP and each of the STAs according to various standards.

In a WLAN communications system, a high rate, a large bandwidth, high spectrum utilization, and a plurality of new services are major development objectives of future broadband wireless communication. Bandwidth resources of different sizes may be allocated for different service requirements of different users. To better allocate spectrum resources and obtain higher spectrum utilization while considering complexity of system implementation, a proper tone plan (Tone-Plan) needs to be designed, to more efficiently use spectrum resources in a 60 gigahertz (GHz) frequency band.

In view of the foregoing problem, an embodiment of this application provides a subcarrier division method.

In this embodiment of this application, a channel bandwidth may be divided into at least one RU, so that different frequency domain resource units (RU) can be allocated to different stations. Specifically, in this embodiment of this application, one RU may correspond to one station. To be specific, one RU may be allocated to one station for use. Optionally, one station may be allocated to a plurality of inconsecutive RUs. This embodiment of this application is not limited thereto. Optionally, different RUs may be allocated to different stations, so that an access point AP sends data to a plurality of stations in parallel on different RUs, thereby improving transmission efficiency. It should be understood that in this embodiment of this application, if one RU is allocated to the station, it indicates that the station may receive, on a resource of the RU, data or information sent by the access point to the station, or it indicates that the access point may send data to the station on the RU.

It should be understood that in this embodiment of this application, a channel may also be referred to as a system channel, and the channel bandwidth is a bandwidth of the channel, or may be referred to as a system channel bandwidth. This embodiment of this application is not limited thereto.

Optionally, the channel bandwidth includes M basic bandwidths, the basic bandwidth is 2.16 GHz, M is an integer greater than or equal to 1, and the M basic bandwidths are divided into the at least one RU. For channels with different bandwidths, a number of channel bonding (NCB) may be used to represent a number of 2.16 GHz channels (or basic bandwidths) with consecutive frequencies. If NCB=1, it indicates that the system channel includes one 2.16 GHz channel, and a bandwidth is 2.16 GHz. If NCB=2, it indicates that the system channel includes two 2.16 GHz channels with consecutive frequencies, and a bandwidth is 4.32 GHz. If NCB=3, it indicates that the system channel includes three 2.16 GHz channels with consecutive frequencies, and a bandwidth is 6.48 GHz. If NCB=4, it indicates that the system channel includes four 2.16 GHz channels with consecutive frequencies. It may be understood that by analogy, if NCB=5, it indicates that the system channel includes five 2.16 GHz channels with consecutive frequencies. The system channel bandwidth or the channel bandwidth includes the M basic bandwidths. This may also be represented as that NCB=M. This may be alternately used in this embodiment of this application.

The channel includes a data subcarrier (Data tone or Data subcarrier), a pilot subcarrier (pilot tone or pilot subcarrier), and a null subcarrier (Null tone or Null subcarrier), and may further include a direct current (DC) subcarrier (tone or subcarrier) and a guard subcarrier (guard tone or guard subcarrier). The direct current subcarrier may be located around or near a center subcarrier. Each RU includes a plurality of data subcarriers and a plurality of pilot subcarriers. One RU including K subcarriers may be represented as an N-tone RU, for example, an 84-tone RU.

Index numbers of the data subcarrier, the pilot subcarrier, and the direct current subcarrier that are included in the channel may be represented as [−X:X] in ascending order of frequencies. It should be noted that [−X:X] represents (2X+1) subcarriers whose index numbers range from −X to X. The index number −X identifies a leftmost subcarrier, namely, a subcarrier with a lowest frequency. X identifies a rightmost subcarrier, namely, a subcarrier with a highest frequency. The index number 0 identifies a subcarrier located at a frequency domain center.

Optionally, in an embodiment, the at least one RU includes M−1 center RUs, and each center RU is not an RU located at either end of the at least one RU. It should be understood that in this embodiment of this application, M may be equal to 1 or may be greater than 1. When M is equal to 1, the at least one RU includes zero center RUs. In other words, the at least one RU does not include a center RU. When M is greater than 1, the at least one RU includes the M−1 center RUs. Each center RU is not an RU located at either end of the at least one RU.

Specifically, when the channel bandwidth includes one basic bandwidth, the at least one RU may be one RU or a plurality of RUs. When the channel bandwidth includes M (M is greater than 1) basic bandwidths, the at least one RU may include at least a plurality of RUs. The plurality of RUs further include the M−1 center RUs.

In an example, if the basic bandwidth is 2.16 GHz, the channel bandwidth may be 2.16 GHz, 4.32 GHz, 6.48 GHz, 8.64 GHz, or the like.

Optionally, in an embodiment, one basic bandwidth includes four subcarrier unit sets in ascending order of frequencies. One subcarrier unit set includes a plurality of data subcarriers and a plurality of pilot subcarriers.

In an example, each subcarrier unit set includes 84 subcarriers, and each subcarrier unit set includes 80 data subcarriers and four pilot subcarriers. Optionally, any two adjacent pilot subcarriers in the four pilot subcarriers are spaced by 20 data subcarriers from each other.

In another example, each subcarrier unit set includes 80 subcarriers, and each subcarrier unit set includes 76 data subcarriers and four pilot subcarriers. Optionally, any two adjacent pilot subcarriers in the four pilot subcarriers are spaced by 19 data subcarriers from each other.

It should be noted that the subcarrier unit set may also be referred to as a resource block (RB), or may have another name. This is not specifically limited in this embodiment of this application.

Optionally, in an embodiment, the channel bandwidth further includes at least three direct current DC subcarriers.

Optionally, in an embodiment, in this embodiment of this application, a subcarrier spacing in the channel bandwidth is 5.15625 MHz.

Optionally, one RU obtained by dividing the channel bandwidth includes N subcarrier unit sets, where N is an integer greater than or equal to 1. In other words, one RU may include N subcarrier unit sets.

In this embodiment of this application, one subcarrier unit set may constitute one first RU, two subcarrier unit sets with consecutive frequencies may constitute one second RU, three subcarrier unit sets with consecutive frequencies may constitute one third RU, and four subcarrier unit sets with consecutive frequencies may constitute one fourth RU. In this case, the first RU includes four pilot subcarriers, the second RU includes eight pilot subcarriers, the third RU includes 12 pilot subcarriers, and the fourth RU includes 16 pilot subcarriers.

Example 1: An example in which the subcarrier unit set includes the 84 subcarriers is used to describe subcarrier distribution in the channel bandwidth in this application.

For example, when the channel bandwidth includes M=1 basic bandwidth, and is 2.16 GHz, the channel bandwidth may include four subcarrier unit sets. The four subcarrier unit sets may constitute one RU (for example, the one RU is one RU including four subcarrier unit sets), two RUs (for example, the two RUs are one RU including three subcarrier unit sets and one RU including one subcarrier unit set, or two RUs each including two subcarrier unit sets), three RUs (for example, the three RUs are one RU including two subcarrier unit sets and two RUs each including one subcarrier unit set), or four RUs (for example, the four RUs are four RUs each including one subcarrier unit set). This embodiment of this application is not limited thereto. For an example of RU distribution, refer to the following descriptions in FIG. 3.

Values of index numbers of data subcarriers and pilot subcarriers corresponding to the four subcarrier unit sets are [−169:−2, 2:169], every two pilot subcarriers are spaced by 20 data subcarriers, and correspondingly, index numbers of 16 pilot subcarriers are [−159, −138, −117, −96, −75, −54, −33, −12, 12, 33, 54, 75, 96, 117, 138, 159].

When the channel bandwidth includes M=2 basic bandwidths, namely, a first basic bandwidth and a second basic bandwidth, and is 4.32 GHz, the channel bandwidth may include nine (2×4+1, namely, 2 multiplied by 4 plus 1) subcarrier unit sets. The nine subcarrier unit sets include four subcarrier unit sets corresponding to the first basic bandwidth, four subcarrier unit sets corresponding to the second basic bandwidth, and one subcarrier unit set that constitutes a center RU. The nine subcarrier unit sets may constitute three RUs, five RUs, seven RUs, or nine RUs. This embodiment of this application is not limited thereto. For an example of RU distribution, refer to the following descriptions in FIG. 5.

Values of index numbers of data subcarriers and pilot subcarriers corresponding to the nine subcarrier unit sets are [−379:−2, 2:379], every two pilot subcarriers are spaced by 20 data subcarriers, and correspondingly, index numbers of 36 pilot subcarriers are [−369, −348, −327, −306, −285, −264, −243, −222, −201, −180, −159, −138, −117, −96, −75, −54, −33, −12, 12, 33, 54, 75, 96, 117, 138, 159, 180, 201, 222, 243, 264, 285, 306, 327, 348, 369].

When the channel bandwidth includes M=3 basic bandwidths, which are a first basic bandwidth, a second basic bandwidth, and a third basic bandwidth, and is 6.48 GHz, the channel bandwidth may include 14 (namely, 3×4+2) subcarrier unit sets. The 14 subcarrier unit sets include four subcarrier unit sets corresponding to the first basic bandwidth, four subcarrier unit sets corresponding to the second basic bandwidth, four subcarrier unit sets corresponding to the third basic bandwidth, and two subcarrier unit sets that constitute two center RUs. Specifically, the 14 subcarrier unit sets may constitute five RUs, eight RUs, 11 RUs, or 14 RUs. This embodiment of this application is not limited thereto. For an example of RU distribution, refer to the following descriptions in FIG. 7.

Values of index numbers of data subcarriers and pilot subcarriers corresponding to the 14 subcarrier unit sets are [−589:−2, 2:589], every two pilot subcarriers are spaced by 20 data subcarriers, and correspondingly, index numbers of 56 pilot subcarriers are [−579, −558, −537, −516, −495, −474, −453, −432, −411, −390, −369, −348, −327, −306, −285, −264, −243, −222, −201, −180, −159, −138, −117, −96, −75, −54, −33, −12, 12, 33, 54, 75, 96, 117, 138, 159, 180, 201, 222, 243, 264, 285, 306, 327, 348, 369, 390, 411, 432, 453, 474, 495, 516, 537, 558, 579].

When the channel bandwidth includes M=4 basic bandwidths, which are a first basic bandwidth, a second basic bandwidth, a third basic bandwidth, and a fourth basic bandwidth, and is 8.64 GHz, the channel bandwidth may include 19 (namely, 4×4+3) subcarrier unit sets. The 19 subcarrier unit sets include four subcarrier unit sets corresponding to the first basic bandwidth, four subcarrier unit sets corresponding to the second basic bandwidth, four subcarrier unit sets corresponding to the third basic bandwidth, four subcarrier unit sets corresponding to the fourth basic bandwidth, and three subcarrier unit sets that constitute three center RUs. Specifically, the 19 subcarrier unit sets may constitute seven RUs, 11 RUs, 15 RUs, or 19 RUs. This embodiment of this application is not limited thereto. For an example of RU distribution, refer to the following descriptions in FIG. 9.

For example, values of index numbers of data subcarriers and pilot subcarriers corresponding to the 19 subcarrier unit sets are [−799:−2, 2:799], every two pilot subcarriers are spaced by 20 data subcarriers, and correspondingly, index numbers of 76 pilot subcarriers are [−789, −768, −747, −726, −705, −684, −663, −642, −621, −600, −579, −558, −537, −516, −495, −474, −453, −432, −411, −390, −369, −348, −327, −306, −285, −264, −243, −222, −201, −180, −159, −138, −117, −96, −75, −54, −33, −12, 12, 33, 54, 75, 96, 117, 138, 159, 180, 201, 222, 243, 264, 285, 306, 327, 348, 369, 390, 411, 432, 453, 474, 495, 516, 537, 558, 579, 600, 621, 642, 663, 684, 705, 726, 747, 768, 789].

In this embodiment of this application, the subcarrier unit set is set to the 84 subcarriers, so that complexity of a resource unit indication can be reduced, information scheduling and a signaling indication are simplified, and spectrum utilization is relatively high.

Example 2: An example in which the subcarrier unit set includes the 80 subcarriers is used to describe subcarrier distribution in the channel bandwidth in this application.

For example, when the channel bandwidth includes M=1 basic bandwidth, and is 2.16 GHz, the channel bandwidth may include four subcarrier unit sets, and the four subcarrier unit sets may constitute one RU, two RUs, three RUs, or four RUs. This embodiment of this application is not limited thereto. For an example of RU distribution, refer to the following descriptions in FIG. 4.

For example, values of index numbers of data subcarriers and pilot subcarriers corresponding to the four subcarrier unit sets are [−161:−2, 2:161], every two pilot subcarriers are spaced by 19 data subcarriers, and correspondingly, index numbers of 16 pilot subcarriers are [−159, −130, −110, −90, −70, −50, −30, −10, 10, 30, 50, 70, 90, 110, 130, 150].

When the channel bandwidth includes M=2 basic bandwidths, namely, a first basic bandwidth and a second basic bandwidth, and is 4.32 GHz, the channel bandwidth may include nine (namely, 2×4+1) subcarrier unit sets. The nine subcarrier unit sets include four subcarrier unit sets corresponding to the first basic bandwidth, four subcarrier unit sets corresponding to the second basic bandwidth, and one subcarrier unit set that constitutes a center RU. The nine subcarrier unit sets may constitute three RUs, five RUs, seven RUs, or nine RUs. This embodiment of this application is not limited thereto. For an example of RU distribution, refer to the following descriptions in FIG. 6.

For example, values of index numbers of data subcarriers and pilot subcarriers corresponding to the nine subcarrier unit sets are [−361:−2, 2:361], every two pilot subcarriers are spaced by 19 data subcarriers, and correspondingly, index numbers of 36 pilot subcarriers are [−350, −330, −310, −290, −270, −250, −230, −210, −190, −170, −150, −130, −110, −90, −70, −50, −30, −10, 10, 30, 50, 70, 90, 110, 130, 159, 180, 190, 210, 230, 250, 270, 290, 310, 330, 350].

When the channel bandwidth includes M=3 basic bandwidths, which are a first basic bandwidth, a second basic bandwidth, and a third basic bandwidth, and is 6.48 GHz, the channel bandwidth may include 14 (namely, 3×4+2) subcarrier unit sets. The 14 subcarrier unit sets include four subcarrier unit sets corresponding to the first basic bandwidth, four subcarrier unit sets corresponding to the second basic bandwidth, four subcarrier unit sets corresponding to the third basic bandwidth, and two subcarrier unit sets that constitute two center RUs. Specifically, the 14 subcarrier unit sets may constitute five RUs, eight RUs, 11 RUs, or 14 RUs. This embodiment of this application is not limited thereto. Specifically, for RU distribution, refer to the following descriptions in FIG. 8.

For example, values of index numbers of data subcarriers and pilot subcarriers corresponding to the 14 subcarrier unit sets are [−561:−2, 2:561], every two pilot subcarriers are spaced by 19 data subcarriers, and correspondingly, index numbers of 56 pilot subcarriers are [−550, −530, −510, −490, −470, −450, −430, −410, −390, −370, −350, −330, −310, −290, −270, −250, −230, −210, −190, −170, −150, −130, −110, −90, −70, −50, −30, −10, 10, 30, 50, 70, 90, 110, 130, 150, 170, 190, 210, 230, 250, 270, 290, 310, 330, 350, 370, 390, 410, 430, 450, 470, 490, 510, 530, 550].

When the channel bandwidth includes M=4 basic bandwidths, which are a first basic bandwidth, a second basic bandwidth, a third basic bandwidth, and a fourth basic bandwidth, and is 8.64 GHz, the channel bandwidth may include 19 (namely, 4×4+3) subcarrier unit sets. The 19 subcarrier unit sets include four subcarrier unit sets corresponding to the first basic bandwidth, four subcarrier unit sets corresponding to the second basic bandwidth, four subcarrier unit sets corresponding to the third basic bandwidth, four subcarrier unit sets corresponding to the fourth basic bandwidth, and three subcarrier unit sets that constitute three center RUs. Specifically, the 19 subcarrier unit sets may constitute seven RUs, 11 RUs, 15 RUs, or 19 RUs. This embodiment of this application is not limited thereto. For an example of RU distribution, refer to the following descriptions in FIG. 10.

For example, values of index numbers of data subcarriers and pilot subcarriers corresponding to the 19 subcarrier unit sets are [−801:−2, 2:801], every two pilot subcarriers are spaced by 19 data subcarriers, and correspondingly, index numbers of 76 pilot subcarriers are [−790, −770, −750, −730, −710, −690, −670, −650, −630, −610, −590, −570, −550, −530, −510, −490, −470, −450, −430, −410, −390, −350, −330, −310, −290, −270, −250, −230, −210, −190, −170, −150, −130, −110, −90, −70, −50, −30, −10, 10, 30, 50, 70, 90, 110, 130, 150, 170, 190, 210, 230, 250, 270, 290, 310, 330, 350, 390, 410, 430, 450, 470, 490, 510, 530, 550, 570, 590, 610, 630, 650, 670, 690, 710, 730, 750, 770, 790].

It should be understood that in this embodiment of this application, a number of subcarriers included in one subcarrier unit set is not limited to 84 or 80. One subcarrier unit set may alternatively include another number of subcarriers, or may include another number of pilot subcarriers. This embodiment of this application is not limited thereto. For example, in actual application, one subcarrier unit set includes 82, 86, 70, or 88 subcarriers.

In this embodiment of this application, the subcarrier unit set is set to the 80 subcarriers, to help design a short training field sequence and a channel estimation field sequence with a low peak to average power ratio (peak to average power ratio, PAPR).

The following merely uses an example in which one subcarrier unit set includes 84 subcarriers or 80 subcarriers to describe RU division in the channel bandwidth in this embodiment of this application. For a case in which the subcarrier unit set includes another number of subcarriers, refer to the example in which the subcarrier unit set includes the 84 or 80 subcarriers.

For ease of description, the following definitions are first provided in this embodiment of this application.

One subcarrier unit set constitutes one first RU, two subcarrier unit sets with consecutive frequencies constitute one second RU, three subcarrier unit sets with consecutive frequencies constitute one third RU, and four subcarrier unit sets with consecutive frequencies constitute one fourth RU.

When the channel bandwidth includes M basic bandwidths, the at least one RU obtained by dividing the channel bandwidth may include M parts of RUs and M−1 center RUs (central RU or center RU). The M parts of RUs are separated by the M−1 center RUs. The M parts of RUs are in a one-to-one correspondence with the M basic bandwidths.

Figure 2:
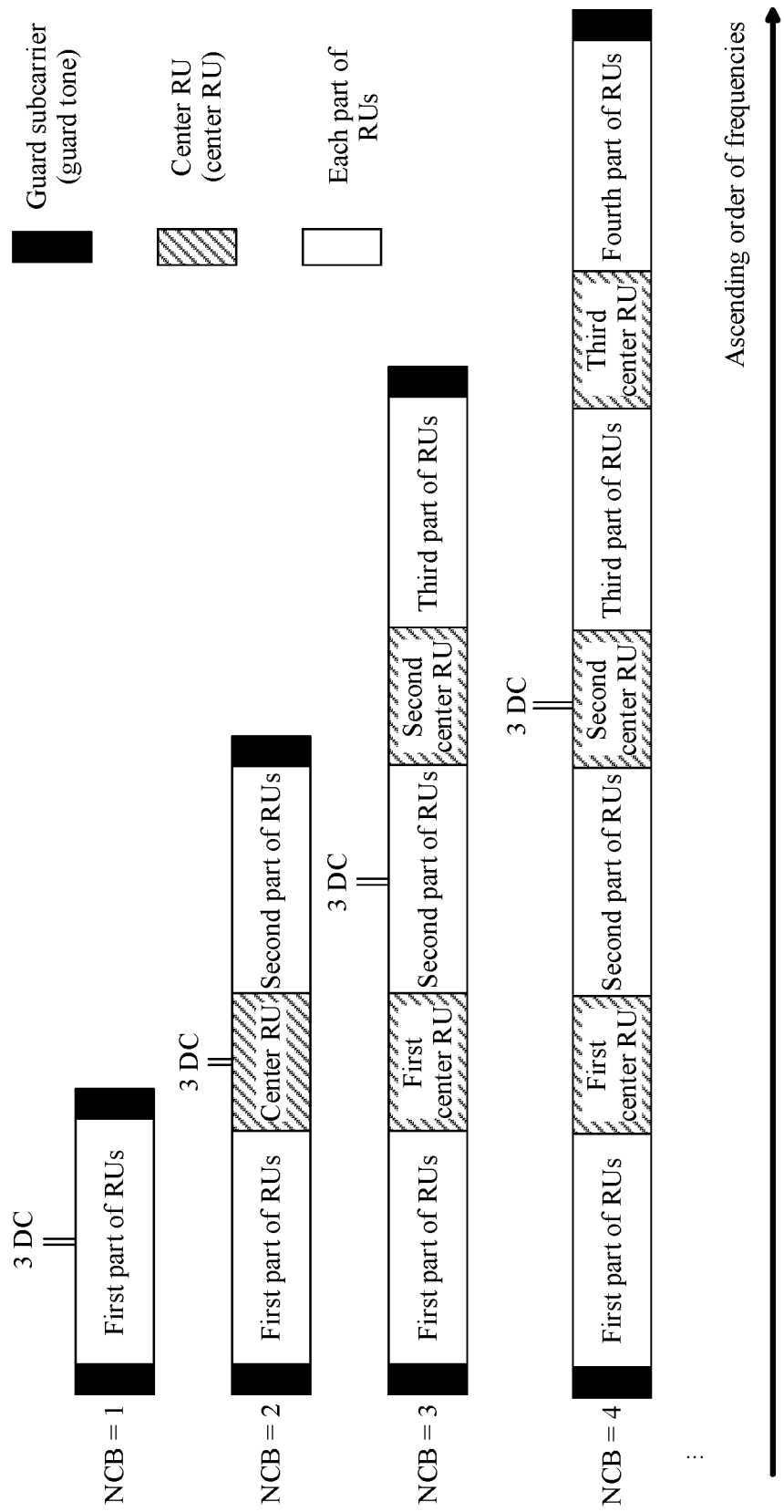
FIG. 2 is a schematic diagram of RU distribution according to an embodiment of this application.

As shown in FIG. 2, when the channel bandwidth includes M=1 basic bandwidth, and is 2.16 GHz, the at least one RU obtained by dividing the channel bandwidth includes a first part of RUs, but does not include a center RU.

When the channel bandwidth includes M=2 basic bandwidths, and is 4.32 GHz, the at least one RU obtained by dividing the channel bandwidth includes a first part of RUs, a second part of RUs, and one center RU. A frequency of the first part of RUs is lower than that of the center RU; and a frequency of the second part of RUs is higher than that of the center RU.

When the channel bandwidth includes M=3 basic bandwidths, and is 6.48 GHz, the at least one RU obtained by dividing the channel bandwidth includes a first part of RUs, a second part of RUs, a third part of RUs, a first center RU, and a second center RU. A frequency of the first part of RUs is lower than that of the first center RU; a frequency of the second part of RUs is higher than that of the first center RU, and the frequency of the second part of RUs is lower than that of the second center RU; and a frequency of the third part of RUs is higher than that of the second center RU.

When the channel bandwidth includes M=4 basic bandwidths, and is 8.64 GHz, the at least one RU obtained by dividing the channel bandwidth includes a first part of RUs, a second part of RUs, a third part of RUs, a fourth part of RUs, a first center RU, a second center RU, and a third center RU. A frequency of the first part of RUs is lower than that of the first center RU; a frequency of the second part of RUs is higher than that of the first center RU, and the frequency of the second part of RUs is lower than that of the second center RU; a frequency of the third part of RUs is higher than that of the second center RU, and the frequency of the third part of RUs is lower than that of the third center RU; and a frequency of the fourth part of RUs is higher than that of the third center RU.

The following describes, in detail by using an example, a size of at least one RU obtained by dividing different channel bandwidths and a location of the at least one RU in frequency domain.

Optionally, in an implementation, when the channel bandwidth includes M=1 basic bandwidth, and is 2.16 GHz, the at least one RU obtained by dividing the one basic bandwidth includes a first part of RUs.

The first part of RUs is:
  four RUs each including one subcarrier unit set; or
  two RUs each including one subcarrier unit set, and one RU including two subcarrier unit sets; or two RUs each including two subcarrier unit sets; or
  one RU including one subcarrier unit set, and one RU including three subcarrier
  unit sets; or
  one RU including four subcarrier unit sets.

Specifically, the first part of RUs in ascending order of frequencies is:
  four first RUs; or
  one second RU, one first RU, and one first RU; or
  one first RU, one second RU, and one first RU; or
  one first RU, one first RU, and one second RU; or
  one second RU and one second RU; or
  one third RU and one first RU; or
  one first RU and one third RU; or
  one fourth RU.

Figure 3:
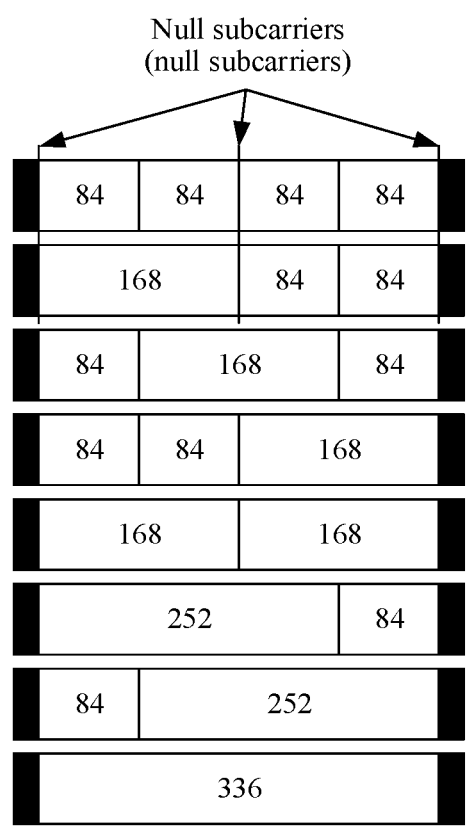
FIG. 3 is a schematic diagram of RU distribution according to another embodiment of this application.

For example, as shown in FIG. 3, when the channel bandwidth is 2.16 GHz, and one subcarrier unit set includes 84 subcarriers, from top to bottom, namely, from the first row to the eighth row, in an order from left to right (namely, in ascending order of frequencies), the first part of RUs includes the following eight possible resource allocation manners:
  four first RUs each including one subcarrier unit set (84 subcarriers); or
  one second RU including two subcarrier unit sets (168 subcarriers), and two first RUs each including one subcarrier unit set (84 subcarriers); or
  one first RU including one subcarrier unit set (84 subcarriers), one second RU including two subcarrier unit sets (168 subcarriers), and one first RU including one subcarrier unit set (84 subcarriers); or
  two first RUs each including one subcarrier unit set (84 subcarriers), and one second RU including two subcarrier unit sets (168 subcarriers); or
  two second RUs each including two subcarrier unit sets (168 subcarriers); or
  one third RU including three subcarrier unit sets (252 subcarriers), and one first RU including one subcarrier unit set (84 subcarriers); or
  one first RU including one subcarrier unit set (84 subcarriers), and one third RU including three subcarrier unit sets (252 subcarriers); or
  one fourth RU including four subcarrier unit sets (336 subcarriers).

Figure 4:
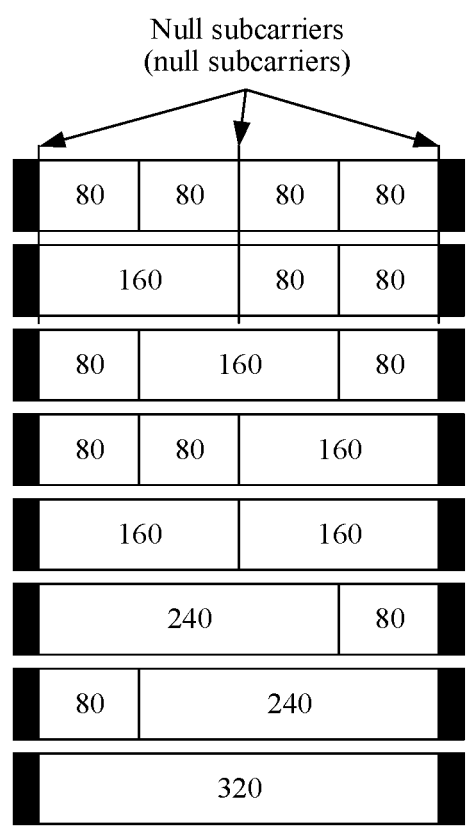
FIG. 4 is a schematic diagram of RU distribution according to another embodiment of this application.

For another example, as shown in FIG. 4, when the channel bandwidth is 2.16 GHz, and one subcarrier unit set includes 80 subcarriers, from top to bottom, namely, from the first row to the eighth row, in an order from left to right (namely, in ascending order of frequencies), the first part of RUs includes the following eight possible resource allocation manners:
  four first RUs each including one subcarrier unit set (80 subcarriers); or
  one second RU including two subcarrier unit sets (160 subcarriers), and two first RUs each including one subcarrier unit set (80 subcarriers); or
  one first RU including one subcarrier unit set (80 subcarriers), one second RU including two subcarrier unit sets (160 subcarriers), and one first RU including one subcarrier unit set (80 subcarriers); or
  two first RUs each including one subcarrier unit set (80 subcarriers), and one second RU including two subcarrier unit sets (160 subcarriers); or
  two second RUs each including two subcarrier unit sets (160 subcarriers); or
  one third RU including three subcarrier unit sets (240 subcarriers), and one first RU including one subcarrier unit set (80 subcarriers); or
  one first RU including one subcarrier unit set (80 subcarriers), and one third RU including three subcarrier unit sets (240 subcarriers); or
  one fourth RU including four subcarrier unit sets (320 subcarriers).

Optionally, in an implementation, when the channel bandwidth includes M=2 basic bandwidths, which include a first basic bandwidth and a second basic bandwidth, and is 4.32 GHz, the at least one RU obtained by dividing the two basic bandwidths includes a first part of RUs, a second part of RUs, and one center RU. A frequency of the first part of RUs is lower than that of the center RU, and corresponds to the first basic bandwidth; and a frequency of the second part of RUs is higher than that of the center RU, and corresponds to the second basic bandwidth. In other words, the first part of RUs is located on a left side of the center RU, and the second part of RUs is located on a right side of the center RU. In other words, the center RU is located between the first part of RUs and the second part of RUs.

The first part of RUs and the second part of RUs each include:
 four RUs each including one subcarrier unit set; or
 two RUs each including one subcarrier unit set, and one RU including two subcarrier unit sets; or
 two RUs each including two subcarrier unit sets; or
 one RU including one subcarrier unit set, and one RU including three subcarrier unit sets; or
 one RU including four subcarrier unit sets.

Specifically, the first part of RUs and the second part of RUs in ascending order of frequencies each include:
 four first RUs; or
 one second RU, one first RU, and one first RU; or
 one first RU, one second RU, and one first RU; or
 one first RU, one first RU, and one second RU; or
 one second RU and one second RU; or
 one third RU and one first RU; or
 one first RU and one third RU; or
 one fourth RU.

A number of subcarriers on the center RU is the same as a number of subcarriers in one subcarrier unit set, the first half of subcarriers on the center RU is located on a left side of a direct current subcarrier and includes two pilot subcarriers, and the second half of subcarriers on the center RU is located on a right side of the direct current subcarrier and includes two pilot subcarriers.

It should be noted that a size and a location that are of an RU included in the first part of RUs may be different from a size and a location that are of an RU included in the second part of RUs, and the size and the location that are of the RU included in the first part of RUs may be combined with the size and the location that are of the RU included in the second part of RUs. To be specific, the first part of RUs may correspond to any one of the allocation manners in the first row to the eighth row, and the second part of RUs may also correspond to any one of the allocation manners in the first row to the eighth row. For example, the first part of RUs includes two RUs each including two subcarrier unit sets, and corresponds to the allocation manner in the fifth row, and the second part of RUs includes one RU including four subcarrier unit sets, and corresponds to the allocation manner in the eighth row.

Figure 5:
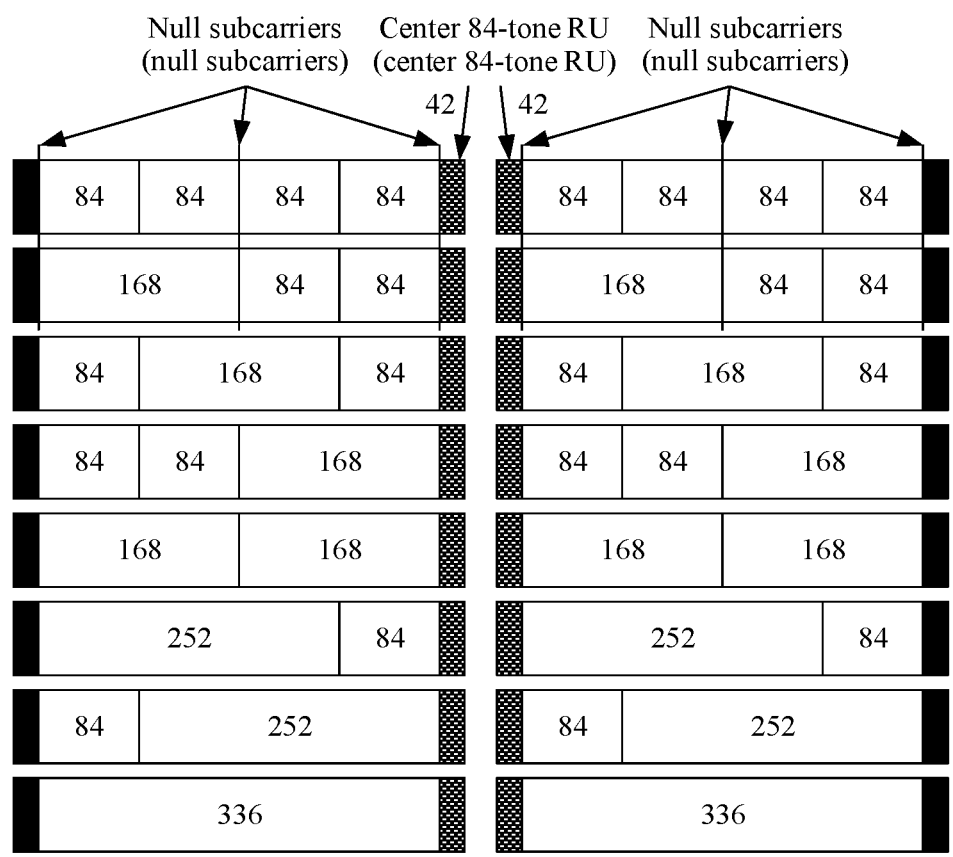
FIG. 5 is a schematic diagram of RU distribution according to another embodiment of this application.

For example, as shown in FIG. 5, when the channel bandwidth is 4.32 GHz, and one subcarrier unit set includes 84 subcarriers, from top to bottom, namely, from the first row to the eighth row, in an order from left to right (namely, in ascending order of frequencies), the first part of RUs and the second part of RUs each include the following eight possible resource allocation manners:
 four first RUs each including one subcarrier unit set (84 subcarriers); or
 one second RU including two subcarrier unit sets (168 subcarriers), and two first RUs each including one subcarrier unit set (84 subcarriers); or
 one first RU including one subcarrier unit set (84 subcarriers), one second RU including two subcarrier unit sets (168 subcarriers), and one first RU including one subcarrier unit set (84 subcarriers); or
 two first RUs each including one subcarrier unit set (84 subcarriers), and one second RU including two subcarrier unit sets (168 subcarriers); or
 two second RUs each including two subcarrier unit sets (168 subcarriers); or
 one third RU including three subcarrier unit sets (252 subcarriers), and one first RU including one subcarrier unit set (84 subcarriers); or
 one first RU including one subcarrier unit set (84 subcarriers), and one third RU including three subcarrier unit sets (252 subcarriers); or
 one fourth RU including four subcarrier unit sets (336 subcarriers).

The center RU is an RU including 84 subcarriers, and is located between the first part of RUs and the second part of RUs. The first half of subcarriers (42 subcarriers) on the center RU is located on a left side of a direct current subcarrier and includes two pilot subcarriers that are spaced by 20 data subcarriers. The second half of subcarriers (42 subcarriers) on the center RU is located on a right side of the direct current subcarrier and includes two pilot subcarriers that are spaced by 20 data subcarriers.

It may be understood that RU distribution in the first row to the eighth row of the first part of RUs may be randomly combined with RU distribution in the first row to the eighth row of the second part of RUs. For example, the first part of RUs may be in the first row in FIG. 5, and the second part of RUs may be in the third row in FIG. 5.

Figure 6:
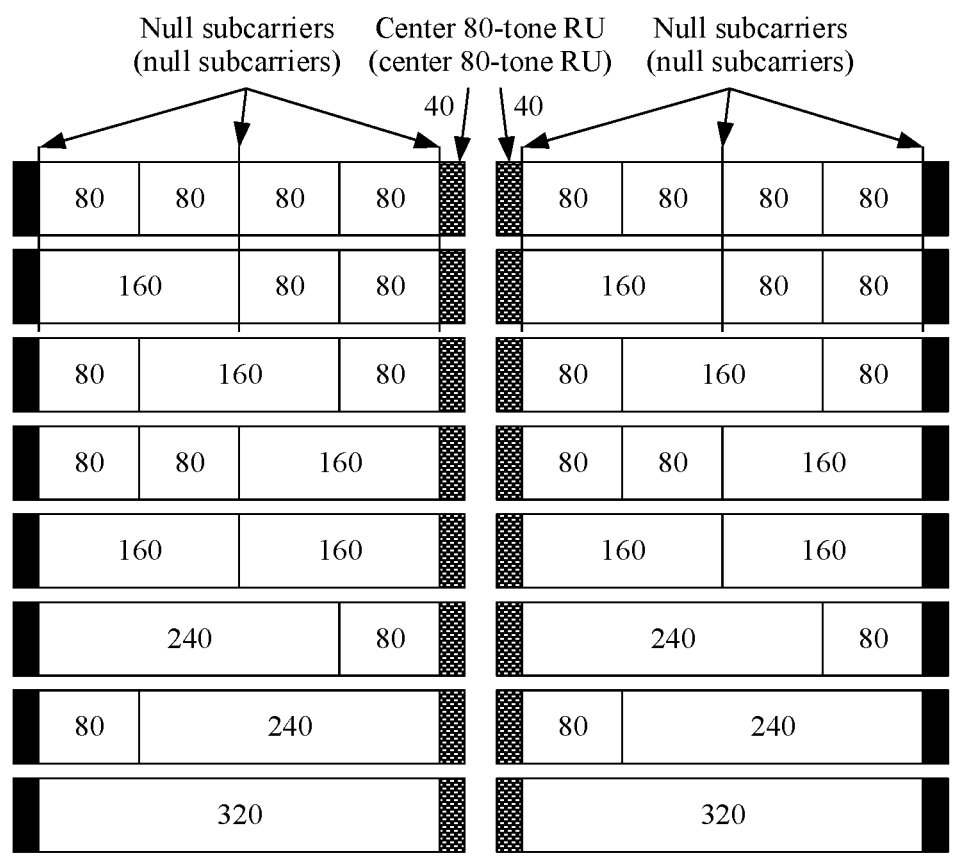
FIG. 6 is a schematic diagram of RU distribution according to another embodiment of this application.

For another example, as shown in FIG. 6, when the channel bandwidth is 4.32 GHz, and one subcarrier unit set includes 80 subcarriers, from top to bottom, namely, from the first row to the eighth row, in an order from left to right (namely, in ascending order of frequencies), the first part of RUs and the second part of RUs each include the following eight possible resource allocation manners:
 four first RUs each including one subcarrier unit set (80 subcarriers); or
 one second RU including two subcarrier unit sets (160 subcarriers), and two first RUs each including one subcarrier unit set (80 subcarriers); or
 one first RU including one subcarrier unit set (80 subcarriers), one second RU including two subcarrier unit sets (160 subcarriers), and one first RU including one subcarrier unit set (80 subcarriers); or
 two first RUs each including one subcarrier unit set (80 subcarriers), and one second RU including two subcarrier unit sets (160 subcarriers); or
 two second RUs each including two subcarrier unit sets (160 subcarriers); or
 one third RU including three subcarrier unit sets (240 subcarriers), and one first RU including one subcarrier unit set (80 subcarriers); or
 one first RU including one subcarrier unit set (80 subcarriers), and one third RU including three subcarrier unit sets (240 subcarriers); or
 one fourth RU including four subcarrier unit sets (320 subcarriers).

The center RU is an RU including 80 subcarriers, and is located between the first part of RUs and the second part of RUs. The first half of subcarriers (40 subcarriers) on the center RU is located on a left side of a direct current subcarrier and includes two pilot subcarriers that are spaced by 19 data subcarriers. The second half of subcarriers (40 subcarriers) on the center RU is located on a right side of the direct current subcarrier and includes two pilot subcarriers that are spaced by 19 data subcarriers.

It may be understood that RU distribution in the first row to the eighth row of the first part of RUs may be randomly combined with RU distribution in the first row to the eighth row of the second part of RUs. For example, the first part of RUs may be in the first row in FIG. 6, and the second part of RUs may be in the third row in FIG. 6.

Optionally, in an implementation, when the channel bandwidth includes M=3 basic bandwidths, which are a first basic bandwidth, a second basic bandwidth, and a third basic bandwidth, and is 6.48 GHz, the at least one RU includes a first part of RUs, a second part of RUs, a third part of RUs, a first center RU, and a second center RU. A frequency of the first part of RUs is lower than that of the first center RU, and corresponds to the first basic bandwidth; a frequency of the second part of RUs is higher than that of the first center RU, and the frequency of the second part of RUs is lower than that of the second center RU and corresponds to the second basic bandwidth; and a frequency of the third part of RUs is higher than that of the second center RU, and corresponds to the third basic bandwidth. In other words, the first part of RUs is located on a left side of the first center RU, the second part of RUs is located on a right side of the first center RU, the second part of RUs is located on a left side of the second center RU, and the third part of RUs is located on a right side of the second center RU. In other words, the first center RU is located between the first part of RUs and the second part of RUs, and the second center RU is located between the second part of RUs and the third part of RUs.

The first part of RUs, the second part of RUs, and the third part of RUs each include:
four RUs each including one subcarrier unit set; or
two RUs each including one subcarrier unit set, and one RU including two subcarrier unit sets; or
two RUs each including two subcarrier unit sets; or
one RU including one subcarrier unit set, and one RU including three subcarrier unit sets; or
one RU including four subcarrier unit sets.

Specifically, the first part of RUs, the second part of RUs, and the third part of RUs in ascending order of frequencies each include:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

The first center RU is one subcarrier unit set; and the second center RU is one subcarrier unit set.

Sizes and locations of RUs included in the first part of RUs to the third part of RUs may be the same, or may not be completely the same, or may be completely different. The sizes and locations of the RUs included in the three parts of RUs may be combined with each other. To be specific, the first part of RUs may correspond to any one of the allocation manners in the first row to the eighth row, the second part of RUs may also correspond to any one of the allocation manners in the first row to the eighth row, and the third part of RUs may also correspond to any one of the allocation manners in the first row to the eighth row. For example, the first part of RUs includes two RUs each including two subcarrier unit sets, the second part of RUs includes one RU including four subcarrier unit sets, the third part of RUs includes one RU including one subcarrier unit set and one RU including three subcarrier unit sets.

Figure 7:
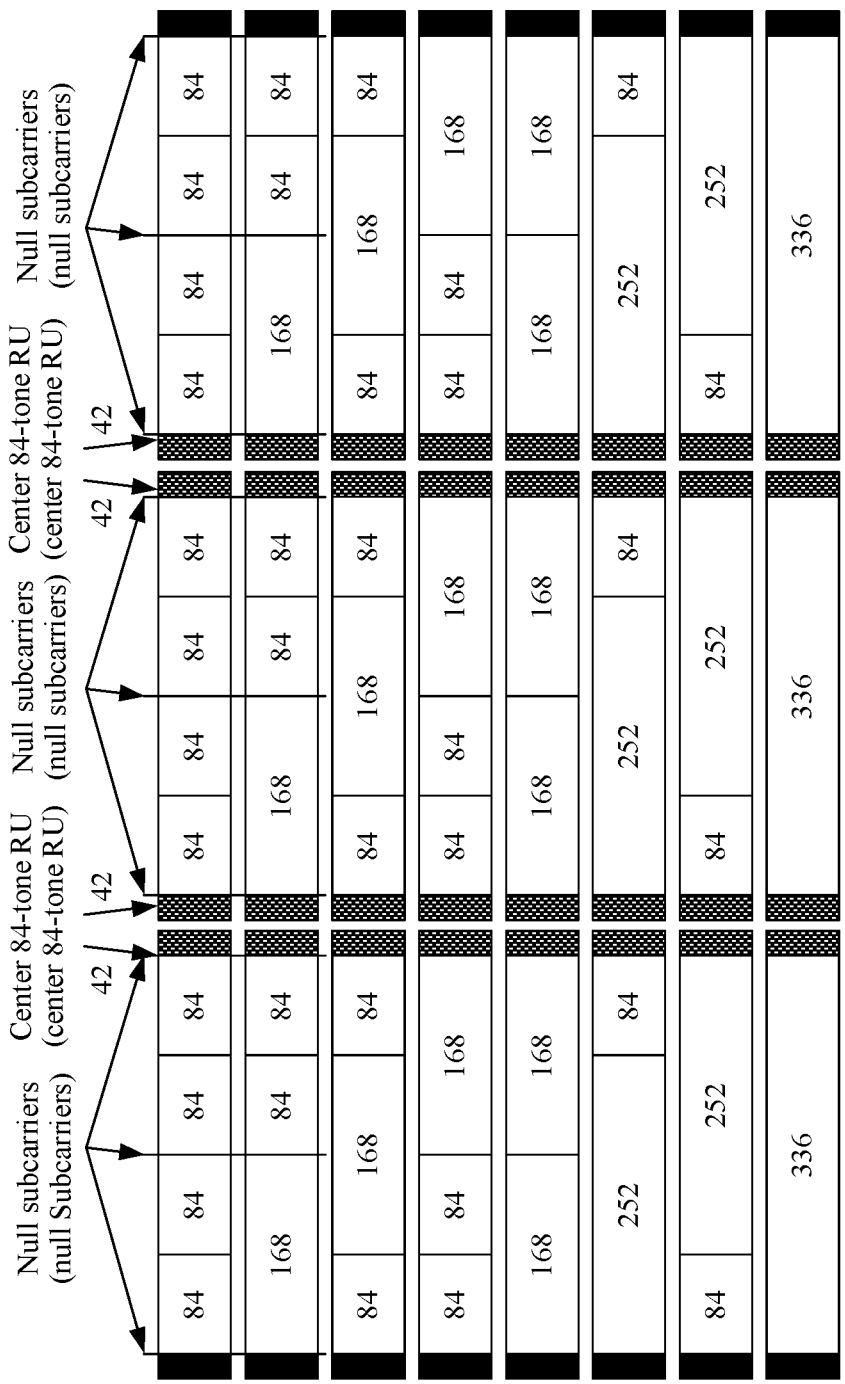
FIG. 7 is a schematic diagram of RU distribution according to another embodiment of this application.

For example, as shown in FIG. 7, when the channel bandwidth is 6.48 GHz, and one subcarrier unit set includes 84 subcarriers, from top to bottom, namely, from the first row to the eighth row, in an order from left to right (namely, in ascending order of frequencies), the first part of RUs, the second part of RUs, and the third part of RUs each include the following eight possible resource allocation manners:
four first RUs each including one subcarrier unit set (84 subcarriers); or
one second RU including two subcarrier unit sets (168 subcarriers), and two first RUs each including one subcarrier unit set (84 subcarriers); or
one first RU including one subcarrier unit set (84 subcarriers), one second RU including two subcarrier unit sets (168 subcarriers), and one first RU including one subcarrier unit set (84 subcarriers); or
two first RUs each including one subcarrier unit set (84 subcarriers), and one second RU including two subcarrier unit sets (168 subcarriers); or
two second RUs each including two subcarrier unit sets (168 subcarriers); or
one third RU including three subcarrier unit sets (252 subcarriers), and one first RU including one subcarrier unit set (84 subcarriers); or
one first RU including one subcarrier unit set (84 subcarriers), and one third RU including three subcarrier unit sets (252 subcarriers); or
one fourth RU including four subcarrier unit sets (336 subcarriers).

The first center RU is an RU including one subcarrier unit set, namely, 84 subcarriers; and the second center RU is an RU including one subcarrier unit set, namely, 84 subcarriers.

It may be understood that in actual application, the first rows to the eighth rows of the three parts of RUs may be randomly combined. For example, the first part of RUs may be in the first row in FIG. 7, the second part of RUs may be in the third row in FIG. 7, and the third part of RUs may be in the sixth row in FIG. 7.

Figure 8:
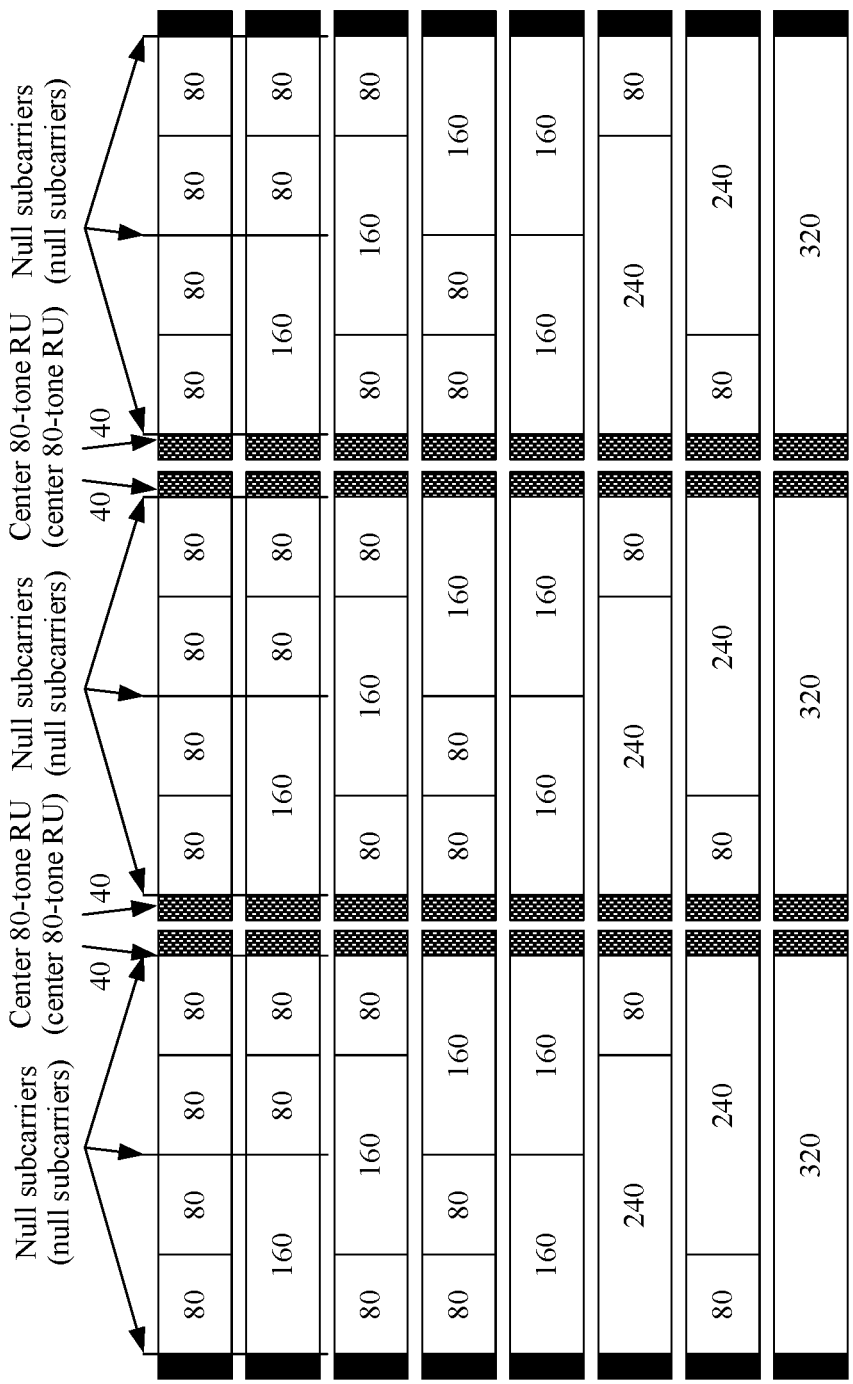
FIG. 8 is a schematic diagram of RU distribution according to another embodiment of this application.

For another example, as shown in FIG. 8, when the channel bandwidth is 4.32 GHz, and one subcarrier unit set includes 80 subcarriers, from top to bottom, namely, from the first row to the eighth row, in an order from left to right (namely, in ascending order of frequencies), the first part of RUs, the second part of RUs, and the third part of RUs each include the following eight possible resource allocation manners:
four first RUs each including one subcarrier unit set (80 subcarriers); or
one second RU including two subcarrier unit sets (160 subcarriers), and two first RUs each including one subcarrier unit set (80 subcarriers); or
one first RU including one subcarrier unit set (80 subcarriers), one second RU including two subcarrier unit sets (160 subcarriers), and one first RU including one subcarrier unit set (80 subcarriers); or
two first RUs each including one subcarrier unit set (80 subcarriers), and one second RU including two subcarrier unit sets (160 subcarriers); or
two second RUs each including two subcarrier unit sets (160 subcarriers); or
one third RU including three subcarrier unit sets (240 subcarriers), and one first RU including one subcarrier unit set (80 subcarriers); or
one first RU including one subcarrier unit set (80 subcarriers), and one third RU including three subcarrier unit sets (240 subcarriers); or
one fourth RU including four subcarrier unit sets (320 subcarriers).

The first center RU is an RU including one subcarrier unit set, namely, 80 subcarriers; and the second center RU is an RU including one subcarrier unit set, namely, 80 subcarriers.

It may be understood that the first rows to the eighth rows of the three parts of RUs may be randomly combined. For example, the first part of RUs may be in the first row in FIG. 8, the second part of RUs may be in the third row in FIG. 8, and the third part of RUs may be in the sixth row in FIG. 8.

Optionally, in an implementation, when the channel bandwidth includes M=4 basic bandwidths, which are a first basic bandwidth, a second basic bandwidth, a third basic bandwidth, and a fourth basic bandwidth, and is 8.64 GHz, the at least one RU includes a first part of RUs, a second part of RUs, a third part of RUs, a fourth part of RUs, a first center RU, a second center RU, and a third center RU. A frequency of the first part of RUs is lower than that of the first center RU, and corresponds to the first basic bandwidth; a frequency of the second part of RUs is higher than that of the first center RU, and the frequency of the second part of RUs is lower than that of the second center RU and corresponds to the second basic bandwidth; a frequency of the third part of RUs is higher than that of the second center RU, and the frequency of the third part of RUs is lower than that of the third center RU and corresponds to the third basic bandwidth; and a frequency of the fourth part of RUs is higher than that of the third center RU, and corresponds to the fourth basic bandwidth. In other words, the first part of RUs is located on a left side of the first center RU, the second part of RUs is located on a right side of the first center RU, the second part of RUs is located on a left side of the second center RU, the third part of RUs is located on a right side of the second center RU, the third part of RUs is located on a left side of the third center RU, and the fourth part of RUs is located on a right side of the third center RU. In other words, the first center RU is located between the first part of RUs and the second part of RUs, the second center RU is located between the second part of RUs and the third part of RUs, and the third center RU is located between the third part of RUs and the fourth part of RUs.

The first part of RUs, the second part of RUs, the third part of RUs, and the fourth part of RUs each include:
  four RUs each including one subcarrier unit set; or
  two RUs each including one subcarrier unit set, and one RU including two subcarrier unit sets; or
  two RUs each including two subcarrier unit sets; or
  one RU including one subcarrier unit set, and one RU including three subcarrier unit sets; or
  one RU including four subcarrier unit sets.

Specifically, the first part of RUs, the second part of RUs, the third part of RUs, and the fourth part of RUs in ascending order of frequencies each include:
  four first RUs; or
  one second RU, one first RU, and one first RU; or
  one first RU, one second RU, and one first RU; or
  one first RU, one first RU, and one second RU; or
  one second RU and one second RU; or
  one third RU and one first RU; or
  one first RU and one third RU; or
  one fourth RU.

The first center RU is one subcarrier unit set; the third center RU is one subcarrier unit set; and a number of subcarriers on the second center RU is the same as a number of subcarriers in one subcarrier unit set, the first half of subcarriers on the second center RU is located on a left side of a direct current subcarrier and includes two pilot subcarriers, and the second half of subcarriers on the second center RU is located on a right side of the direct current subcarrier and includes two pilot subcarriers.

It should be noted that sizes and locations of RUs included in the first part of RUs to the fourth part of RUs may be the same, or may not be completely the same, or may be completely different. The sizes and locations of the RUs included in the four parts of RUs may be combined with each other. To be specific, the first part of RUs may correspond to any one of the allocation manners in the first row to the eighth row, the second part of RUs may also correspond to any one of the allocation manners in the first row to the eighth row, the third part of RUs may also correspond to any one of the allocation manners in the first row to the eighth row, and the fourth part of RUs may also correspond to any one of the allocation manners in the first row to the eighth row. For example, the first part of RUs includes two RUs each including two subcarrier unit sets, the second part of RUs includes one RU including four subcarrier unit sets, the third part of RUs includes one RU including one subcarrier unit set and one RU including three subcarrier unit sets, and the fourth part of RUs includes two RUs each including two subcarrier unit sets.

Figure 9:
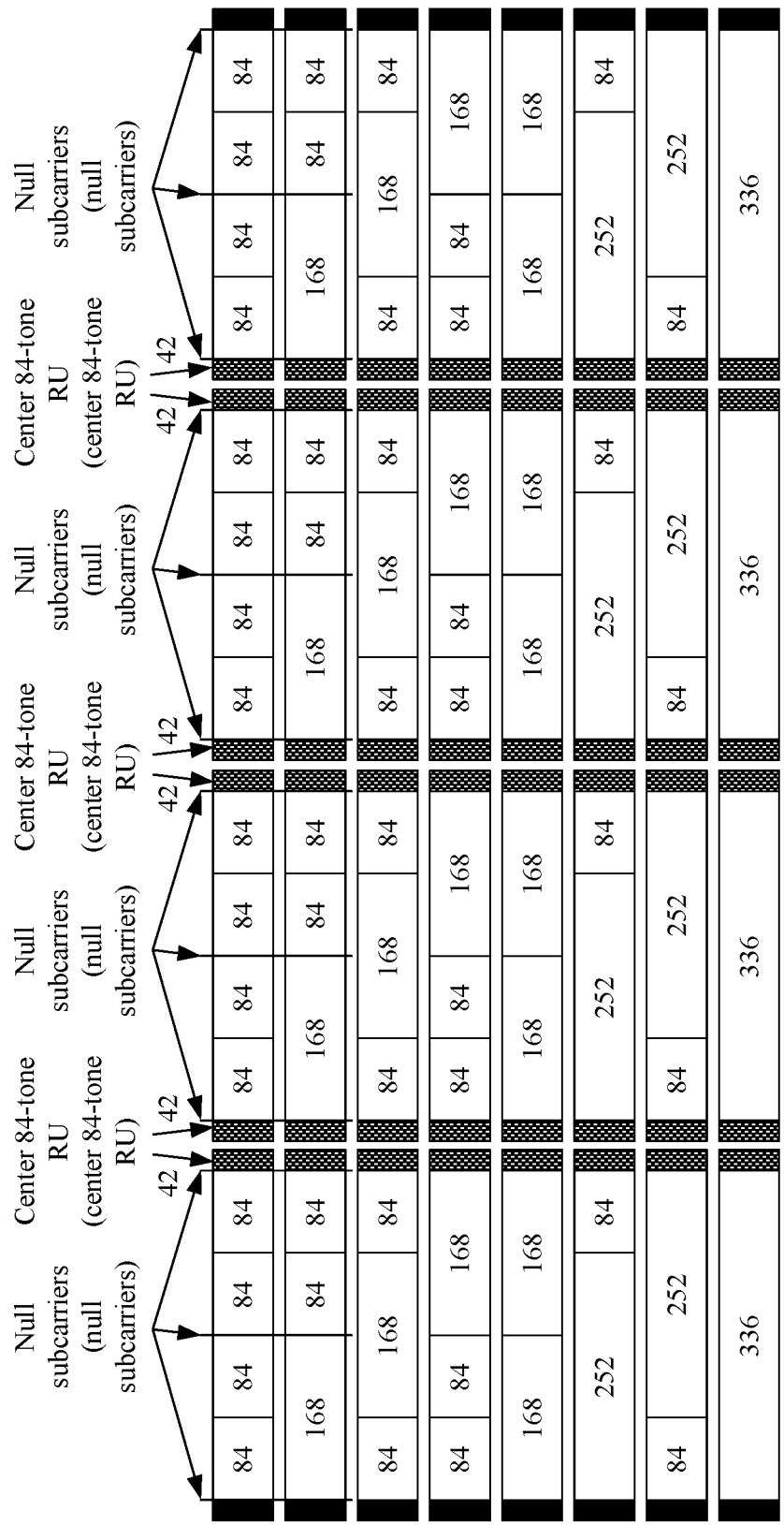
FIG. 9 is a schematic diagram of RU distribution according to another embodiment of this application.

For example, as shown in FIG. 9, when the channel bandwidth is 8.64 GHz, and one subcarrier unit set includes 84 subcarriers, from top to bottom, namely, from the first row to the eighth row, in an order from left to right (namely, in ascending order of frequencies), the first part of RUs, the second part of RUs, the third part of RUs, and the fourth part of RUs each include the following eight possible resource allocation manners:
  four first RUs each including one subcarrier unit set (84 subcarriers); or
  one second RU including two subcarrier unit sets (168 subcarriers), and two first RUs each including one subcarrier unit set (84 subcarriers); or
  one first RU including one subcarrier unit set (84 subcarriers), one second RU including two subcarrier unit sets (168 subcarriers), and one first RU including one subcarrier unit set (84 subcarriers); or
  two first RUs each including one subcarrier unit set (84 subcarriers), and one second RU including two subcarrier unit sets (168 subcarriers); or
  two second RUs each including two subcarrier unit sets (168 subcarriers); or
  one third RU including three subcarrier unit sets (252 subcarriers), and one first RU including one subcarrier unit set (84 subcarriers); or
  one first RU including one subcarrier unit set (84 subcarriers), and one third RU including three subcarrier unit sets (252 subcarriers); or
  one fourth RU including four subcarrier unit sets (336 subcarriers).

The first center RU is one subcarrier unit set, namely, 84 subcarriers; the third center RU is one subcarrier unit set, namely, 84 subcarriers; and a number of subcarriers on the second center RU is the same as a number of subcarriers in one subcarrier unit set, namely, 84 subcarriers, the first half of subcarriers on the second center RU is located on a left side of a direct current subcarrier and includes two pilot subcarriers, and the second half of subcarriers on the second center RU is located on a right side of the direct current subcarrier and includes two pilot subcarriers.

It may be understood that in actual application, the first rows to the eighth rows of the four parts of RUs may be randomly combined. For example, the first part of RUs may be in the first row in FIG. 9, the second part of RUs may be in the third row in FIG. 9, the third part of RUs may be in the sixth row in FIG. 9, and the fourth part of RUs may be in the fifth row in FIG. 9.

Figure 10:
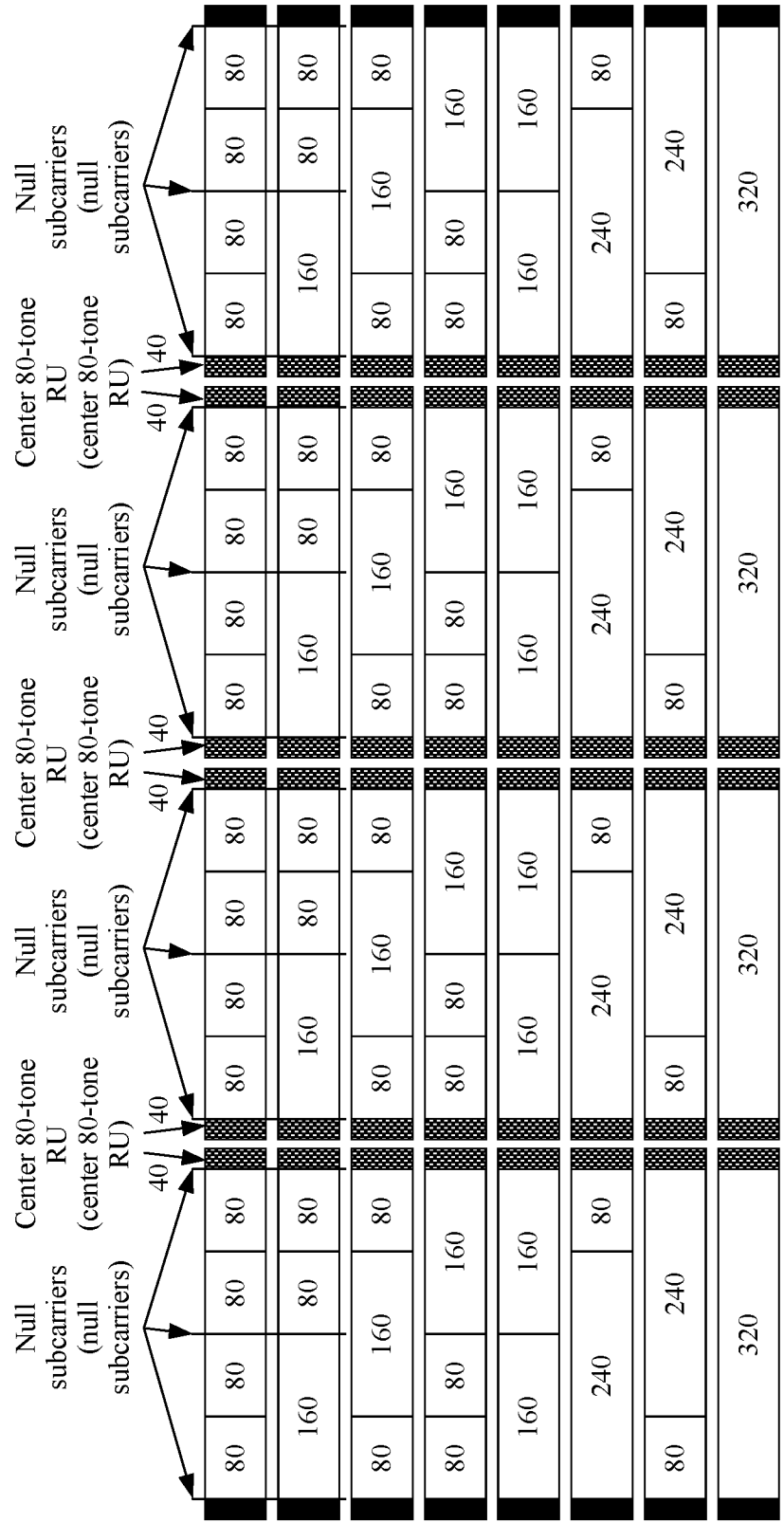
FIG. 10 is a schematic diagram of RU distribution according to another embodiment of this application.

For another example, as shown in FIG. 10, when the channel bandwidth is 8.64 GHz, and one subcarrier unit set includes 80 subcarriers, from top to bottom, namely, from the first row to the eighth row, in an order from left to right (namely, in ascending order of frequencies), the first part of RUs, the second part of RUs, the third part of RUs, and the fourth part of RUs each include the following eight possible resource allocation manners:

four first RUs each including one subcarrier unit set (80 subcarriers); or one second RU including two subcarrier unit sets (160 subcarriers), and two first RUs each including one subcarrier unit set (80 subcarriers); or one first RU including one subcarrier unit set (80 subcarriers), one second RU including two subcarrier unit sets (160 subcarriers), and one first RU including one subcarrier unit set (80 subcarriers); or two first RUs each including one subcarrier unit set (80 subcarriers), and one second RU including two subcarrier unit sets (160 subcarriers); or two second RUs each including two subcarrier unit sets (160 subcarriers); or one third RU including three subcarrier unit sets (240 subcarriers), and one first RU including one subcarrier unit set (80 subcarriers); or one first RU including one subcarrier unit set (80 subcarriers), and one third RU including three subcarrier unit sets (240 subcarriers); or one fourth RU including four subcarrier unit sets (320 subcarriers).

The first center RU is one subcarrier unit set, namely, 80 subcarriers; the third center RU is one subcarrier unit set, namely, 80 subcarriers; and a number of subcarriers on the second center RU is the same as a number of subcarriers in one subcarrier unit set, namely, 80 subcarriers, the first half of subcarriers on the second center RU is located on a left side of a direct current subcarrier and includes two pilot subcarriers, and the second half of subcarriers on the second center RU is located on a right side of the direct current subcarrier and includes two pilot subcarriers.

It may be understood that the first rows to the eighth rows of the four parts of RUs may be randomly combined. For example, the first part of RUs may be in the first row in FIG. 10, the second part of RUs may be in the third row in FIG. 10, the third part of RUs may be in the sixth row in FIG. 10, and the fourth part of RUs may be in the fifth row in FIG. 10.

In the foregoing embodiments, only an example in which the channel bandwidth is 2.16 GHz, 4.32 GHz, 6.48 GHz, or 8.64 GHz is used for description. It is clear that when the channel bandwidth includes M basic bandwidths, and M is greater than 4, for example, the channel bandwidth is 10.8 GHz or 12.96 GHz, an RU division manner is the same as or similar to a case in which M is less than or equal to 4. Details are not described herein again.

Based on the foregoing descriptions, when the subcarrier unit set includes the 84 subcarriers, example distribution of various types of subcarriers that corresponds to different channel bandwidths is shown in Table 1.

To be specific, when the channel bandwidth is 2.16 GHz, a number of data subcarriers (number of data subcarriers, NSD) is 320, a number of pilot subcarriers (number of pilot subcarriers, NSP) is 16, a number of direct current subcarriers (number of DC subcarriers, NDC) is 3, a total number of data subcarriers, pilot subcarriers, and direct current subcarriers (number of total subcarriers, NST) is 339, a subcarrier spacing is 5.15625 MHz, a number of subcarriers included in one subcarrier unit set is 84, an NSD in each subcarrier unit set is 80, and an NSP in each subcarrier unit set is 4.

When the channel bandwidth is 4.32 GHz, an NSD is 720, an NSP is 36, an NDC is 3, an NST is 759, a subcarrier spacing is 5.15625 MHz, a number of subcarriers in one subcarrier unit set is 84, an NSD in each subcarrier unit set is 80, and an NSP in each subcarrier unit set is 4.

When the channel bandwidth is 6.48 GHz, an NSD is 1120, an NSP is 56, an NDC is 3, an NST is 1179, a subcarrier spacing is 5.15625 MHz, a number of subcarriers in one subcarrier unit set is 84, an NSD in each subcarrier unit set is 80, and an NSP in each subcarrier unit set is 4.

When the channel bandwidth is 8.64 GHz, an NSD is 1500, an NSP is 76, an NDC is 3, an NST is 1599, a subcarrier spacing is 5.15625 MHz, a number of subcarriers in one subcarrier unit set is 84, an NSD in each subcarrier unit set is 80, and an NSP in each subcarrier unit set is 4.

TABLE 1

| Parameter | NCB = 1 | NCB = 2 | NCB = 3 | NCB = 4 |
| --- | --- | --- | --- | --- |
| NSD | 320 | 720 | 1120 | 1520 |
| NSP | 16 | 36 | 56 | 76 |
| NDC | 3 | 3 | 3 | 3 |
| NST | 339 | 759 | 1179 | 1599 |
| Subcarrier spacing (subcarrier spacing (MHz)) | 5.15625 | 5.15625 | 5.15625 | 5.15625 |
| Size of a subcarrier unit set | 84 | 84 | 84 | 84 |
| Number of SDs in each subcarrier unit set | 80 | 80 | 80 | 80 |
| Number of SPs in each subcarrier unit set | 4 | 4 | 4 | 4 |

It should be understood that in this embodiment of this application, Table 1 lists an example in which the number of DC subcarriers is 3 and the subcarrier spacing is 5.15625 MHz. However, this embodiment of this application is not limited thereto. In actual application, the number of DC subcarriers in a resource bandwidth may be 5, 7, or the like, and the subcarrier spacing is not limited to 5.15625 MHz.

For another example, based on the foregoing descriptions, when the subcarrier unit set includes the 80 subcarriers, resource distribution corresponding to the channel bandwidth is shown in Table 2.

When the channel bandwidth is 2.16 GHz, an NSD is 304, an NSP is 16, an NDC is 3, an NST is 323, a subcarrier spacing is 5.15625 MHz, a number of subcarriers in one subcarrier unit set is 80, an NSD in each subcarrier unit set is 76, and an NSP in each subcarrier unit set is 4.

When the channel bandwidth is 4.32 GHz, an NSD is 684, an NSP is 36, an NDC is 3, an NST is 723, a subcarrier spacing is 5.15625 MHz, a number of subcarriers in one subcarrier unit set is 80, an NSD in each subcarrier unit set is 76, and an NSP in each subcarrier unit set is 4.

When the channel bandwidth is 6.48 GHz, an NSD is 1064, an NSP is 56, an NDC is 3, an NST is 1123, a subcarrier spacing is 5.15625 MHz, a number of subcarriers in one subcarrier unit set is 80, an NSD in each subcarrier unit set is 76, and an NSP in each subcarrier unit set is 4.

When the channel bandwidth is 8.64 GHz, an NSD is 1520, an NSP is 80, an NDC is 3, an NST is 1603, a subcarrier spacing is 5.15625 MHz, a number of subcarriers in one subcarrier unit set is 80, an NSD in each subcarrier unit set is 76, and an NSP in each subcarrier unit set is 4.

TABLE 2

| Parameter | NCB = 1 | NCB = 2 | NCB = 3 | NCB = 4 |
|---|---|---|---|---|
| NSD | 304 | 684 | 1064 | 1520 |
| NSP | 16 | 36 | 56 | 80 |
| NDC | 3 | 3 | 3 | 3 |
| NST | 323 | 723 | 1123 | 1603 |
| Subcarrier spacing (subcarrier spacing (MHz)) | 5.15625 | 5.15625 | 5.15625 | 5.15625 |
| Size of a subcarrier unit set | 80 | 80 | 80 | 80 |
| Number of SDs in each subcarrier unit set | 76 | 76 | 76 | 76 |
| Number of SPs in each subcarrier unit set | 4 | 4 | 4 | 4 |

It should be understood that in this embodiment of this application, Table 2 lists an example in which the number of DC subcarriers is 3 and the subcarrier spacing is 5.15625 MHz. However, this embodiment of this application is not limited thereto. In actual application, the number of DC subcarriers in a resource bandwidth may be 5, 7, or the like, and the subcarrier spacing is not limited to 5.15625 MHz.

It should be noted that the foregoing provides only some examples of RU division, but this embodiment of this application is not limited thereto. Various variations may be made in this embodiment of this application. A person skilled in the art may make various variations based on the examples recorded in this application. Such modifications also fall within the protection scope of this application.

The foregoing describes the case in which regardless of whether the channel bandwidth is one or more 2.16 GHz, an RU obtained by dividing the channel bandwidth is an integer multiple of a subcarrier unit set, and the subcarrier unit set fixedly includes 84 subcarriers or 80 subcarriers. Optionally, subcarrier unit sets may be different in different channel bandwidths. This embodiment of this application is not limited thereto.

In another embodiment, when the channel bandwidth is 2.16 GHz, the subcarrier unit set includes 88 subcarriers. When the channel bandwidth is 4.32 GHz, the subcarrier unit set includes 70 subcarriers. When the channel bandwidth is 6.48 GHz, the subcarrier unit set includes 70 subcarriers. When the channel bandwidth is 8.64 GHz, the subcarrier unit set includes 80 subcarriers. The following describes this case in detail.

Figure 11:
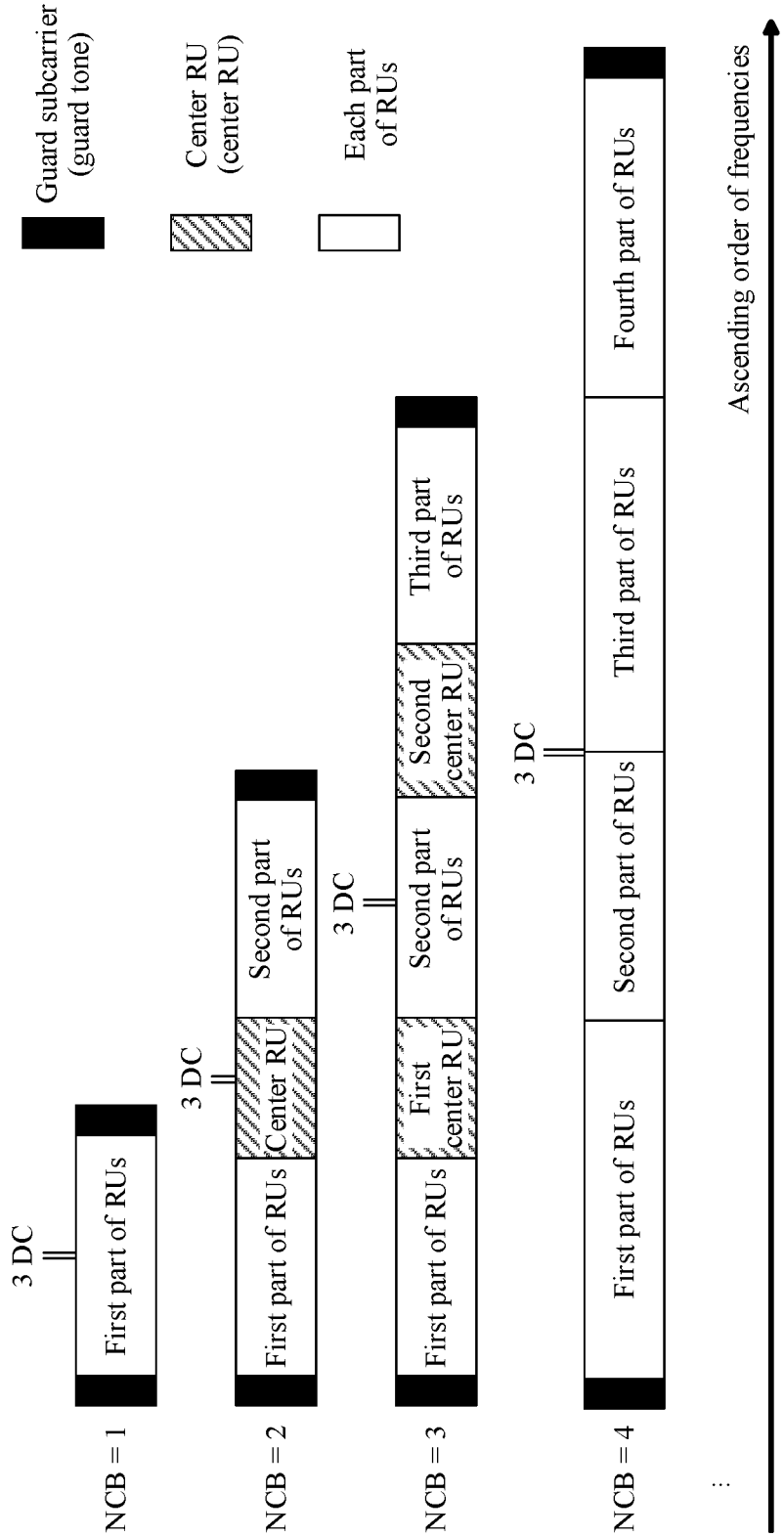
FIG. 11 is a schematic diagram of RU distribution according to another embodiment of this application.

As shown in FIG. 11, when the channel bandwidth includes M=1 basic bandwidth, and is 2.16 GHz, correspondingly, index numbers of data subcarriers and pilot subcarriers are [−177:−2, 2:177], index numbers of pilot subcarriers are [−165, −143, −121, −99, −77, −55, −33, −11, 11, 33, 55, 77, 99, 121, 143, 165], and the at least one RU obtained by dividing the channel bandwidth includes a first part of RUs.

When the channel bandwidth includes M=2 basic bandwidths, and is 4.32 GHz, correspondingly, index numbers of data subcarriers and pilot subcarriers are [−386:−2, 2:386], index numbers of pilot subcarriers are [−379, −361, −343, −325, −307, −289, −271, −253, −235, −217, −199, −181, −163, −145, −127, −109, −91, −73, −55, −37, −19, −5, 5, 19, 37, 55, 73, 91, 109, 127, 145, 163, 181, 199, 217, 235, 253, 271, 289, 307, 325, 343, 361, 379], and the at least one RU includes a first part of RUs, a second part of RUs, and one center RU. A frequency of the first part of RUs is lower than that of the center RU; and a frequency of the second part of RUs is higher than that of the center RU.

When the channel bandwidth includes M=3 basic bandwidths, and is 6.48 GHz, correspondingly, index numbers of data subcarriers and pilot subcarriers are [−596:−2, 2:596], index numbers of pilot subcarriers are [−595, −577, −559, −541, −523, −505, −487, −469, −451, −433, −415, −397, −379, −361, −343, −325, −307, −289, −271, −253, −235, −217, −199, −181, −163, −145, −127, −109, −91, −73, −55, −37, −19, −5, 5, 19, 37, 55, 73, 91, 109, 127, 145, 163, 181, 199, 217, 235, 253, 271, 289, 307, 325, 343, 361, 379, 397, 415, 433, 451, 469, 487, 505, 523, 541, 559, 577, 595], and the at least one RU includes a first part of RUs, a second part of RUs, a third part of RUs, a first center RU, and a second center RU. A frequency of the first part of RUs is lower than that of the first center RU; a frequency of the second part of RUs is higher than that of the first center RU, and the frequency of the second part of RUs is lower than that of the second center RU; and a frequency of the third part of RUs is higher than that of the second center RU.

When the channel bandwidth includes M=4 basic bandwidths, and is 8.64 GHz, correspondingly, index numbers of data subcarriers and pilot subcarriers are [−801:−2, 2: 801], index numbers of pilot subcarriers are [−790, −770, −750, −730, −710, −690, −670, −650, −630, −610, −590, −570, −550, −530, −510, −490, −470, −450, −430, −410, −390, −370, −350, −330, −310, −290, −270, −250, −230, −210, −190, −170, −150, −130, −110, −90, −70, −50, −30, −10, 10, 30, 50, 70, 90, 110, 130, 150, 170, 190, 210, 230, 250, 270, 290, 310, 330, 350, 370, 390, 410, 430, 450, 470, 490, 510, 530, 550, 570, 590, 610, 630, 650, 670, 690, 710, 730, 750, 770, 790], and the at least one RU includes a first part of RUs, a second part of RUs, a third part of RUs, and a fourth part of RUs.

In this embodiment of this application, sizes of subcarrier unit sets corresponding to different channel bandwidths are set to be different, so that resource scheduling is more flexible, and spectrum utilization is higher and is higher than that in a case in which the subcarrier unit set is fixed.

Specifically, the following separately describes the size of the RU and the location of the RU in frequency domain by using examples for the foregoing several cases.

Optionally, when the channel bandwidth includes M=1 basic bandwidth, and is 2.16 GHz, the at least one RU includes a first part of RUs.

The first part of RUs is:
four RUs each including one subcarrier unit set; or
two RUs each including one subcarrier unit set, and one RU including two subcarrier unit sets; or
two RUs each including two subcarrier unit sets; or
one RU including one subcarrier unit set, and one RU including three subcarrier unit sets; or
one RU including four subcarrier unit sets.

Specifically, the first part of RUs in ascending order of frequencies is:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

Figure 12:
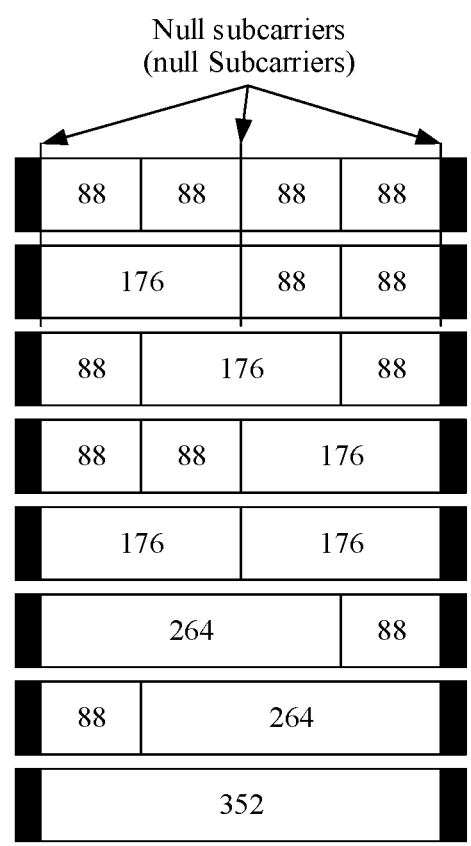
FIG. 12 is a schematic diagram of RU distribution according to another embodiment of this application.

For example, as shown in FIG. 12, when the channel bandwidth is 2.16 GHz, and one subcarrier unit set includes 88 subcarriers, from top to bottom, namely, from the first row to the eighth row, in an order from left to right (namely, in ascending order of frequencies), the first part of RUs includes the following eight possible resource allocation manners:

four first RUs each including one subcarrier unit set (88 subcarriers); or
one second RU including two subcarrier unit sets (176 subcarriers), and two first RUs each including one subcarrier unit set (88 subcarriers); or
one first RU including one subcarrier unit set (88 subcarriers), one second RU including two subcarrier unit sets (176 subcarriers), and one first RU including one subcarrier unit set (88 subcarriers); or
two first RUs each including one subcarrier unit set (88 subcarriers), and one second RU including two subcarrier unit sets (176 subcarriers); or
two second RUs each including two subcarrier unit sets (176 subcarriers); or
one third RU including three subcarrier unit sets (264 subcarriers), and one first RU including one subcarrier unit set (88 subcarriers); or
one first RU including one subcarrier unit set (88 subcarriers), and one third RU including three subcarrier unit sets (264 subcarriers); or
one fourth RU including four subcarrier unit sets (352 subcarriers).

Optionally, when the channel bandwidth includes M=2 basic bandwidths, which include a first basic bandwidth and a second basic bandwidth, and is 4.32 GHz, the at least one RU obtained by dividing the two basic bandwidths includes a first part of RUs, a second part of RUs, and one center RU. A frequency of the first part of RUs is lower than that of the center RU, and corresponds to the first basic bandwidth; and a frequency of the second part of RUs is higher than that of the center RU, and corresponds to the second basic bandwidth. In other words, the first part of RUs is located on a left side of the center RU, and the second part of RUs is located on a right side of the center RU. In other words, the center RU is located between the first part of RUs and the second part of RUs.

The first part of RUs and the second part of RUs each include:
five RUs each including one subcarrier unit set; or
one RU including two subcarrier unit sets, and three RUs each including one subcarrier unit set; or
two RUs each including two subcarrier unit sets, and one RU including one subcarrier unit set; or
one RU including three subcarrier unit sets, and one RU including two subcarrier unit sets; or
one RU including one subcarrier unit set, and one RU including four subcarrier unit sets; or
one RU including five subcarrier unit sets.

In this embodiment of this application, it is defined that the five subcarrier unit sets with consecutive frequencies constitute one fifth RU. In this case, the first part of RUs and the second part of RUs in ascending order of frequencies each include:
five first RUs; or
one second RU, one first RU, one first RU, and one first RU; or
one first RU, one second RU, one first RU, and one first RU; or
one first RU, one first RU, one second RU, and one first RU; or
one second RU, one first RU, and one second RU; or
one third RU and one second RU; or
one first RU and one fourth RU; or
one fifth RU.

A number of subcarriers on the center RU is the same as a number of subcarriers in one subcarrier unit set, the first half of subcarriers on the center RU is located on a left side of a direct current subcarrier and includes two pilot subcarriers, and the second half of subcarriers on the center RU is located on a right side of the direct current subcarrier and includes two pilot subcarriers.

It should be noted that a size and a location that are of an RU included in the first part of RUs may be different from a size and a location that are of an RU included in the second part of RUs, and the size and the location that are of the RU included in the first part of RUs may be combined with the size and the location that are of the RU included in the second part of RUs. To be specific, the first part of RUs may correspond to any one of the allocation manners in the first row to the eighth row, and the second part of RUs may also correspond to any one of the allocation manners in the first row to the eighth row. For example, the first part of RUs includes two RUs each including two subcarrier unit sets and one RU including one subcarrier unit set, and the second part of RUs includes one RU including five subcarrier unit sets.

Figure 13:
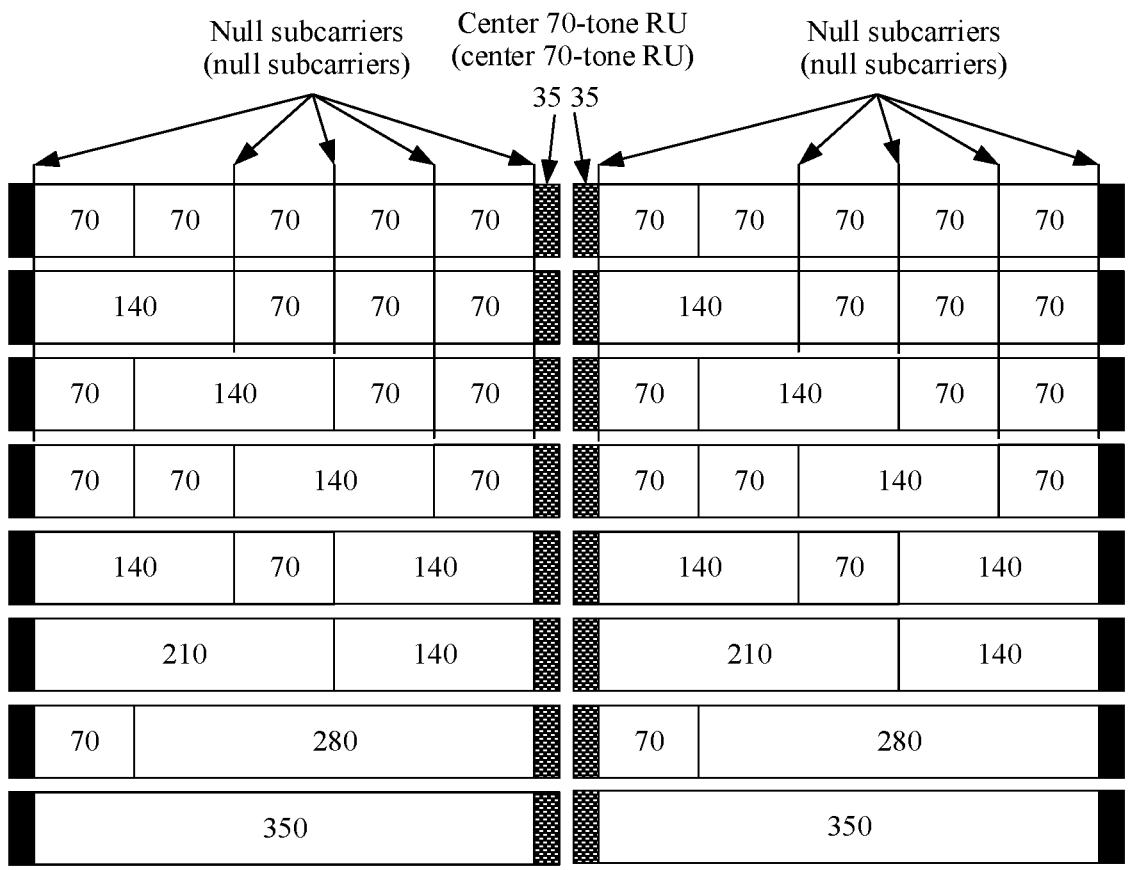
FIG. 13 is a schematic diagram of RU distribution according to another embodiment of this application.

For example, as shown in FIG. 13, when the channel bandwidth is 4.32 GHz, and one subcarrier unit set includes 70 subcarriers, from top to bottom, namely, from the first row to the eighth row, in an order from left to right (namely, in ascending order of frequencies), the first part of RUs and the second part of RUs each include the following eight possible resource allocation manners:

five first RUs each including one subcarrier unit set (70 subcarriers); or
one second RU including two subcarrier unit sets (140 subcarriers), and three first RUs each including one subcarrier unit set (70 subcarriers); or
one first RU including one subcarrier unit set (70 subcarriers), one second RU including two subcarrier unit sets (140 subcarriers), and two first RUs each including one subcarrier unit set (70 subcarriers); or
two first RUs each including one subcarrier unit set (70 subcarriers), one second RU including two subcarrier unit sets (140 subcarriers), and one first RU including one subcarrier unit set (70 subcarriers); or
one second RU including two subcarrier unit sets (140 subcarriers), one first RU including one subcarrier unit set (70 subcarriers), and one second RU including two subcarrier unit sets (140 subcarriers); or
one third RU including three subcarrier unit sets (210 subcarriers), and one second RU including two subcarrier unit sets (140 subcarriers); or
one first RU including one subcarrier unit set (70 subcarriers), and one fourth RU including four subcarrier unit sets (280 subcarriers); or
one fifth RU including fifth subcarrier unit sets (350 subcarriers).

The center RU is an RU including 70 subcarriers, and is located between the first part of RUs and the second part of RUs. The first half of subcarriers on the center RU is located on a left side of a direct current subcarrier and includes two pilot subcarriers, and the second half of subcarriers on the center RU is located on a right side of the direct current subcarrier and includes two pilot subcarriers.

It may be understood that RU distribution in the first row to the eighth row of the first part of RUs may be randomly combined with RU distribution in the first row to the eighth row of the second part of RUs. For example, the first part of RUs may be in the first row in FIG. 13, and the second part of RUs may be in the third row in FIG. 13.

It should be understood that FIG. 13 shows only a case in which the first part of RUs and the second part of RUs each include the foregoing eight possible resource allocation manners. Optionally, in this embodiment of this application, the first part of RUs and the second part of RUs each may further include another possible resource allocation manner. For example, in an order from left to right (namely, in ascending order of frequencies), the first part of RUs and the second part of RUs each may further include the following possible resource allocation manners:
  one first RU including one subcarrier unit set (70 subcarriers), and two second RUs each including two subcarrier unit sets (140 subcarriers); or
  two second RUs each including two subcarrier unit sets (140 subcarriers), and one first RU including one subcarrier unit set (70 subcarriers); or
  one second RU including two subcarrier unit sets (140 subcarriers), and one third RU including three subcarrier unit sets (210 subcarriers); or
  one fourth RU including four subcarrier unit sets (280 subcarriers), and one first RU including one subcarrier unit set (70 subcarriers).

It should be understood that in actual application, any eight of the foregoing four resource allocation manners and the eight resource allocation manners in FIG. 13 may be also reserved. In this case, required resource indication information may be three bits. Alternatively, in actual application, all the foregoing 12 resource allocation manners may be reserved. In this case, required resource indication information may be four bits. This embodiment of this application is not limited thereto.

Optionally, when the channel bandwidth includes M=3 basic bandwidths, which are a first basic bandwidth, a second basic bandwidth, and a third basic bandwidth, and is 6.48 GHz, the at least one RU includes a first part of RUs, a second part of RUs, a third part of RUs, a first center RU, and a second center RU. A frequency of the first part of RUs is lower than that of the first center RU, and corresponds to the first basic bandwidth; a frequency of the second part of RUs is higher than that of the first center RU, and the frequency of the second part of RUs is lower than that of the second center RU and corresponds to the second basic bandwidth; and a frequency of the third part of RUs is higher than that of the second center RU, and corresponds to the third basic bandwidth. In other words, the first part of RUs is located on a left side of the first center RU, the second part of RUs is located on a right side of the first center RU, the second part of RUs is located on a left side of the second center RU, and the third part of RUs is located on a right side of the second center RU. In other words, the first center RU is located between the first part of RUs and the second part of RUs, and the second center RU is located between the second part of RUs and the third part of RUs.

The first part of RUs, the second part of RUs, and the third part of RUs each include:
  five RUs each including one subcarrier unit set; or
  one RU including two subcarrier unit sets, and three RUs each including one subcarrier unit set; or
  two RUs each including two subcarrier unit sets, and one RU including one subcarrier unit set; or
  one RU including three subcarrier unit sets, and one RU including one subcarrier unit set; or
  one RU including one subcarrier unit set, and one RU including four subcarrier unit sets; or
  one RU including five subcarrier unit sets.

In this embodiment of this application, it is defined that the five subcarrier unit sets with consecutive frequencies constitute one fifth RU. In this case, the first part of RUs, the second part of RUs, and the third part of RUs in ascending order of frequencies each include:
  five first RUs; or
  one second RU, one first RU, one first RU, and one first RU; or
  one first RU, one second RU, one first RU, and one first RU; or
  one first RU, one first RU, one second RU, and one first RU; or
  one second RU, one first RU, and one second RU; or
  one third RU and one second RU; or
  one first RU and one fourth RU; or
  one fifth RU.

The first center RU is one subcarrier unit set; and the second center RU is one subcarrier unit set.

It should be noted that sizes and locations of RUs included in the first part of RUs to the third part of RUs may be the same, or may not be completely the same, or may be completely different. The sizes and locations of the RUs included in the three parts of RUs may be combined with each other. To be specific, the first part of RUs may correspond to any one of the allocation manners in the first row to the eighth row, the second part of RUs may also correspond to any one of the allocation manners in the first row to the eighth row, and the third part of RUs may also correspond to any one of the allocation manners in the first row to the eighth row. For example, the first part of RUs includes two RUs each including two subcarrier unit sets, the second part of RUs includes one RU including four subcarrier unit sets, the third part of RUs includes one RU including one subcarrier unit set and one RU including three subcarrier unit sets.

Figure 14:
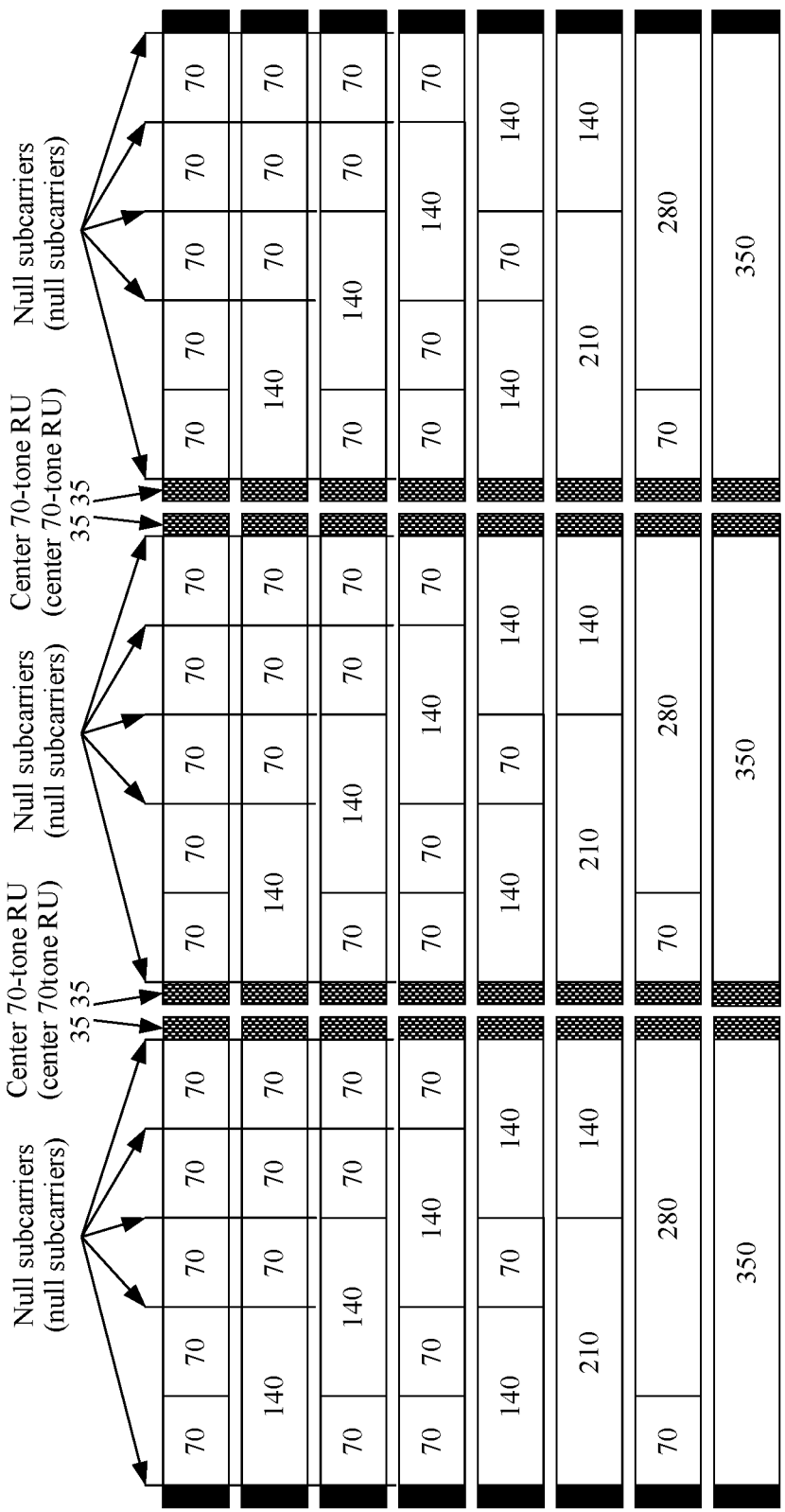
FIG. 14 is a schematic diagram of RU distribution according to another embodiment of this application.

For example, as shown in FIG. 14, when the channel bandwidth is 6.48 GHz, and one subcarrier unit set includes 70 subcarriers, from top to bottom, namely, from the first row to the eighth row, in an order from left to right (namely, in ascending order of frequencies), the first part of RUs, the second part of RUs, and the third part of RUs each include the following eight possible resource allocation manners:
  five first RUs each including one subcarrier unit set (70 subcarriers); or
  one second RU including two subcarrier unit sets (140 subcarriers), and three first RUs each including one subcarrier unit set (70 subcarriers); or
  one first RU including one subcarrier unit set (70 subcarriers), one second RU including two subcarrier unit sets (140 subcarriers), and two first RUs each including one subcarrier unit set (70 subcarriers); or
  two first RUs each including one subcarrier unit set (70 subcarriers), one second RU including two subcarrier unit sets (140 subcarriers), and one first RU including one subcarrier unit set (70 subcarriers); or
  one second RU including two subcarrier unit sets (140 subcarriers), one first RU including one subcarrier unit set (70 subcarriers), and one second RU including two subcarrier unit sets (140 subcarriers); or
  one third RU including three subcarrier unit sets (210 subcarriers), and one second RU including two subcarrier unit sets (140 subcarriers); or one first RU including one subcarrier unit set (70 subcarriers), and one fourth RU including four subcarrier unit sets (280 subcarriers); or one fifth RU including fifth subcarrier unit sets (350 subcarriers).

The first center RU is an RU including one subcarrier unit set, namely, 70 subcarriers; and the second center RU is an RU including one subcarrier unit set, namely, 70 subcarriers.

It may be understood that in actual application, the first rows to the eighth rows of the three parts of RUs may be randomly combined. For example, the first part of RUs may be in the first row in FIG. 14, the second part of RUs may be in the third row in FIG. 14, and the third part of RUs may be in the sixth row in FIG. 14.

It should be understood that FIG. 14 shows only a case in which the first part of RUs, the second part of RUs, and the third part of RUs each include the foregoing eight possible resource allocation manners. Optionally, similar to the foregoing descriptions in FIG. 13, in this embodiment of this application, the first part of RUs, the second part of RUs, and the third part of RUs each may further include another possible resource allocation manner. For details, refer to the descriptions in FIG. 13. The details are not described herein again.

Optionally, when the channel bandwidth includes M=4 basic bandwidths, which are a first basic bandwidth, a second basic bandwidth, a third basic bandwidth, and a fourth basic bandwidth, and is 8.64 GHz, the at least one RU includes a first part of RUs, a second part of RUs, a third part of RUs, and a fourth part of RUs.

The first part of RUs, the second part of RUs, the third part of RUs, and the fourth part of RUs each include:

five RUs each including one subcarrier unit set; or one RU including two subcarrier unit sets, and three RUs each including one subcarrier unit set; or two RUs each including two subcarrier unit sets, and one RU including one subcarrier unit set; or one RU including three subcarrier unit sets, and one RU including two subcarrier unit sets; or one RU including one subcarrier unit set, and one RU including four subcarrier unit sets; or one RU including five subcarrier unit sets.

In this embodiment of this application, it is defined that the five subcarrier unit sets with consecutive frequencies constitute one fifth RU. In this case, the first part of RUs, the second part of RUs, the third part of RUs, and the fourth part of RUs in ascending order of frequencies each include:

five first RUs; or one second RU, one first RU, one first RU, and one first RU; or one first RU, one second RU, one first RU, and one first RU; or one first RU, one first RU, one second RU, and one first RU; or one second RU, one first RU, and one second RU; or one third RU and one second RU; or one first RU and one fourth RU; or one fifth RU.

It should be noted that sizes and locations of RUs included in the first part of RUs to the fourth part of RUs may be the same, or may not be completely the same, or may be completely different. The sizes and locations of the RUs included in the four parts of RUs may be combined with each other. To be specific, the first part of RUs may correspond to any one of the allocation manners in the first row to the eighth row, the second part of RUs may also correspond to any one of the allocation manners in the first row to the eighth row, the third part of RUs may also correspond to any one of the allocation manners in the first row to the eighth row, and the fourth part of RUs may also correspond to any one of the allocation manners in the first row to the eighth row. For example, the first part of RUs includes two RUs each including two subcarrier unit sets, the second part of RUs includes one RU including four subcarrier unit sets, the third part of RUs includes one RU including one subcarrier unit set and one RU including three subcarrier unit sets, and the fourth part of RUs includes two RUs each including two subcarrier unit sets.

Figure 15:
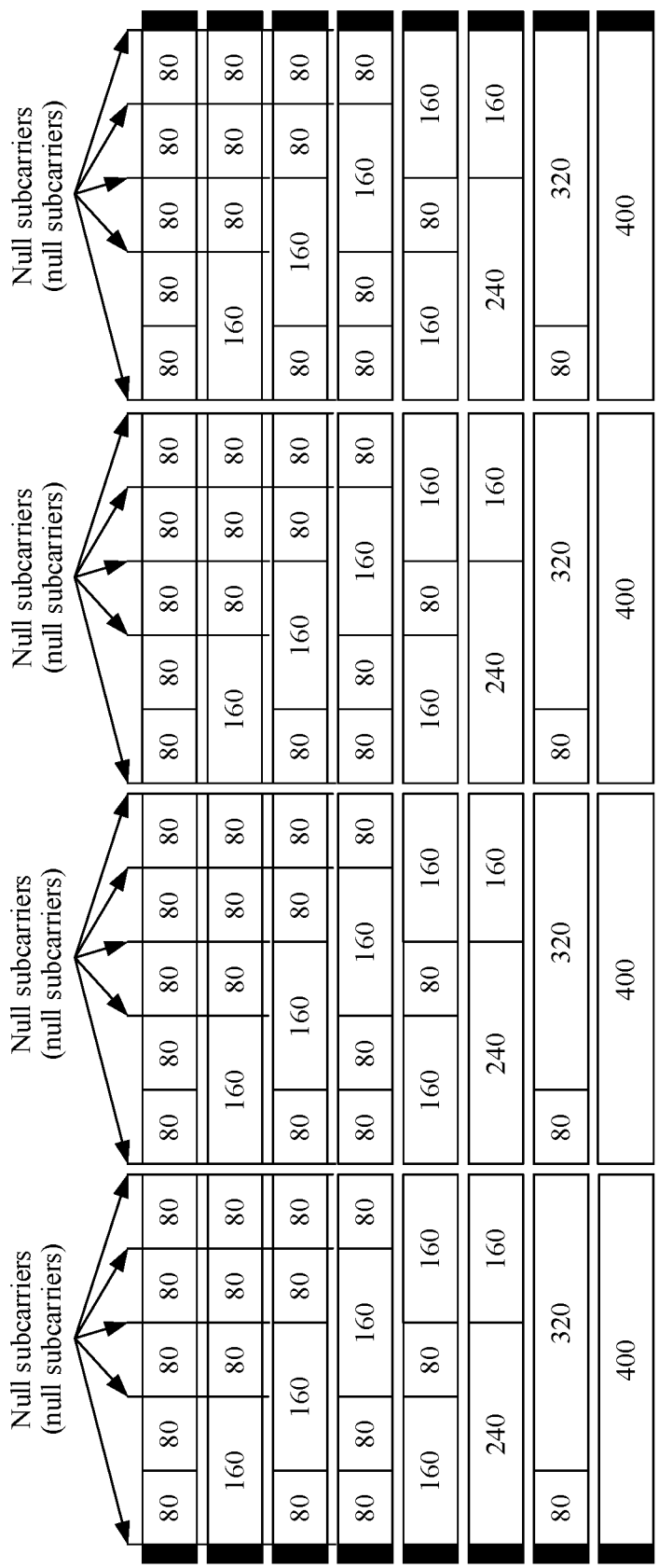
FIG. 15 is a schematic diagram of RU distribution according to another embodiment of this application.

For example, as shown in FIG. 15, when the channel bandwidth is 8.64 GHz, and one subcarrier unit set includes 80 subcarriers, from top to bottom, namely, from the first row to the eighth row, in an order from left to right (namely, in ascending order of frequencies), the first part of RUs, the second part of RUs, and the third part of RUs each include the following eight possible resource allocation manners:

five first RUs each including one subcarrier unit set (80 subcarriers); or one second RU including two subcarrier unit sets (160 subcarriers), and three third RUs each including one subcarrier unit set (80 subcarriers); or one first RU including one subcarrier unit set (80 subcarriers), one second RU including two subcarrier unit sets (160 subcarriers), and two first RUs each including one subcarrier unit set (80 subcarriers); or two first RUs each including one subcarrier unit set (80 subcarriers), one second RU including two subcarrier unit sets (160 subcarriers), and one first RU including one subcarrier unit set (80 subcarriers); or one second RU including two subcarrier unit sets (160 subcarriers), one first RU including one subcarrier unit set (80 subcarriers), and one second RU including two subcarrier unit sets (160 subcarriers); or one third RU including three subcarrier unit sets (240 subcarriers), and one second RU including two subcarrier unit sets (160 subcarriers); or one first RU including one subcarrier unit set (80 subcarriers), and one fourth RU including four subcarrier unit sets (320 subcarriers); or one fifth RU including fifth subcarrier unit sets (400 subcarriers).

It may be understood that in actual application, the first rows to the eighth rows of the four parts of RUs may be randomly combined. For example, the first part of RUs may be in the first row in FIG. 15, the second part of RUs may be in the third row in FIG. 15, the third part of RUs may be in the sixth row in FIG. 15, and the fourth part of RUs may be in the fifth row in FIG. 15.

It should be understood that FIG. 15 shows only a case in which the first part of RUs, the second part of RUs, the third part of RUs, and the fourth part of RUs each include the foregoing eight possible resource allocation manners. Optionally, similar to the foregoing descriptions in FIG. 13, in this embodiment of this application, the first part of RUs, the second part of RUs, the third part of RUs, and the fourth part of RUs each may further include another possible resource allocation manner. For details, refer to the descriptions in FIG. 13. The details are not described herein again.

Based on the foregoing descriptions, it can be learned that resource distribution corresponding to the channel bandwidth is shown in Table 3.

When the channel bandwidth is 2.16 GHz, an NSD is 336, an NSP is 16, an NDC is 3, an NST is 355, a subcarrier spacing is 5.15625 MHz, a number of subcarriers in one subcarrier unit set is 88, an NSD in each subcarrier unit set is 84, and an NSP in each subcarrier unit set is 4.

When the channel bandwidth is 4.32 GHz, an NSD is 726, an NSP is 44, an NDC is 3, an NST is 773, a subcarrier spacing is 5.15625 MHz, a number of subcarriers in one subcarrier unit set is 70, an NSD in each subcarrier unit set is 66, and an NSP in each subcarrier unit set is 4.

When the channel bandwidth is 6.48 GHz, an NSD is 1122, an NSP is 68, an NDC is 3, an NST is 1193, a subcarrier spacing is 5.15625 MHz, a number of subcarriers in one subcarrier unit set is 70, an NSD in each subcarrier unit set is 66, and an NSP in each subcarrier unit set is 4.

When the channel bandwidth is 8.64 GHz, an NSD is 1520, an NSP is 80, an NDC is 3, an NST is 1603, a subcarrier spacing is 5.15625 MHz, a number of subcarriers in one subcarrier unit set is 80, an NSD in each subcarrier unit set is 76, and an NSP in each subcarrier unit set is 4.

TABLE 3

| Parameter | NCB = 1 | NCB = 2 | NCB = 3 | NCB = 4 |
| --- | --- | --- | --- | --- |
| NSD | 336 | 726 | 1122 | 1520 |
| NSP | 16 | 44 | 68 | 80 |
| NDC | 3 | 3 | 3 | 3 |
| NST | 355 | 773 | 1193 | 1603 |
| Subcarrier spacing (subcarrier spacing (MHz)) | 5.15625 | 5.15625 | 5.15625 | 5.15625 |
| Size of a subcarrier unit set | 88 | 70 | 70 | 80 |
| Number of SDs in each subcarrier unit set | 84 | 66 | 66 | 76 |
| Number of SPs in each subcarrier unit set | 4 | 4 | 4 | 4 |

It should be understood that in this embodiment of this application, Table 3 lists an example in which the number of DC subcarriers is 3 and the subcarrier spacing is 5.15625 MHz. However, this embodiment of this application is not limited thereto. In actual application, the number of DC subcarriers in a resource bandwidth may be 5, 7, or the like, and the subcarrier spacing is not limited to 5.15625 MHz.

The foregoing describes the subcarrier division method in the embodiments of this application. The following describes a data transmission method and a resource unit allocation indication method in embodiments of this application. It should be understood that resources in the data transmission method or the resource unit allocation indication method may be divided in the subcarrier division method described above. Optionally, another subcarrier division manner may alternatively be used. This embodiment of this application is not limited thereto.

Figure 16:
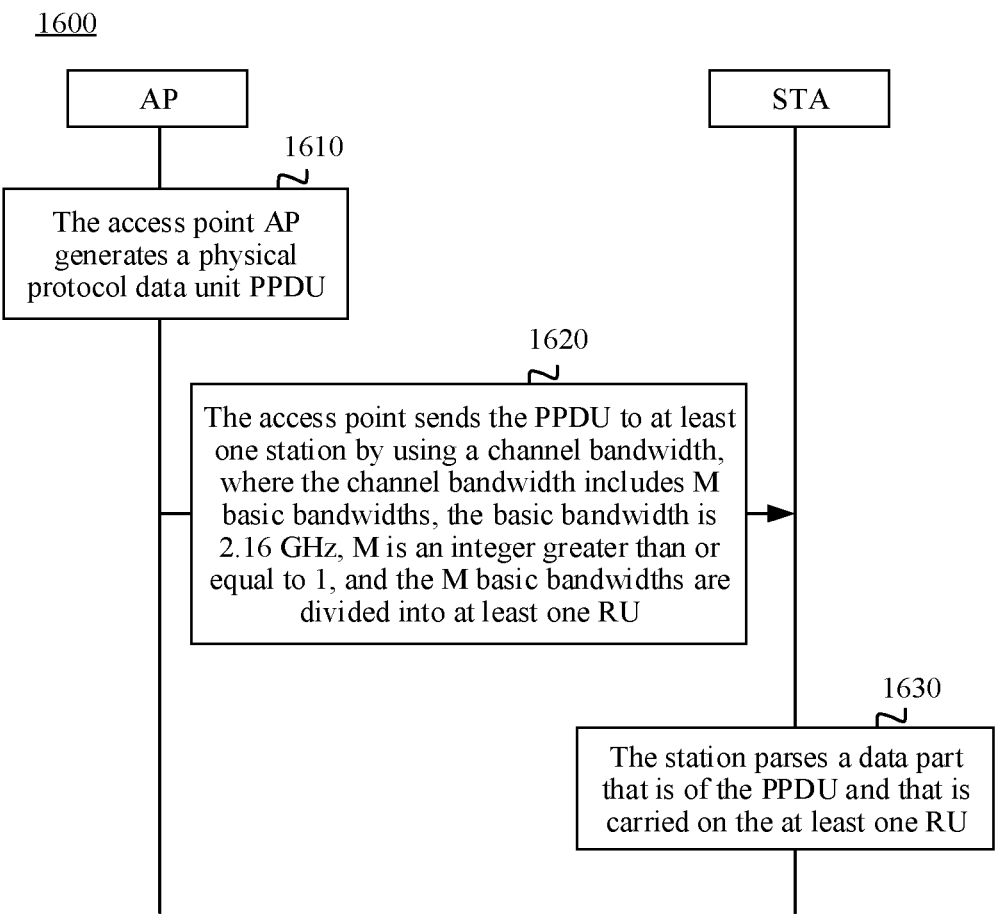
FIG. 16 is a schematic flowchart of a data transmission method according to an embodiment of this application.

FIG. 16 is a schematic flowchart of a data communication method in a WLAN system according to an embodiment of this application. In the method shown in FIG. 16, a data part is carried on at least one RU, and the at least one RU is obtained by dividing a channel bandwidth. Specifically, for a channel bandwidth division manner, refer to the foregoing descriptions in FIG. 2 to FIG. 15. Details are not described herein again.

Specifically, the method shown in FIG. 16 may be applied to a 60 GHz communications system. The method 1600 includes the following steps.

1610: An access point AP generates a physical protocol data unit PPDU.

A data part of the PPDU is carried on at least one resource unit RU.

It may be understood that when the channel bandwidth is divided into one RU, the data part is carried on the one RU; or when the channel bandwidth is divided into a plurality of RUs, the data part is carried on the plurality of RUs.

1620: The access point sends the PPDU to at least one station by using the channel bandwidth, where the channel bandwidth includes M basic bandwidths, the basic bandwidth is 2.16 GHz, M is an integer greater than or equal to 1, and the M basic bandwidths are divided into the at least one RU.

In other words, in this embodiment of this application, the access point sends the PPDU by using the channel bandwidth, where the channel bandwidth includes the M basic bandwidths, and the M basic bandwidths include the at least one RU.

Specifically, when the channel bandwidth is 2.16 GHz, for a size and a location that are of the at least one RU, reference may be made to the descriptions in FIG. 3, FIG. 4, or FIG. 12. To avoid repetition, details are not described herein again.

When the channel bandwidth is 4.32 GHz, for a size and a location that are of the at least one RU, reference may be made to the descriptions in FIG. 5, FIG. 6, or FIG. 13. To avoid repetition, details are not described herein again.

When the channel bandwidth is 6.48 GHz, for a size and a location that are of the at least one RU, reference may be made to the descriptions in FIG. 7, FIG. 8, or FIG. 14. To avoid repetition, details are not described herein again.

When the channel bandwidth is 8.64 GHz, for a size and a location that are of the at least one RU, reference may be made to the descriptions in FIG. 9, FIG. 10, or FIG. 15. To avoid repetition, details are not described herein again.

1630: The station parses the data part that is of the PPDU and that is carried on the at least one RU.

Specifically, the station may obtain downlink data based on an allocated RU. Specifically, the station obtains, through parsing on the RU allocated to the station, the data sent by the access point to the station.

The data part of the PPDU may include data of the at least one station. To be specific, the access point may use RUs allocated to different stations to carry data parts of the stations, and send the data parts to the station, to implement downlink multi-user data transmission. For example, if the channel bandwidth is divided into two RUs, for example, as shown in the fifth row in FIG. 3, and the two RUs are respectively allocated to two stations, data of a station 1 may be carried on a first 168-tone RU and sent to the station 1, and data of a station 2 may be carried on a second 168-tone RU and sent to the station 2.

In this embodiment of this application, the channel bandwidth is divided into one or more RUs, so that different RUs can be allocated to different stations, different frequency resources are allocated to the different stations at a same moment, and a plurality of stations efficiently access a channel, to implement an OFDMA technology in a high-frequency scenario, and improve channel utilization and transmission efficiency.

In an example, a frame structure of the PPDU in this embodiment of this application is shown in FIG. 17. The PPDU may be applied to a future generation 60 GHz (future generation 60 GHz, FG60) 802.11 high frequency communications standard. The PPDU may include:

a legacy short training field (legacy Short Training field, L-STF) used for synchronization, a legacy channel estimation field (legacy channel estimation field, L-CEF) used for channel estimation, a legacy header field (legacy Header field, L-Header) used to indicate a scrambling code, a modulation and coding scheme, a packet type, and the like, a repeated legacy header (repeated legacy header, RL-header) field, a future generation 60 GHz header A field (FG60 Header A field, FG60-Header-A) used to indicate single/multi-user, carrier aggregation, a bandwidth, and the like, an FG60 short training field (FG60 short training field, FG60-STF) used for synchronization, an FG60 channel estimation field (FG60 channel estimation field, FG60-CEF) used for channel estimation, an FG60 header B field (FG60 header B field, FG60-Header-B) used to indicate resource allocation, multi-user, and the like, an FG60 data (FG60-data) field, and an FG60 training (FG60 training, FG60-TRN) field.

It should be noted that for ease of description, a field that may comply with the existing 802.11ad standard is referred to as a legacy (legacy) field or a non future generation (non future generation, non-FG) field, and a field that complies with a future generation 60 GHz 802.11 ay standard is referred to as a future generation (future generation, FG) field.

Figure 18:
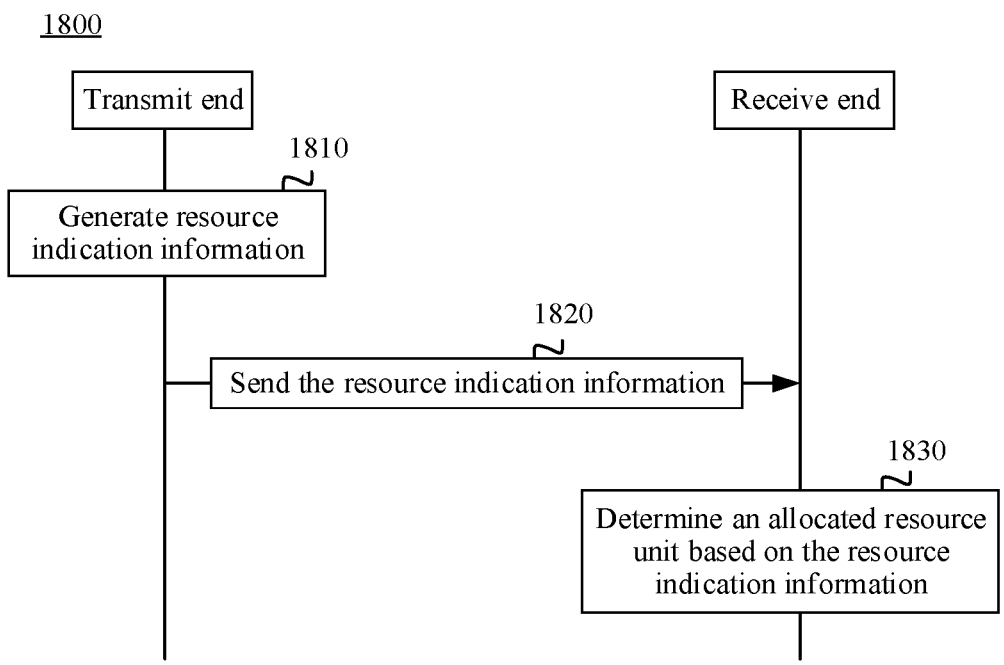
FIG. 18 is a schematic diagram of a resource unit allocation indication method according to an embodiment of this application.

An embodiment of this application further provides a resource unit allocation indication method. FIG. 18 is a schematic flowchart of a resource unit allocation indication method according to an embodiment of this application.

The method may be applied to a 60 GHz wireless local area network communications system. The method 1800 shown in FIG. 18 includes the following steps.

1810: A transmit end generates resource indication information, where the resource indication information is used to indicate a size of at least one resource unit RU obtained by dividing a channel bandwidth and a location of the at least one resource unit RU in frequency domain; and the channel bandwidth includes M basic bandwidths, each of the M basic bandwidths is 2.16 GHz, and M is an integer greater than or equal to 1.

In an example, the at least one RU includes M−1 center RUs, and each center RU is not an RU located at either end of the at least one RU.

Optionally, one RU includes N subcarrier unit sets, where N is an integer greater than or equal to 1.

The subcarrier unit set includes 84 subcarriers, and each subcarrier unit set includes 80 data subcarriers and four pilot subcarriers. Optionally, any two adjacent pilot subcarriers in the four pilot subcarriers are spaced by 20 data subcarriers from each other.

Alternatively, the subcarrier unit set includes 80 subcarriers, and each subcarrier unit set includes 76 data subcarriers and four pilot subcarriers. Optionally, any two adjacent pilot subcarriers in the four pilot subcarriers are spaced by 19 data subcarriers from each other.

It should be understood that in this embodiment of this application, a number of subcarriers included in one subcarrier unit set is not limited to 84 or 80. One subcarrier unit set may alternatively include another number of subcarriers, or may include another number of pilot subcarriers, and is not limited to including the four pilot subcarriers. For example, one subcarrier unit set includes 82, 86, 70, or 88 subcarriers.

Optionally, the at least one RU includes M−1 center RUs, and each center RU is not an RU located at either end of the at least one RU.

1820: The transmit end sends the resource indication information to a receive end.

1830: The receive end determines, based on the resource indication information, a resource unit allocated by a transmit end.

It should be understood that the transmit end may be an access point, and the receive end may be a station. This embodiment of this application is not limited thereto.

In this embodiment of this application, the channel bandwidth is divided into one or more RUs, so that the transmit end can indicate, by using the resource indication information, to allocate different RUs to different receive ends, and the receive end can determine the resource unit allocated by the transmit end, and receive data on a corresponding resource unit. In this embodiment of this application, resources of a plurality of stations can be simultaneously indicated, thereby improving resource indication efficiency.

Optionally, the resource indication information includes M resource allocation fields, and each resource allocation field includes at least one index number. Each index number is used to indicate a size and a location that are of an RU included in any one of the first part of RUs, the second part of RUs, the third part of RUs, or the fourth part of RUs. In other words, the index number indicates one part of RUs, and each part of RUs corresponds to one basic bandwidth. In other words, the index number indicates a size of an RU obtained by dividing the one basic bandwidth and a location of the RU in frequency domain. In an embodiment, any two of the at least one index number are used to indicate sizes of RUs included in different parts of RUs and locations of the RUs in frequency domain. Optionally, the index number includes at least three bits. A mapping relationship between a value of the index number and an RU may include one or more of the following:

when the value of the index number is a first value, it indicates that the any part of RUs includes four RUs each including one subcarrier unit set; or when the value of the index number is a second value, it indicates that the any part of RUs includes one RU including two subcarrier unit sets and two RUs each including one subcarrier unit set, where the RU including two subcarrier unit sets is located on a left side of the two RUs each including one subcarrier unit set; or when the value of the index number is a third value, it indicates that the any part of RUs includes one RU including two subcarrier unit sets and two RUs each including one subcarrier unit set, where the RU including two subcarrier unit sets is located between the two RUs each including one subcarrier unit set; or when the value of the index number is a fourth value, it indicates that the any part of RUs includes one RU including two subcarrier unit sets and two RUs each including one subcarrier unit set, where the RU including two subcarrier unit sets is located on a right side of the two RUs each including one subcarrier unit set; or when the value of the index number is a fifth value, it indicates that the any part of RUs includes two RUs each including two subcarrier unit sets; or when the value of the index number is a sixth value, it indicates that the any part of RUs includes one RU including three subcarrier unit sets and one RU including one subcarrier unit set, where the RU including three subcarrier unit sets is located on a right side of the RU including one subcarrier unit set; or when the value of the index number is a seventh value, it indicates that the any part of RUs includes one RU including one subcarrier unit set and one RU including three subcarrier unit sets, where the RU including three subcarrier unit sets is located on a left side of the RU including one subcarrier unit set; or when the value of the index number is an eighth value, it indicates that the any part of RUs includes one RU including four subcarrier unit sets.

Optionally, one basic bandwidth includes four subcarrier unit sets in ascending order of frequencies. One subcarrier unit set constitutes one first RU, two subcarrier unit sets with consecutive frequencies constitute one second RU, three subcarrier unit sets with consecutive frequencies constitute one third RU, and four subcarrier unit sets with consecutive frequencies constitute one fourth RU.

In other words, when the value of the index number is a first value, it indicates that RUs, in ascending order of frequencies, obtained by dividing the corresponding basic bandwidth include four first RUs.

Alternatively, when the value of the index number is a second value, it indicates that RUs, in ascending order of frequencies, obtained by dividing the corresponding basic bandwidth include one second RU, one first RU, and one first RU.

Alternatively, when the value of the index number is a third value, it indicates that RUs, in ascending order of frequencies, obtained by dividing the corresponding basic bandwidth include one first RU, one second RU, and one first RU.

Alternatively, when the value of the index number is a fourth value, it indicates that RUs, in ascending order of frequencies, obtained by dividing the corresponding basic bandwidth include one first RU, one first RU, and one second RU.

Alternatively, when the value of the index number is a fifth value, it indicates that RUs, in ascending order of frequencies, obtained by dividing the corresponding basic bandwidth include two second RUs.

Alternatively, when the value of the index number is a sixth value, it indicates that RUs, in ascending order of frequencies, obtained by dividing the corresponding basic bandwidth include one third RU and one first RU.

Alternatively, when the value of the index number is a seventh value, it indicates that RUs, in ascending order of frequencies, obtained by dividing the corresponding basic bandwidth include one first RU and one third RU.

Alternatively, when the value of the index number is an eighth value, it indicates that RUs, in ascending order of frequencies, obtained by dividing the corresponding basic bandwidth include one fourth RU.

In an example, assuming that one subcarrier unit set includes Z subcarriers, a correspondence between the index number and RU distribution may be shown in Table 4.

TABLE 4

| Index number (value of at least three bits) | RU distribution in any basic bandwidth | | | |
|---|---|---|---|---|
| First value | Z | Z | Z | Z |
| Second value | 2Z | | Z | Z |
| Third value | Z | 2Z | | Z |
| Fourth value | Z | Z | 2Z | |
| Fifth value | 2Z | | 2Z | |
| Sixth value | | 3Z | | Z |
| Seventh value | Z | | 3Z | |
| Eighth value | | 4Z | | |

It should be understood that in this embodiment of this application, Z indicates a number of subcarriers in a subcarrier unit set. It may be understood that a value of Z may be 84, 82, 80, 88, 70, or the like. This embodiment of this application is not limited thereto.

For example, the index number includes a value of three bits, and the first value to the eighth value may be respectively 000, 001, 010, 011, 100, 101, 110, and 111.

For the foregoing described case in which regardless of whether the channel bandwidth is one or more 2.16 GHz, an RU obtained by dividing the channel bandwidth is an integer multiple of a subcarrier unit set, and the subcarrier unit set fixedly includes 84 subcarriers or 80 subcarriers (in other words, Z=84 or 80), a correspondence between the index number and a combination of a size of the RU and a location of the RU in frequency domain may be shown in Table 5.

TABLE 5

| Value of three bits (B2B1B0) | 1 | 2 | 3 | 4 | Number of entries (number of entries) |
|---|---|---|---|---|---|
| 000 | 84/80 | 84/80 | 84/80 | 84/80 | 1 |
| 001 | 168/160 | | 84/80 | 84/80 | 1 |
| 010 | 84/80 | 168/160 | | 84/80 | 1 |
| 011 | 84/80 | 84/80 | 168/160 | | 1 |
| 100 | 168/160 | | 168/160 | | 1 |
| 101 | | 252/240 | | 84/80 | 1 |
| 110 | 84/80 | | 252/240 | | 1 |
| 111 | | 336/320 | | | 1 |

It may be understood that a mapping relationship between a value of an index number and RU distribution in the table may not be limited thereto.

In a specific implementation process, the correspondence between the index number and the combination of the location of the RU in frequency domain and the size of the RU may be preset in each station. For example, the station may locally store the correspondence shown in Table 5. After obtaining a resource allocation field, the station may determine RU distribution, namely, a location and a size that are of each RU, based on the correspondence table, and determine, based on a user field, an RU allocated to the station.

Optionally, the resource allocation indication information further includes M user specific fields, the M user specific fields are in a one-to-one correspondence with the M resource allocation fields, and one user specific field is used to indicate each station corresponding to each RU indicated by a corresponding resource allocation field, so that the station determines, based on the resource allocation field and the user specific field, a size and a location that are of a frequency domain resource unit that is in the channel bandwidth and that uniquely corresponds to the station. The one user specific field includes S user fields, and one user field includes an identifier of one station. A resource allocation field corresponding to the user specific field indicates that the channel bandwidth is also divided into S RUs, and the S user fields are in a one-to-one correspondence with the S RUs. To be specific, if an identifier of a station corresponding to the $1^{st}$ RU is Station 1, it indicates that the $1^{st}$ RU is allocated to a station 1. It should be understood that in this embodiment of this application, the resource indication information may be independent information, or may be information carried in a PPDU. This embodiment of this application is not limited thereto.

An example in which the resource indication information is carried in the PPDU is used below for description. In an example, for a specific structure of the PPDU, refer to FIG. 17. Details are not described herein again. The transmit end sends, to the receive end, the PPDU that carries the resource indication information. The receive end may obtain an allocated RU based on the resource indication information, and the receive end may receive data on an RU corresponding to the receive end.

Optionally, the resource indication information is carried in a header B field. The PPDU includes at least M header B fields, the M header B fields are in a one-to-one correspondence with the M basic bandwidths, each header B field includes a common field, and the common field includes a resource allocation field. In other words, the M header B fields included in the PPDU include a total of M resource allocation fields.

Specifically, the access point sends the PPDU to the station, and the station may obtain corresponding RU distribution based on the resource allocation field. Further, the PPDU in this embodiment of this application may include a user specific field, the user specific field includes a plurality of user fields, and the plurality of user fields are used to indicate specific allocation statuses of all RUs. For example, one user field may indicate an identifier of a station to which one RU is allocated, a number of spatial streams NSS, a used modulation and coding scheme (MCS), dual-carrier modulation DCM indication information, and the like. The station may determine information such as the allocated RU and the corresponding coding scheme based on the user field, and the station may receive the data on the RU corresponding to the station.

Optionally, the resource indication information includes M resource allocation fields, the M resource allocation fields are in a one-to-one correspondence with the M basic bandwidths, each resource allocation field includes one index number, and the index number is used to indicate a size of an RU obtained by dividing the basic bandwidth corresponding to the resource allocation field and a location of the RU in frequency domain.

In other words, in this implementation, the M resource allocation fields are different from each other. The following describes in detail the case in which the M resource allocation fields are different from each other.

Specifically, each resource allocation field includes one index number (corresponding to a resource unit RU allocation subfield below), and the index number is used to indicate a size of an RU obtained by dividing a basic bandwidth corresponding to the resource allocation field and a location of the RU in frequency domain. In other words, the index number (namely, the resource unit RU allocation subfield) is used to indicate allocation of some RUs in the basic bandwidth corresponding to the index number that are in one of the first part of RUs, the second part of RUs, the third part of RUs, and the fourth part of RUs.

Optionally, only M−1 resource allocation fields in the M resource allocation fields further include second indication information (which may also be referred to as a center RU subfield) used to indicate whether the M−1 center RUs are allocated, and each piece of second indication information corresponds to one of the M−1 center RUs.

For example, the second indication information (namely, the center RU subfield) may be one bit, and is used to indicate an allocation status of the center RU described above, in other words, indicate whether the center RU is allocated to the station.

It should be noted that in an implementation, the M resource allocation fields each may include the second indication information (the center RU subfield), but only M−1 pieces of second indication information have an actual meaning, to be specific, may indicate whether the M−1 center RUs are allocated, and the other piece of second indication information has no actual meaning, to be specific, is not used to indicate whether any one of the M−1 center RUs is allocated. A value of the second indication information may be a reserved value, a null value, or the like. In other words, the second indication information included in one special resource allocation field in the M resource allocation fields may be a reserved value or a null value. The special resource allocation field is any one of the M resource allocation fields. The special resource allocation field may be a resource allocation field corresponding to a basic bandwidth with a highest frequency, or may be a resource allocation field corresponding to a basic bandwidth with a lowest frequency. In addition, when the channel bandwidth includes one basic bandwidth, a center RU is not included. In this case, the PPDU includes only one resource allocation field. The second indication information in the resource allocation field has no actual meaning and may be a reserved value, a null value, or the like.

In this example, a number of bits occupied by one resource allocation field is fixed (one resource allocation field includes one index number and one piece of second indication information). In other words, the number of bits occupied by the resource allocation field does not change with a bandwidth, so that RU distribution can be simply indicated.

The following describes in detail an example of a signaling B field content channel (content channel) in the PPDU in this embodiment of this application for the case in which regardless of whether the channel bandwidth is one or more 2.16 GHz, an RU obtained by dividing the channel bandwidth is an integer multiple of a subcarrier unit set, and the subcarrier unit set includes 84 subcarriers. The content channel includes a common field and a user specific field, and the common field includes the resource allocation field. It may be understood that the resource indication method may be further applied to a case in which the subcarrier unit set includes 80 subcarriers. For RU distribution in different channel bandwidths, refer to the foregoing embodiments. Details are not described herein again.

When NCB=1, in other words, the channel bandwidth is 2.16 GHz, the PPDU includes one header B field content channel.

Figure 19:
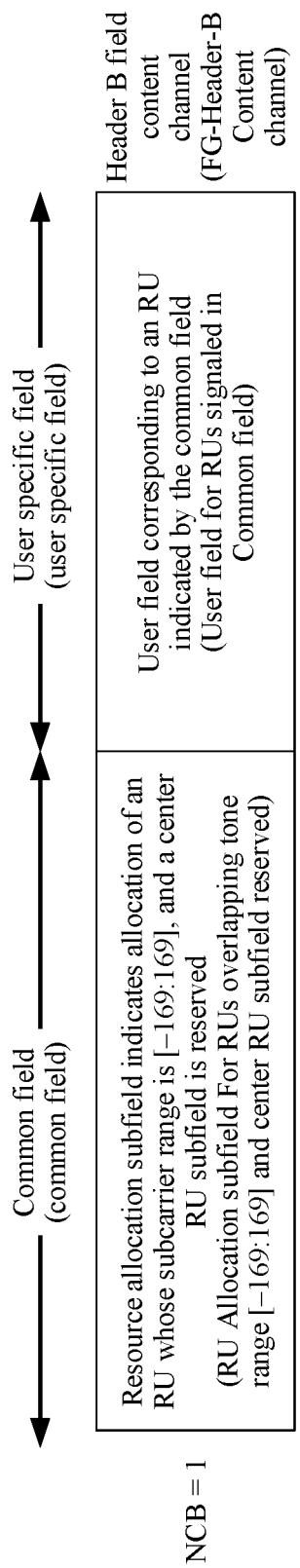
FIG. 19 is a schematic diagram of a content channel according to an embodiment of this application.

Specifically, as shown in FIG. 19, a resource unit allocation subfield (RU Allocation subfiled) (namely, an index number) in a resource allocation field included in a common field in the content channel is used to indicate allocation of an RU whose subcarrier range is [−169:169] (For RUs overlapping tone range −169:169). A center RU subfield (namely, second indication information) is a reserved value (center RU subfield reserved). A user specific field in the content channel includes a user field corresponding to an RU indicated by the common field, and one user field corresponds to one RU.

When NCB=2, in other words, the channel bandwidth is 4.32 GHz, the PPDU includes two header B field content channels. Each content channel occupies 2.16 GHz and corresponds to one basic channel bandwidth, and the header B field content channels are different.

It should be understood that when the header B field content channels are different, each content channel is used to indicate RU distribution in a basic bandwidth corresponding to the content channel. To be specific, content channels corresponding to channel bandwidths are independent of each other.

Figure 20:
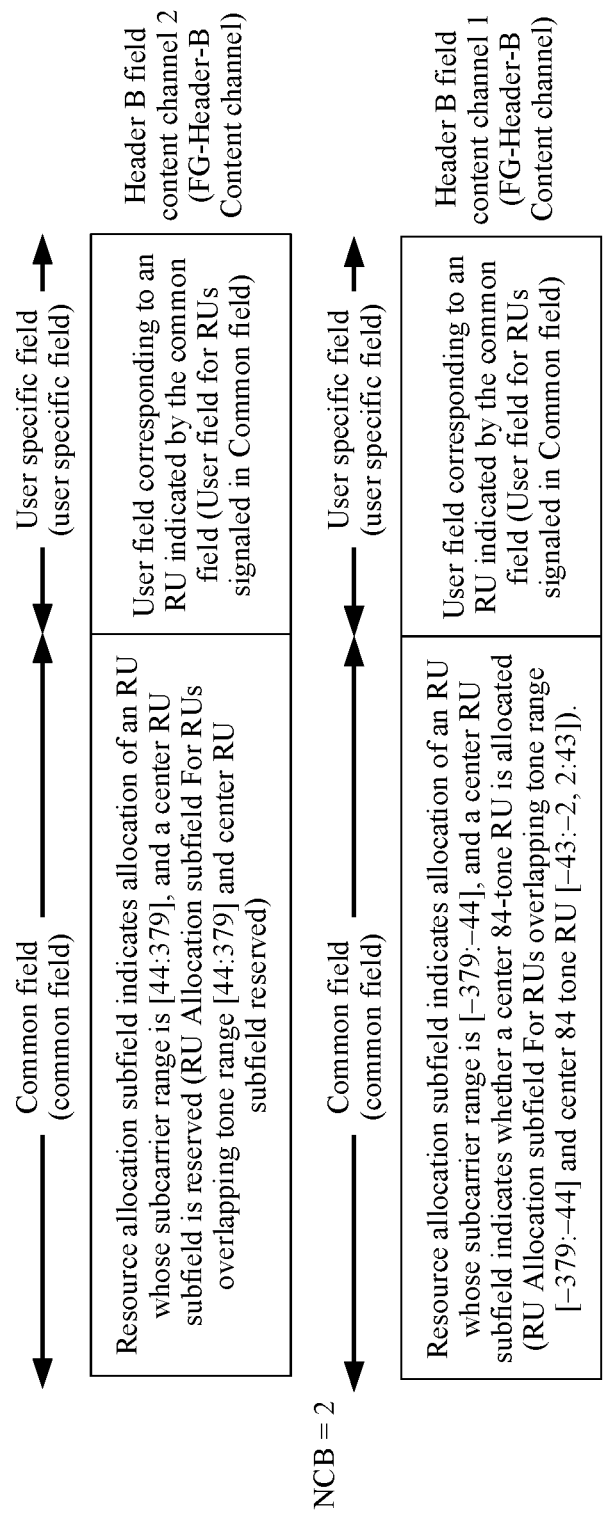
FIG. 20 is a schematic diagram of a content channel according to another embodiment of this application.

Specifically, as shown in FIG. 20, a resource unit RU allocation subfield (RU Allocation subfield) (namely, an index number) in a resource allocation field included in a common field in a content channel 1 corresponding to a basic bandwidth 1 is used to indicate allocation of an RU whose subcarrier value range is [−379:−44] (For RUs overlapping tone range −379:−44). A center RU subfield (namely, second indication information) indicates whether a center RU whose range (84 subcarriers) is [−43:−2, 2:43] (and center 84 tone RU [−43:−2 2:43]) is allocated. A user specific field in the content channel 1 includes a user field corresponding to an RU indicated by the common field (corresponding to the basic bandwidth 1), and one user field corresponds to one RU.

A resource unit allocation subfield (RU Allocation subfield) (namely, an index number) in a resource allocation field included in a common field in a content channel 2 corresponding to a basic bandwidth 2 is used to indicate allocation of an RU whose subcarrier value range is [44:379] (For RUs overlapping tone range [44:379]). A center RU subfield (namely, second indication information) is a reserved value (center RU subfield reserved). A user specific field in the content channel 2 includes a user field corresponding to an RU indicated by the common field (corresponding to the basic bandwidth 2), and one user field corresponds to one RU.

When NCB=3, in other words, the channel bandwidth is 6.48 GHz, the PPDU includes three header B field content channels. Each content channel occupies 2.16 GHz, and the header B field content channels are different.

It should be understood that when the header B field content channels are different, each content channel is used to indicate RU distribution in a basic bandwidth corresponding to the content channel.

Figure 21:
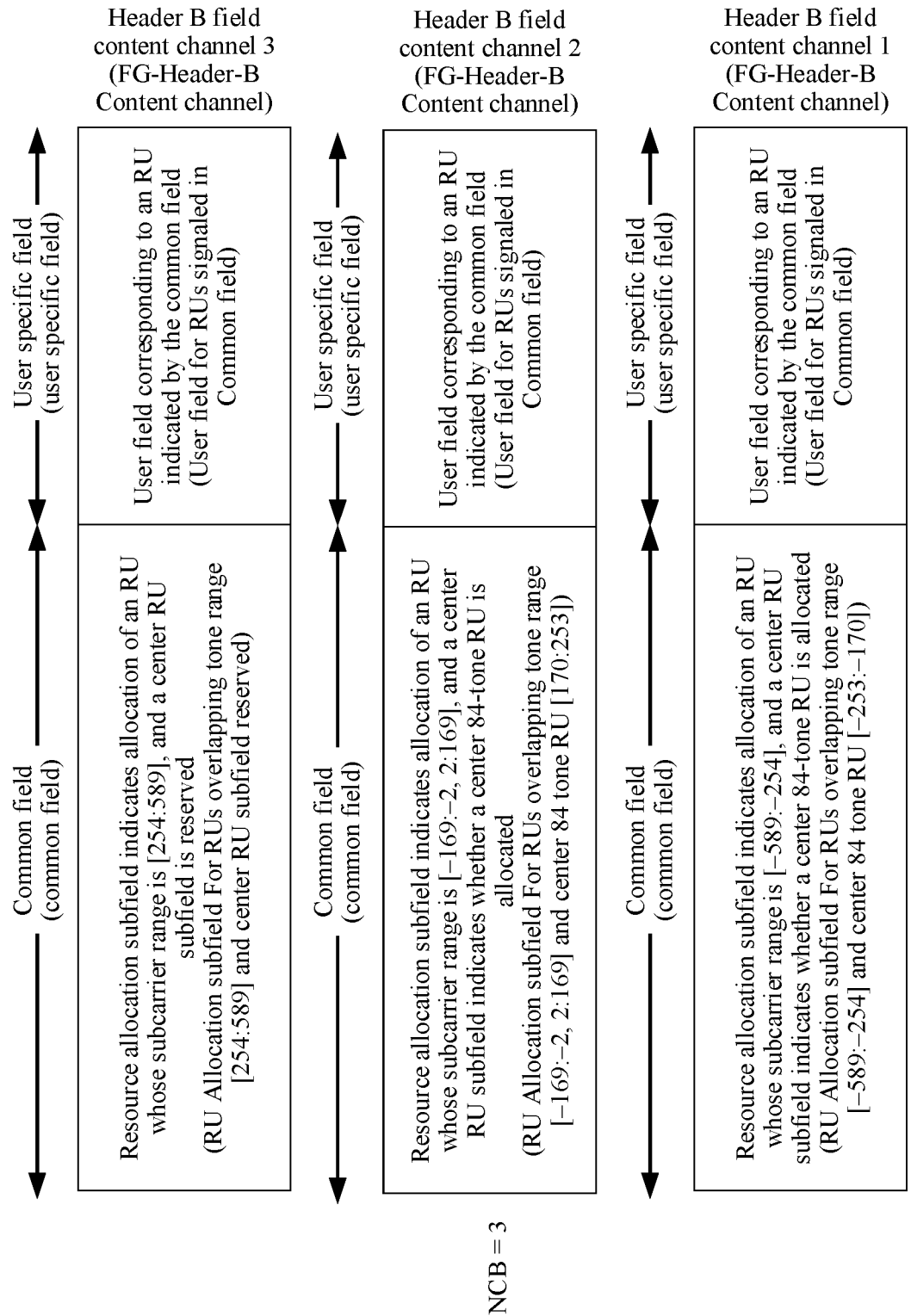
FIG. 21 is a schematic diagram of a content channel according to another embodiment of this application.

Specifically, as shown in FIG. 21, a resource unit RU allocation subfield (RU Allocation subfield) (namely, an index number) in a resource allocation field included in a common field in a content channel 1 corresponding to a basic bandwidth 1 is used to indicate allocation of an RU whose subcarrier value range is [−589:−254] (For RUs overlapping tone range [−589:−254]). A center RU subfield (namely, second indication information) indicates whether a center RU whose range (84 subcarriers) is [−253:−170] (and center 84 tone RU [−253:−170]) is allocated. A user specific field in the content channel 1 includes a user field corresponding to an RU indicated by the common field (corresponding to the basic bandwidth 1), and one user field corresponds to one RU.

A resource unit allocation subfield (RU Allocation subfield) (namely, an index number) in a resource allocation field included in a common field in a content channel 2 corresponding to a basic bandwidth 2 is used to indicate allocation of an RU whose subcarrier value range is [−169:2] [2:169] (For RUs overlapping tone range [−169:2][2:169]). A center RU subfield (namely, second indication information) indicates whether a center RU whose range (84 subcarriers) is [170:253] (and center 84 tone RU [170:253]) is allocated. A user specific field in the content channel 2 includes a user field corresponding to an RU indicated by the common field (corresponding to the basic bandwidth 2), and one user field corresponds to one RU.

A resource unit allocation subfield (RU Allocation subfield) (namely, an index number) in a resource allocation field included in a common field in a content channel 3 corresponding to a basic bandwidth 3 is used to indicate allocation of an RU whose subcarrier value range is [254:589] (For RUs overlapping tone range [254:589]). A center RU subfield (namely, second indication information) is a reserved value (center RU subfield reserved). A user specific field in the content channel 3 includes a user field corresponding to an RU indicated by the common field (corresponding to the basic bandwidth 3), and one user field corresponds to one RU.

When NCB=4, in other words, the channel bandwidth is 8.64 GHz, the PPDU includes four header B field content channels. Each content channel occupies 2.16 GHz, and the header B field content channels are different.

It should be understood that when the header B field content channels are different, each content channel is used to indicate RU distribution in a basic bandwidth corresponding to the content channel.

Figure 22:
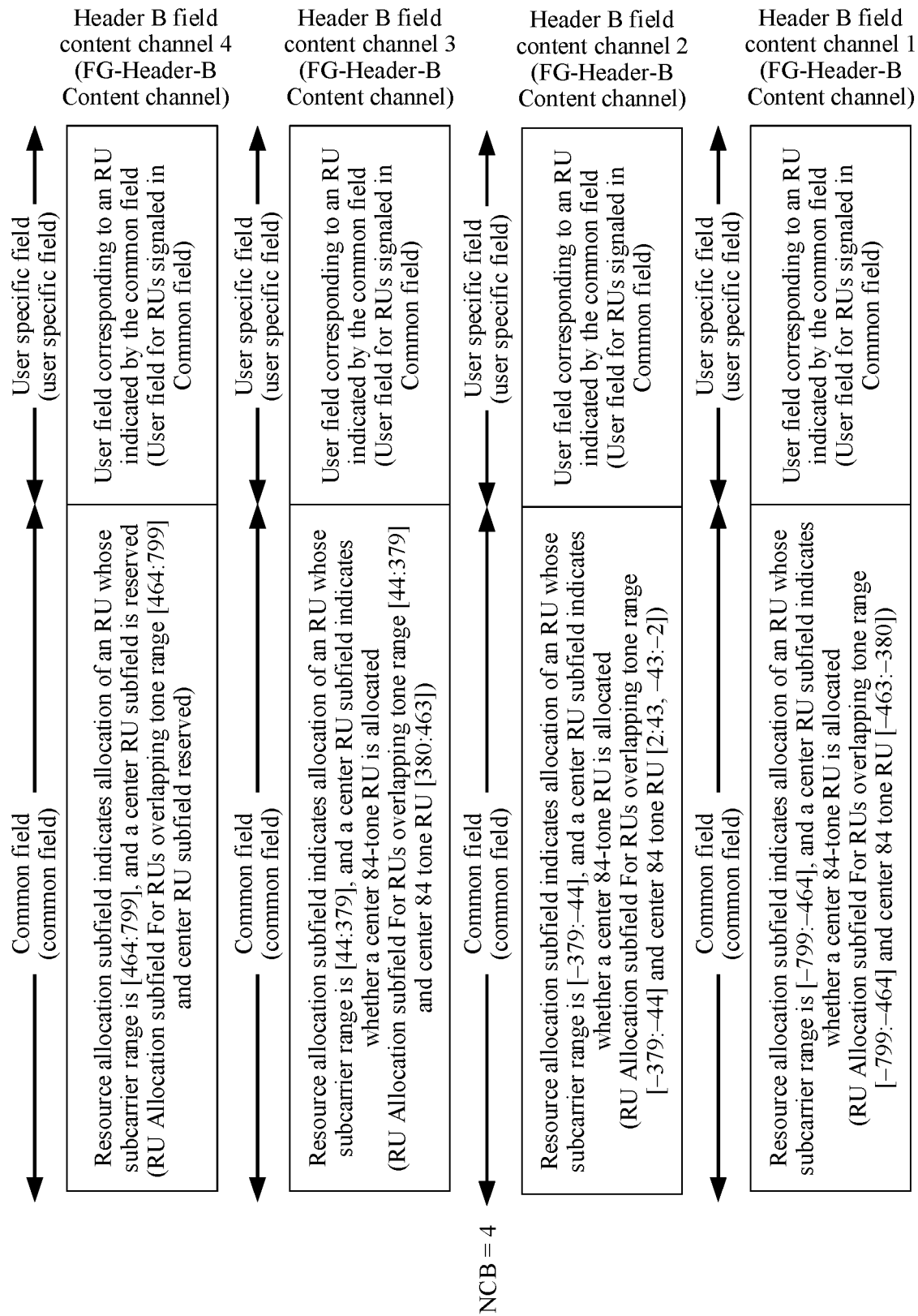
FIG. 22 is a schematic diagram of a content channel according to another embodiment of this application.

Specifically, as shown in FIG. 22, a resource unit allocation subfield (namely, an index number) included in a common field in a content channel 1 corresponding to a basic bandwidth 1 is used to indicate allocation of an RU whose subcarrier value range is [−799:−464] (For RUs overlapping tone range [−799:−464]). A center RU subfield (namely, second indication information) indicates whether a center RU whose range (84 subcarriers) is [−463:−380] (center 84 tone RU [−463:−380]) is allocated. A user specific field in the content channel 1 includes a user field corresponding to an RU indicated by the common field (corresponding to the basic bandwidth 1), and one user field corresponds to one RU.

A resource unit allocation subfield (namely, an index number) included in a common field in a content channel 2 corresponding to a basic bandwidth 2 is used to indicate allocation of an RU whose subcarrier value range is [−379:−44] (For RUs overlapping tone range [−379:−44]). A center RU subfield (namely, second indication information) indicates whether a center RU whose range (84 subcarriers) is [−43:−2] [2:43] (center 84 tone RU [−43:−2][2:43]) is allocated. A user specific field in the content channel 2 includes a user field corresponding to an RU indicated by the common field (corresponding to the basic bandwidth 2), and one user field corresponds to one RU.

A resource unit allocation subfield (namely, an index number) included in a common field in a content channel 3 corresponding to a basic bandwidth 3 is used to indicate allocation of an RU whose subcarrier value range is [44:379] (For RUs overlapping tone range [44:379]). A center RU subfield (namely, second indication information) indicates whether a center RU whose range (84 subcarriers) is [380:463] (center 84 tone RU [380:463]) is allocated. A user specific field in the content channel 3 includes a user field corresponding to an RU indicated by the common field (corresponding to the basic bandwidth 3), and one user field corresponds to one RU.

A resource unit allocation subfield (namely, an index number) included in a common field in a content channel 4 corresponding to a basic bandwidth 4 is used to indicate allocation of an RU whose subcarrier value range is [464:799] (For RUs overlapping tone range [464:799]). A center RU subfield (namely, second indication information) indicates that the subfield is a reserved value (center RU subfield reserved). A user specific field in the content channel 4 includes a user field corresponding to an RU indicated by the common field (corresponding to the basic bandwidth 4), and one user field corresponds to one RU.

With reference to the foregoing descriptions in FIG. 19 to FIG. 22, it can be learned that when the M resource allocation fields are different from each other, as shown in Table 6, a resource allocation field included in a common field in a content channel may include a 3-bit index number, used to indicate RU (which does not include a center RU)

distribution, and may further include 1-bit second indication information, used to indicate whether the center RU is allocated.

TABLE 6

| Resource allocation field | Number of bits | Descriptions |
| --- | --- | --- |
| Resource unit allocation subfield (index number) | 3 | Indicating RU allocation in a 2.16 GHz channel |
| Center RU subfield (second indication information) | 1 | If channel aggregation is 1 or NCB = 1, this field is a reserved value. Otherwise, this field indicates whether a center RU is allocated. |

Optionally, specific content of one user field is shown in Table 7. The user field includes an AID field, used to indicate a station to which an RU is allocated, a number of spatial streams (NSS) field, a used modulation and coding scheme (MCS) field, a dual-carrier modulation DCM indication information field, and the like. Specifically, when a common field (namely, a resource allocation field) indicates that when a plurality of RUs (for example, S RUs) are allocated to the station, the AID field includes S AIDs that are in a one-to-one correspondence with the S RUs. The terminal device may determine information such as the allocated RU and the corresponding coding scheme based on the user field, and the terminal device may receive the data on the RU corresponding to the terminal device.

TABLE 7

| Subfield | Number of bits | Descriptions |
| --- | --- | --- |
| AID | 8 | Indicating a station to which an RU is allocated |
| NSS | 1 | Indicating a number of spatial streams, which is set to a number obtained by subtracting 1 from a number of spatial-temporal streams |
| MCS | 5 | Indicating a modulation and coding scheme |
| DCM | 1 | Indicating whether to use dual-carrier modulation. This field is set to 1 to indicate that an FG data part of a corresponding user uses MCS dual-carrier modulation. This field is set to 0 to indicate that a PPDU payload of a corresponding user does not use MCS dual-carrier modulation. |

The foregoing describes a case in which the M resource allocation fields are different from each other. Optionally, in an implementation, the M resource allocation fields are the same. The following describes in detail the case in which the M resource allocation fields are the same.

Optionally, the M resource allocation fields are the same, and each resource allocation field includes M index numbers. The M index numbers are in a one-to-one correspondence with the M basic bandwidths, and one index number is used to indicate a size of an RU obtained by dividing one corresponding basic bandwidth and a location of the RU in frequency domain.

Optionally, each resource allocation field further includes first indication information used to indicate whether the M−1 center RUs are allocated.

Optionally, the first indication information is a bitmap and includes M−1 bits, and the M−1 bits are in a one-to-one correspondence with the M−1 center RUs.

In this embodiment of this application, the M resource allocation fields are set to be the same. Therefore, the receive end may obtain, by parsing only one resource allocation field without parsing all the resource allocation fields, allocation statuses of all RUs obtained by dividing the channel bandwidth. This has relatively low implementation complexity. In addition, the receive end duplicates resource indication information on a plurality of channels, thereby improving robustness of the resource indication information.

It should be noted that when the channel bandwidth is 2.16 GHz, the resource allocation field may further include 1-bit first indication information. In this case, a value of the first indication information is a reserved value or a null value.

An example of a signaling B content channel in the PPDU in this embodiment of this application is described in detail for the case in which regardless of whether the channel bandwidth is one or more 2.16 GHz, an RU obtained by dividing the channel bandwidth is an integer multiple of a subcarrier unit set, and the subcarrier unit set fixedly includes 84 subcarriers. The content channel includes a common field and a user specific field.

When NCB=1, in other words, the channel bandwidth is 2.16 GHz, the PPDU includes one header B field content channel.

Figure 23:
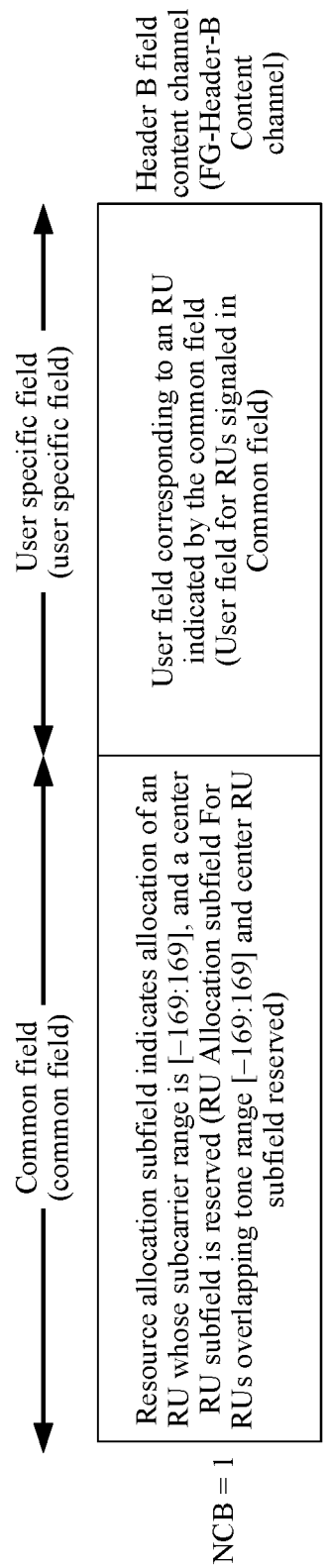
FIG. 23 is a schematic diagram of a content channel according to another embodiment of this application.

In an example, as shown in FIG. 23, a common field in the content channel includes a resource unit allocation subfield (RU Allocation subfield) (namely, an index number), used to indicate allocation of an RU whose subcarrier range is [−169:169] (For RUs overlapping tone range [−169:169]); and further includes a center RU subfield (namely, second indication information), which is a reserved value (center RU subfield reserved).

It should be understood that the resource allocation field may include four bits, where three bits are used as the index number to indicate RU distribution, and one bit is used as the first indication information and is a reserved value or a null value.

When NCB=2, in other words, the channel bandwidth is 4.32 GHz, the PPDU includes two header B field content channels. Each content channel occupies 2.16 GHz, and the two header B field content channels are the same. In other words, the second 2.16 GHz content channel is the first 2.16 GHz content channel that is duplicated (DUP).

Figure 24:
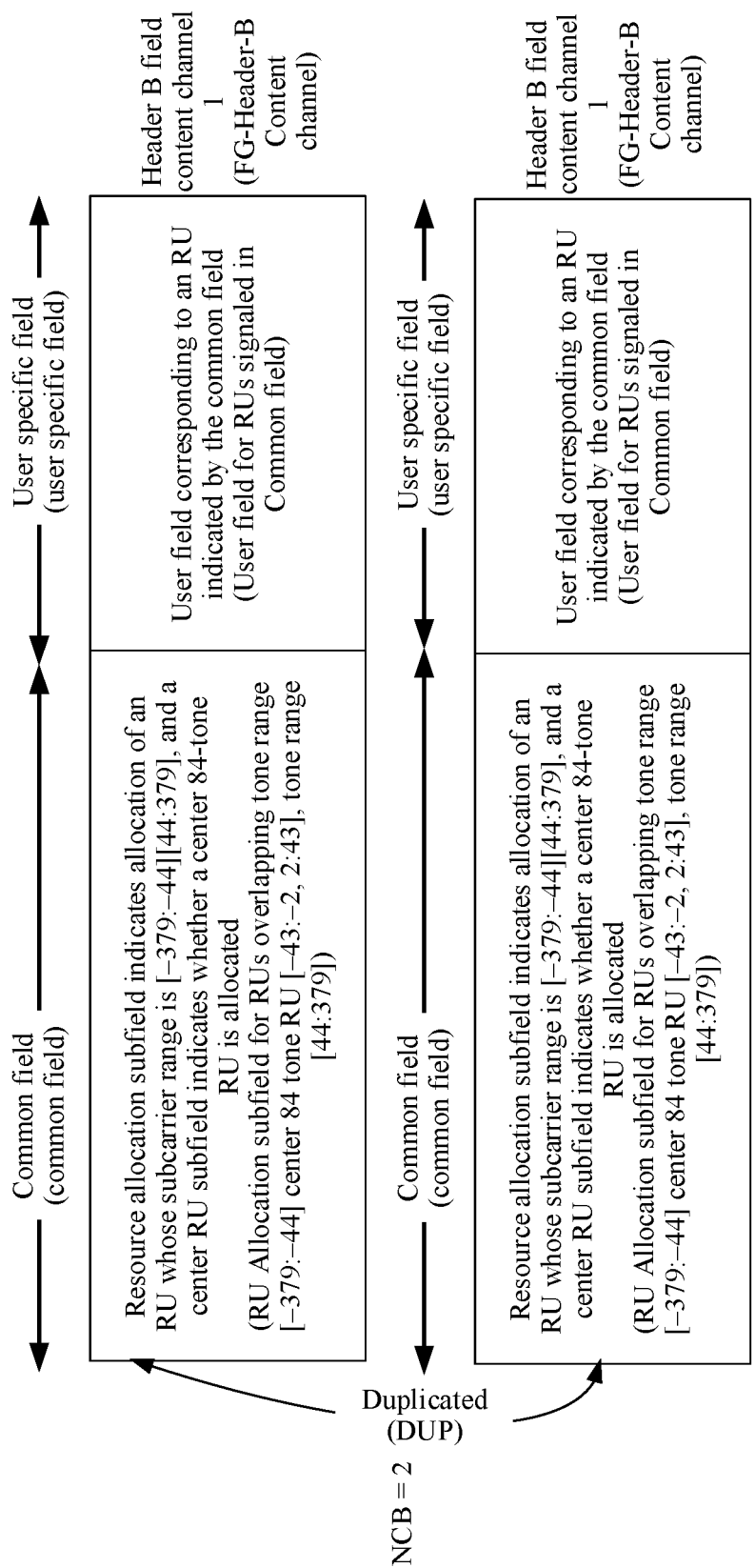
FIG. 24 is a schematic diagram of a content channel according to another embodiment of this application.

In an example, as shown in FIG. 24, common fields in the content channels include resource unit allocation subfields (which are two index numbers) and center RU subfields (namely, first indication information). The first index number corresponding to a basic bandwidth 1 indicates allocation of an RU whose subcarrier value range is [−379:−44] (For RUs overlapping tone range [−379:−44]). The first indication information is used to indicate whether a center RU whose range is [−43:−2, 2:43] (and center 84 tone RU [−43:−2, 2:43]) is allocated. The second index number corresponding to a basic bandwidth 2 indicates allocation of an RU whose subcarrier value range is [44:379] (For RUs overlapping tone range [44:379]).

The two index numbers included in the resource allocation fields each are three bits. The first indication information is one bit and is used to indicate whether one center RU is allocated.

When NCB=3, in other words, the channel bandwidth is 6.48 GHz, the PPDU includes three header B field content channels. Each content channel occupies 2.16 GHz, and the three header B field content channels are the same. In other words, the second 2.16 GHz content channel and the third 2.16 GHz content channel each are the first 2.16 GHz content channel that is duplicated (DUP).

Figure 25:
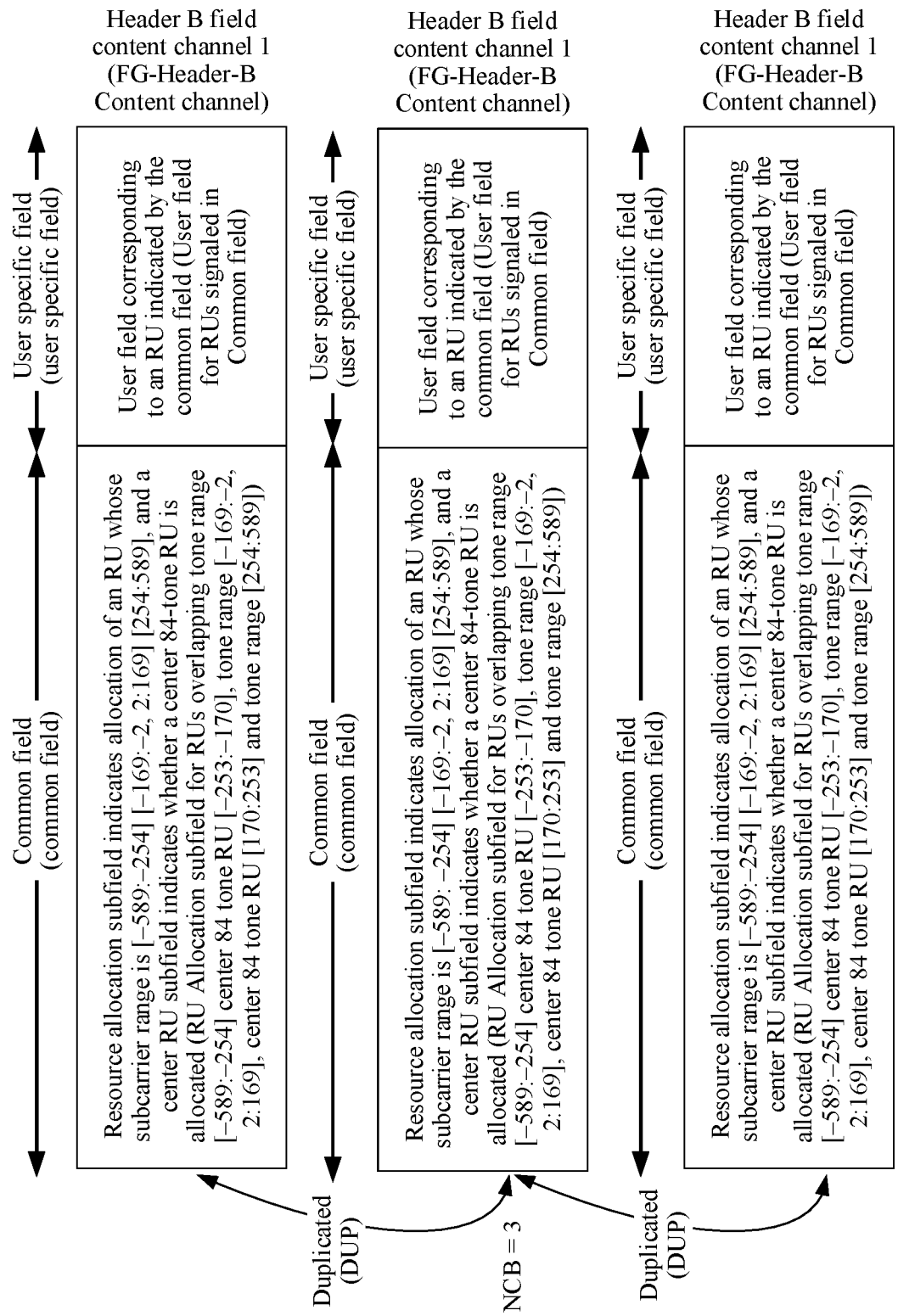
FIG. 25 is a schematic diagram of a content channel according to another embodiment of this application.

Specifically, as shown in FIG. 25, common fields in the content channels include resource allocation fields, and the resource allocation fields include resource unit allocation subfield (which are three index numbers) and center RU subfields (namely, first indication information). The first index number corresponding to a basic bandwidth 1 indicates allocation of an RU whose subcarrier value range is [−589:−254] (For RUs overlapping tone range [−589:−254]). The first indication information is used to indicate whether the first center RU whose range is [−253:−170] (and center 84 tone RU [−253:−170]) is allocated. The second index number corresponding to a basic bandwidth 2 indicates allocation of an RU whose subcarrier value range is [−169:2][2:169] (For RUs overlapping tone range [−169:2] [2:169]). The first indication information is further used to indicate whether the second center RU whose range is [170:253] (and center 84 tone RU [170:253]) is allocated. The third index number corresponding to a basic bandwidth 3 indicates allocation of an RU whose subcarrier value range is [254:589] (For RUs overlapping tone range [254:589]).

The three index numbers included in the three resource allocation fields each are three bits. The first indication information is two bits and the first indication information is used to indicate whether two center RUs are allocated.

When NCB=4, in other words, the channel bandwidth is 8.64 GHz, the PPDU includes four header B field content channels. Each content channel occupies 2.16 GHz, and the four header B field content channels are the same. In other words, the second 2.16 GHz content channel, the third 2.16 GHz content channel, and the fourth 2.16 GHz content channel each are the first 2.16 GHz content channel that is duplicated (DUP).

Figure 26:
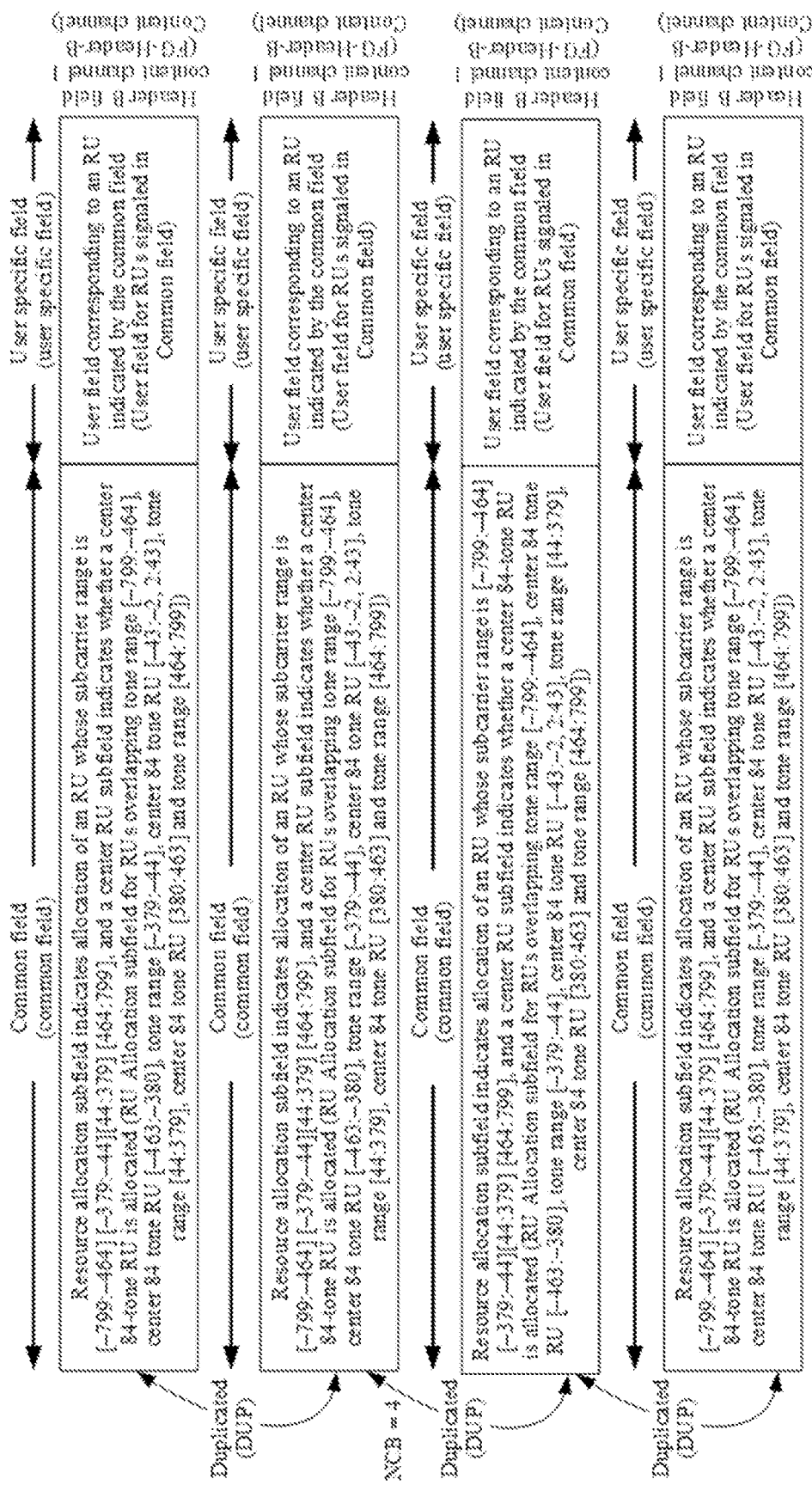
FIG. 26 is a schematic diagram of a content channel according to another embodiment of this application.

In an example, as shown in FIG. 26, common fields in the content channels include resource allocation fields, and the resource allocation fields include resource unit allocation subfields (which are four index numbers) and center RU subfields (namely, first indication information). The first index number corresponding to a basic bandwidth 1 indicates allocation of an RU whose subcarrier value range is [−799:−464] (For RUs overlapping tone range [−799:−464]). The first indication information is used to indicate whether the first center RU whose range is [−463:−380] (center 84 tone RU [−463:−380]) is allocated. The second index number corresponding to a basic bandwidth 2 indicates allocation of an RU whose subcarrier value range is [−379:−44] (For RUs overlapping tone range [−379:−44]). The first indication information is further used to indicate whether the second center RU whose range is [−43:−2] [2:43] (center 84 tone RU [−43:−2][2:43]) is allocated. The third index number corresponding to a basic bandwidth 3 indicates allocation of an RU whose subcarrier value range is [44:379] (For RUs overlapping tone range [44:379]). The first indication information is further used to indicate whether the third center RU whose range is [380:463] (center 84 tone RU [380:463]) is allocated. The fourth index number corresponding to a basic bandwidth 4 indicates allocation of an RU whose subcarrier value range is [464:799] (For RUs overlapping tone range [464:799]).

The four index numbers included in the four resource allocation fields each are three bits. The first indication information is three bits and the first indication information is used to indicate whether three center RUs are allocated.

With reference to FIG. 23 to FIG. 26, when the M resource allocation fields are the same, as shown in Table 8, resource allocation fields included in common fields in content channels may include M 3-bits (namely, M index numbers), used to indicate RU (which does not include a center RU) distribution, and may further include M−1 1-bit (namely, first indication information), used to indicate whether the center RU is allocated. Herein, M indicates a number of basic bandwidths included in a channel bandwidth, namely, a number of basic bandwidth bonding.

Specifically, when M=1, one bit indicating the center RU is a reserved value, and has no actual meaning. When M is greater than or equal to 2, the M−1 1-bit are used to indicate whether M−1 center RUs are allocated. Optionally, the one bit may not be included, and only the index number is included.

Specifically, when NCB=2, in other words, M=2, the first indication information is one bit. When the one bit indicating a center RU is set to 1, it indicates that a center 84 subcarrier RU is allocated to one user. Alternatively, when the one bit indicating a center RU is set to 0, it indicates that a center 84 subcarrier RU is not allocated to one user. In other words, if the center 84 subcarrier RU is allocated to one user, the bit is set to 1; or if the center 84 RU is not allocated to one user, the bit is set to 0.

When NCB=3, the first indication information is two bits. One of the two bits is used to indicate whether one center RU is allocated. The two bits indicating center RUs are set to: 1x, indicating that a user is allocated to a center 84 subcarrier RU with a lower frequency; or 0x. In other words, if the center RU with a lower frequency is allocated, the two bits are set to 1x; or if the center RU with a lower frequency is not allocated, the two bits are set to 0x. The two bits indicating center RUs are set to: x1, indicating that a user is allocated to a center 84 subcarrier RU with a higher frequency; or x0. In other words, if the center RU with a higher frequency is allocated, the two bits are set to x1; or if the center RU with a higher frequency is not allocated, the two bits are set to x0.

When NCB=4, the first indication information is three bits. One of the three bits is used to indicate whether one center RU is allocated. The three bits indicating center RUs are set to: 1xx, indicating that a user is allocated to a center 84 subcarrier RU with a lower frequency; or 0xx. In other words, if the center RU with a lower frequency is allocated, the three bits are set to 1xx; or if the center RU with a lower frequency is not allocated, the three bits are set to 0xx. The three bits indicating center RUs are set to: x1x, indicating that a user is allocated to an intermediate-frequency center 84 subcarrier RU; or x0x. In other words, if the center RU with a lower frequency is allocated, the three bits are set to x1x; or if the center RU with a lower frequency is not allocated, the three bits are set to x0x. The three bits indicating center RUs are set to: xx1, indicating that a user is allocated to a center 84 subcarrier RU with a higher frequency; or xx0. In other words, if the center RU with a higher frequency is allocated, the three bits are set to xx1; or if the center RU with a higher frequency is not allocated, the three bits are set to xx0.

TABLE 8

| Resource allocation field | Number of bits | Descriptions |
|---|---|---|
| Resource unit allocation subfield (index number) | Mx3 | Indicating RU allocation in frequency domain. Including M resource unit allocation subfields (index numbers). When NCB = 1, M = 1 When NCB = 2, M = 2 When NCB = 3, M = 3 When NCB = 4, M = 4 |
| Center RU subfield (first indication information) | Mx1 | Indicating whether a center RU is allocated. Herein, M indicates a number of basic bandwidths included in a channel bandwidth, namely, a number of basic bandwidth bonding NCB. Specifically, when M = 1, one bit indicating the center RU is a reserved value, and has no actual meaning. When M is greater than or equal to 2, the M − 1 bits are used to indicate whether M − 1 center RUs are allocated. Specifically, when NCB = 2, in other words, M = 2, the first indication information is one bit. When the one bit indicating a center RU is set to 1, it indicates that a user is allocated to a center 84 subcarrier RU. Alternatively, the one bit indicating a center RU is set to 0. When NCB = 3, the first indication information is two bits. The two bits indicating center RUs are set to: 1x, indicating that a user is allocated to a center 84 subcarrier RU with a lower frequency; or 0x. The two bits indicating center RUs are set to: x1, indicating that a user is allocated to a center 84 subcarrier RU with a higher frequency; or x0. When NCB = 4, the first indication information is three bits. The three bits indicating center RUs are set to: 1xx, indicating that a user is allocated to a center 84 subcarrier RU with a lower frequency; or 0xx. The three bits indicating center RUs are set to: x1x, indicating that a user is allocated to an intermediate-frequency center 84 subcarrier RU; or x0x. The three bits indicating center RUs are set to: xx1, indicating that a user is allocated to a center 84 subcarrier RU with a higher frequency; or xx0. |

Optionally, specific content of a user field in the header B field is similar to the foregoing descriptions in Table 7. Details are not described herein again.

The foregoing describes a case in which the M resource allocation fields are different from each other, and a case in which the M resource allocation fields are the same. However, this embodiment of this application is not limited thereto. In another example, the M resource allocation fields may alternatively have another form. An example is used below for description.

Specifically, the PPDU includes M resource allocation fields, the M resource allocation fields are in a one-to-one correspondence with the M basic bandwidths, each resource allocation field includes one or two index numbers, and each index number is used to indicate allocation of an RU in the basic bandwidth corresponding to the resource allocation field.

Optionally, each resource allocation field further includes third indication information used to indicate whether the M−1 center RUs are allocated.

Optionally, the third indication information includes one or two bits.

In this embodiment of this application, only one or two signaling B content channels are included in a channel bonding condition or a channel aggregation condition, so that the receive end needs to decode information from one or two sub-bands. In this embodiment of this application, implementation complexity and implementation efficiency can be balanced, and relatively low implementation complexity can be ensured while relatively high efficiency is achieved.

It should be noted that when the channel bandwidth is 2.16 GHz, the resource allocation field may further include 1-bit third indication information. In this case, a value of the third indication information is a reserved value or a null value.

Specifically, the following describes in detail an example of a signaling B content channel (content channel) in the PPDU in this embodiment of this application for the case in which regardless of whether the channel bandwidth is one or more 2.16 GHz, an RU obtained by dividing the channel bandwidth is an integer multiple of a subcarrier unit set, and the subcarrier unit set fixedly includes 84 subcarriers. The content channel includes a common field and a user specific field.

When NCB=1, in other words, the channel bandwidth is 2.16 GHz, the PPDU includes one header B field content channel.

Figure 27:
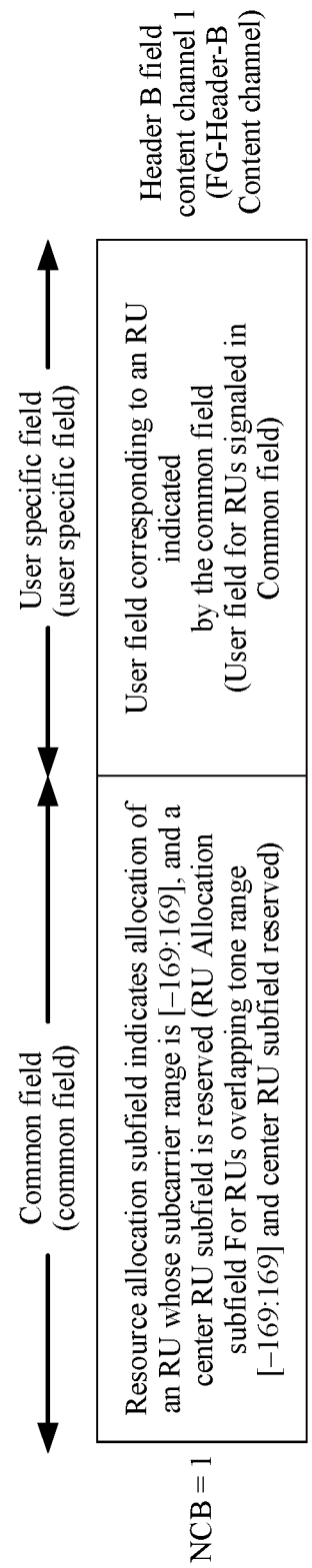
FIG. 27 is a schematic diagram of a content channel according to another embodiment of this application.

In an example, as shown in FIG. 27, a resource allocation field included in a common field in the content channel includes a resource unit allocation subfield (namely, an index number) and a center RU subfield (namely, third indication information). The index number is used to indicate allocation of an RU whose subcarrier range is [−169: 169] (For RUs overlapping tone range [−169:169]). The center RU subfield (namely, the third indication information) is a reserved value (center RU subfield reserved).

Specifically, the index number included in the resource allocation field is three bits. The third indication information is one bit and the third indication information is a reserved value or a null value.

When NCB=2, in other words, the channel bandwidth is 4.32 GHz, the PPDU includes two header B field content channels. Each content channel occupies 2.16 GHz, and the header B field content channels are different.

It should be understood that when the header B field content channels are different, each content channel is used to indicate RU distribution in a basic bandwidth corresponding to the content channel.

Figure 28:
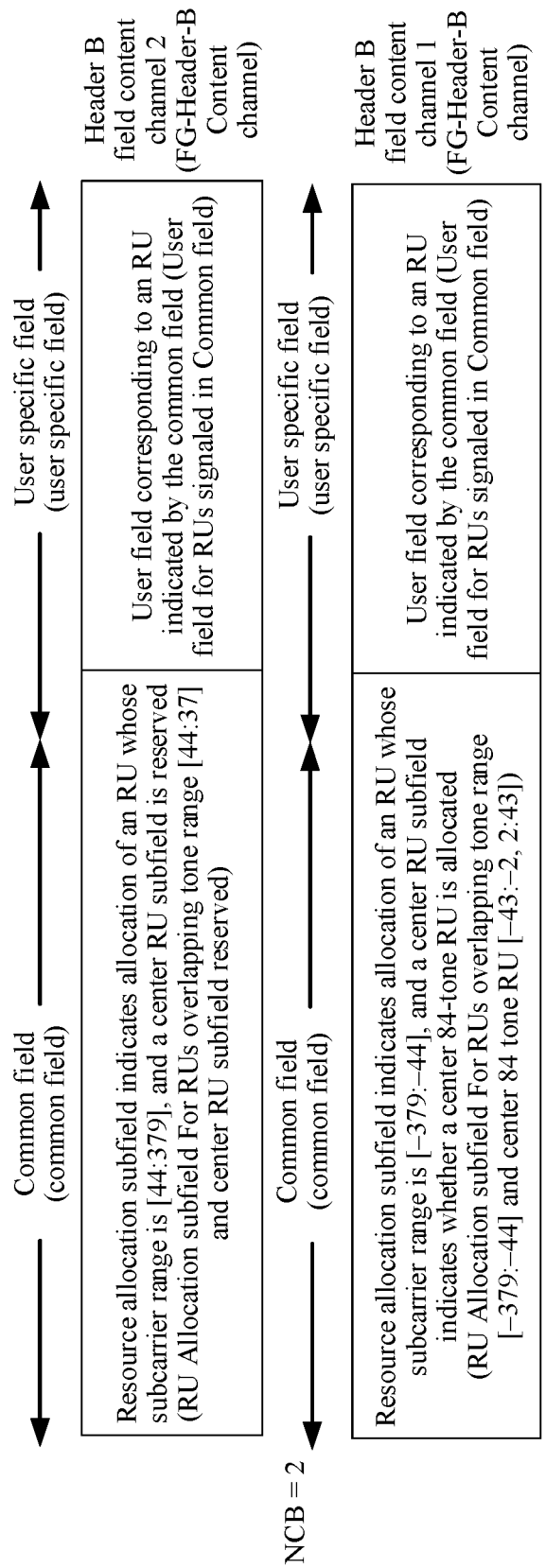
FIG. 28 is a schematic diagram of a content channel according to another embodiment of this application.

In an example, as shown in FIG. 28, a resource unit allocation subfield (RU Allocation subfield) (namely, an index number) in a resource allocation field included in a common field in a content channel 1 corresponding to a basic bandwidth 1 is used to indicate allocation of an RU whose subcarrier value range is [−379:−44] (For RUs overlapping tone range −379:−44). A center RU subfield (namely, third indication information) indicates whether a center RU whose range (84 subcarriers) is [−43:−2, 2:43] (and center 84 tone RU [−43:−2 2:43]) is allocated.

A resource unit allocation subfield (RU Allocation subfield) (namely, an index number) in a resource allocation field included in a common field in a content channel 2 corresponding to a basic bandwidth 2 is used to indicate allocation of an RU whose subcarrier value range is [44:379] (For RUs overlapping tone range [44:379]). A center RU subfield (namely, third indication information) is a reserved value (center RU subfield reserved).

Specifically, the two index numbers included in the resource allocation fields each are three bits. The third indication information is one bit and is used to indicate whether one center RU is allocated.

When NCB=3, in other words, the channel bandwidth is 6.48 GHz, the PPDU includes three header B field content channels. Each content channel occupies 2.16 GHz, and a content channel corresponding to a basic bandwidth 1 is the same as a content channel corresponding to a basic bandwidth 3. In other words, the third 2.16 GHz content channel is the first 2.16 GHz content channel that is duplicated (DUP).

Figure 29:
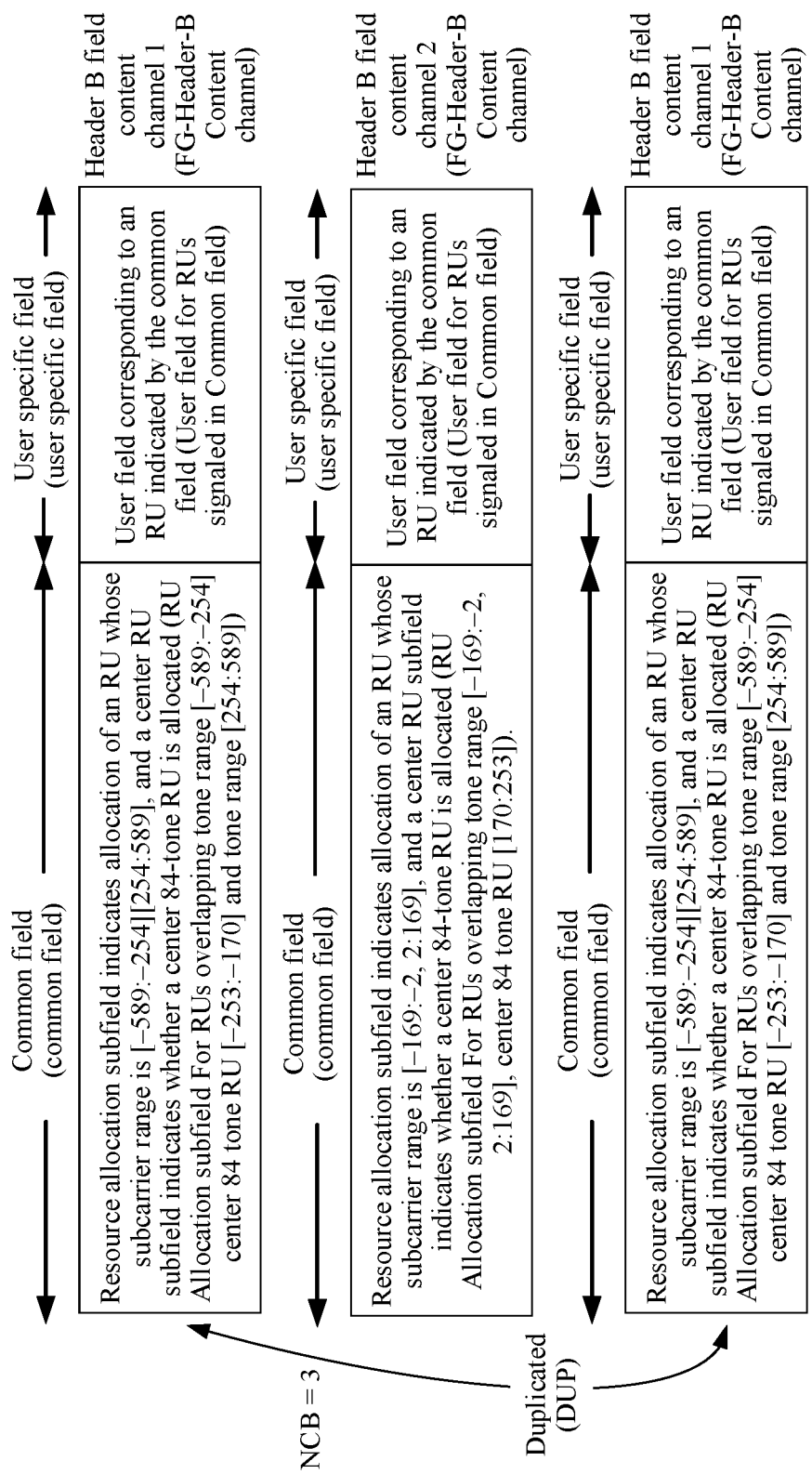
FIG. 29 is a schematic diagram of a content channel according to another embodiment of this application.

In an example, as shown in FIG. 29, resource allocation fields included in common fields in content channels 1 corresponding to the basic bandwidth 1 and the basic bandwidth 3 include resource unit allocation subfields (which are two index numbers, namely, the first index number corresponding to the basic bandwidth 1 and the third index number corresponding to the basic bandwidth 3) and same third indication information. The first index number corresponding to the basic bandwidth 1 is used to indicate allocation of an RU whose subcarrier value range is [−589:−254] (For RUs overlapping tone range [−589:−254]). The third indication information indicates whether a center RU whose range is [−253:−170] (and center 84 tone RU [−253:−170]) is allocated. The third index number corresponding to the basic bandwidth 3 indicates allocation of an RU whose subcarrier value range is [254:589] (For RUs overlapping tone range [254:589]).

A resource allocation field included in a common field in a content channel 2 corresponding to a basic bandwidth 2 includes a resource unit allocation subfield (which is one second index number) and one piece of third indication information. The second index number corresponding to the basic bandwidth 2 indicates allocation of an RU whose subcarrier value range is [−169:2][2:169] (For RUs overlapping tone range [−169:2][2:169]). The third indication information indicates whether a center RU whose range is [170:253] (and center 84 tone RU [170:253]) is allocated.

The index numbers included in the resource allocation fields each are three bits. The third indication information corresponding to the basic bandwidth 1 and the basic bandwidth 3 is one bit and the third indication information is used to indicate whether one center RU is allocated. The third indication information corresponding to the basic bandwidth 2 is one bit and the third indication information is used to indicate whether the other center RU is allocated.

When NCB=4, in other words, the channel bandwidth is 8.64 GHz, the PPDU includes four header B field content channels. Each content channel occupies 2.16 GHz, content channels corresponding to a basic bandwidth 1 and a basic bandwidth 3 are the same and are content channels 1, and content channels corresponding to a basic bandwidth 2 and a basic bandwidth 4 are the same and are content channels 2. In other words, the third 2.16 GHz content channel is the first 2.16 GHz content channel that is duplicated (DUP). The fourth 2.16 GHz content channel is the second 2.16 GHz content channel that is duplicated (DUP).

Figure 30:
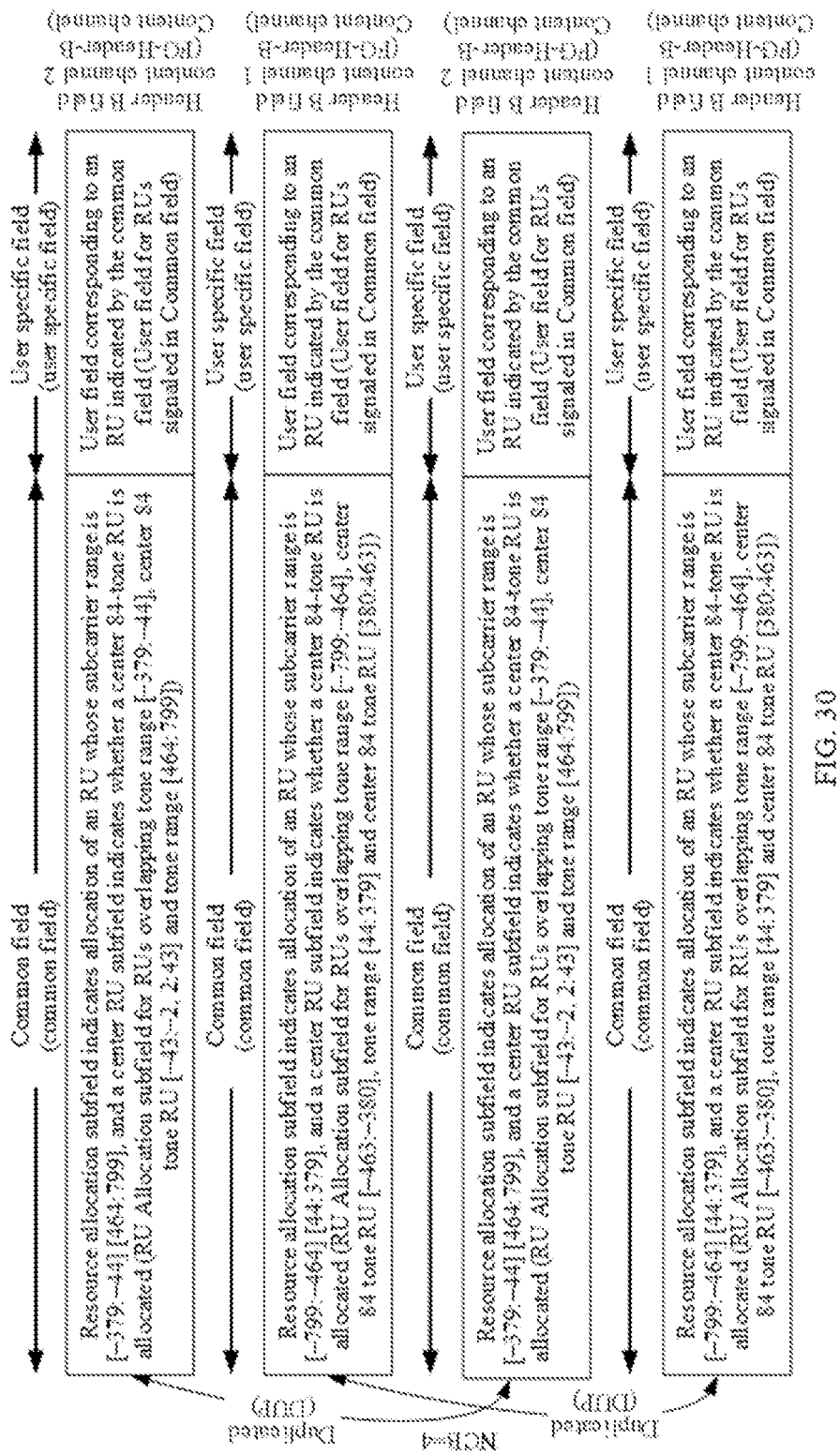
FIG. 30 is a schematic diagram of a content channel according to another embodiment of this application.

Specifically, as shown in FIG. 30, resource allocation fields included in common fields in the content channels 1 corresponding to the basic bandwidth 1 and the basic bandwidth 3 include resource unit allocation subfields (which are two index numbers, namely, the first index number corresponding to the basic bandwidth 1 and the third index number corresponding to the basic bandwidth 3) and same third indication information that indicates whether two center RUs (the first center RU and the third center RU) are allocated and whose size is two bits. Specifically, the first index number corresponding to the basic bandwidth 1 indicates allocation of an RU whose subcarrier value range is [−799:−464] (For RUs overlapping tone range [−799:−464]). The third indication information indicates whether the first center RU whose range (84 subcarriers) is [−463:−380] (center 84 tone RU [−463:−380]) is allocated. The third index number corresponding to the basic bandwidth 3 indicates allocation of an RU whose subcarrier value range is [44:379] (For RUs overlapping tone range [44:379]). The third indication information further indicates whether the third center RU whose range (84 subcarriers) is [380:463] (center 84 tone RU [380:463]) is allocated.

Resource allocation fields included in common fields in the content channels 2 corresponding to the basic bandwidth 2 and the basic bandwidth 4 include resource unit allocation subfields (which are two index numbers, namely, the second index number corresponding to the basic bandwidth 2 and the fourth index number corresponding to the basic bandwidth 4) and same third indication information that indicates whether one center RU (the second center RU) is allocated and whose size is one bit. Specifically, the second index number corresponding to the basic bandwidth 2 indicates allocation of an RU whose subcarrier value range is [−379:−44] (For RUs overlapping tone range [−379:−44]). The third indication information indicates whether the second center RU whose range is [−43:−2][2:43] (center 84 tone RU [−43:−2][2:43]) is allocated. The fourth index number corresponding to the basic bandwidth 4 indicates allocation of an RU whose subcarrier value range is [464:799] (For RUs overlapping tone range [464:799]).

Specifically, the index numbers included in the resource allocation fields each are three bits. The third indication information corresponding to the basic bandwidth 1 and the basic bandwidth 3 is two bits and the third indication information is used to indicate whether two center RUs are allocated. The third indication information corresponding to the basic bandwidth 2 and the basic bandwidth 4 is one bit and the third indication information is used to indicate whether another center RU is allocated.

With reference to FIG. 27 to FIG. 30, in this embodiment of this application, as shown in Table 9, resource allocation fields included in common fields in content channels may include Q 3-bits (namely, resource unit allocation subfields), used to indicate RU (which does not include a center RU) distribution, and may further include Z 1-bit (namely, center RU subfields), used to indicate whether the center RU is allocated.

Specifically, when NCB=1, in other words, M=1, Q=1, Z=1, and the 1-bit third indication information indicating a center RU is a reserved value and has no actual meaning.

Specifically, when NCB=2, in other words, M=2, Q=1, Z=1, and the third indication information is one bit. When the one bit indicating a center RU is set to 1, it indicates that a user is allocated to a center 84 subcarrier RU. Alternatively, the one bit indicating a center RU is set to 0.

When NCB=3, in other words, M=3, corresponding to the content channels 1, Q=2, and Z=1; and corresponding to the content channel 2, Q=1, and Z=1.

Specifically, the third indication information is one bit. When the one bit indicating a center RU is set to 1, it indicates that a user is allocated to a center 84 subcarrier RU. Alternatively, the one bit indicating a center RU is set to 0.

When NCB=4, in other words, M=4, corresponding to the content channels 1, Q=2, and Z=2; and corresponding to the content channels 2, Z=1. The third indication information is two bits. The two bits indicating center RUs are set to: 1x, indicating that a user is allocated to a center 84 subcarrier RU with a lower frequency; or 0x. The two bits indicating center RUs are set to: x1, indicating that a user is allocated to a center 84 subcarrier RU with a higher frequency; or x0. The third indication information is one bit. When the one bit indicating a center RU is set to 1, it indicates that a user is allocated to a center 84 subcarrier RU. Alternatively, the one bit indicating a center RU is set to 0.

TABLE 9

| Resource allocation field | Number of bits | Descriptions |
| --- | --- | --- |
| Resource unit allocation subfield (index number) | Qx3 | Indicating RU allocation in frequency domain. Including Q resource unit allocation subfields. When NCB = 1 or channel aggregation = 1, Q = 1. When NCB = 2, Q = 1. When NCB = 3, Q = 2 (content channel 1) or 1 (content channel 2). When NCB = 4, Q = 2. |
| Center RU subfield (third indication information) | Zx1 | If NCB = 1, this field is reserved, Z is set to 1, and the value is set to 0. Otherwise, this field indicates whether a center RU is allocated. When NCB = 2, Z = 1 (For the content channel 2, this field is reserved). When NCB = 3, Z = 1. When NCB = 4, Z = 2 (content channel 1) or 1 (content channel 2). |

Optionally, specific content of a user field in the header B field is similar to the foregoing descriptions in Table 7. Details are not described herein again.

It should be understood that the foregoing embodiment describes the RU division method. This embodiment of this application describes an RU indication method based on the RU division method. Certainly, in this embodiment of this application, the RU indication method may alternatively be used independently, and is not limited to the RU division methods in the foregoing embodiments.

Figure 31:
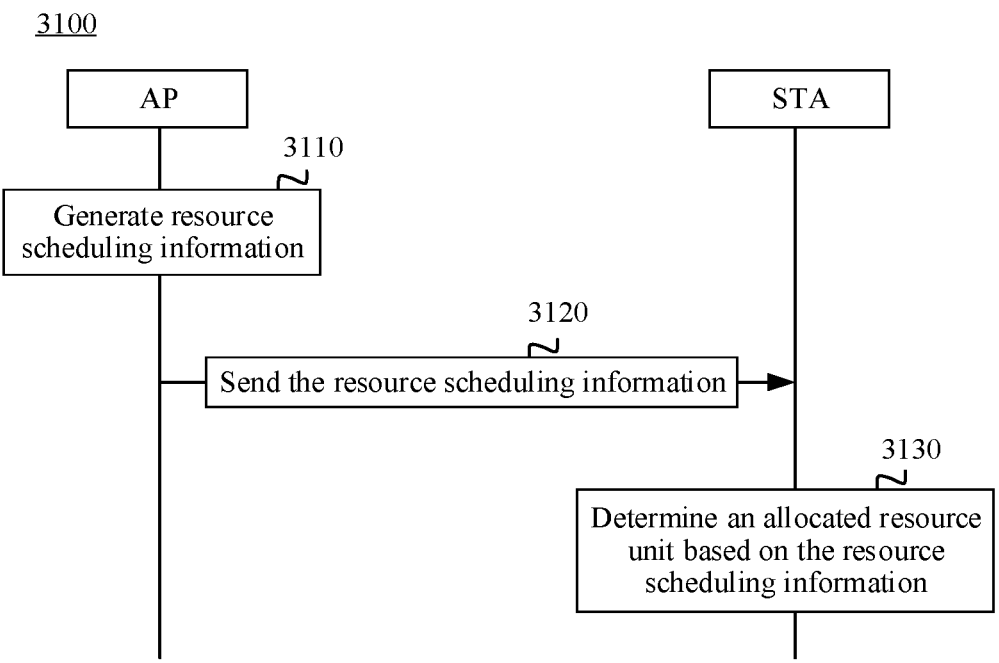
FIG. 31 is a schematic diagram of a resource scheduling method according to an embodiment of this application.

An embodiment of this application further provides a resource scheduling method, applied to uplink transmission of a 60 GHz wireless local area network communications system. As shown in FIG. 31, the method includes the following steps.

3110: An access point generates resource scheduling information, where the resource scheduling information includes at least one resource unit allocation field and at least one station identifier field; one station identifier field is used to indicate one station, and one resource unit allocation field is used to indicate a resource unit RU allocated to the one station; and the RU is included in M basic bandwidths, the basic bandwidth is 2.16 GHz, and M is a positive integer.

3120: The access point sends the resource scheduling information.

Correspondingly, the station receives the resource scheduling information.

3130: The station determines, based on the resource scheduling information, the resource unit allocated to the station.

Further, after determining the resource unit, the station may send uplink data on the resource unit. Correspondingly, the access point receives the uplink data on the resource unit.

Optionally, in an embodiment, one RU allocated to the station includes N subcarrier unit sets, where N is a positive integer.

The subcarrier unit set includes 84 subcarriers, and each subcarrier unit set includes 80 data subcarriers and four pilot subcarriers. Optionally, any two adjacent pilot subcarriers in the four pilot subcarriers are spaced by 20 data subcarriers from each other.

Alternatively, the subcarrier unit set includes 80 subcarriers, and each subcarrier unit set includes 76 data subcarriers and four pilot subcarriers. Optionally, any two adjacent pilot subcarriers in the four pilot subcarriers are spaced by 19 data subcarriers from each other.

It should be understood that in this embodiment of this application, a number of subcarriers included in one subcarrier unit set is not limited to 84 or 80. One subcarrier unit set may alternatively include another number of subcarriers. This embodiment of this application is not limited thereto. For example, in actual application, one subcarrier unit set includes 82, 86, 70, or 88 subcarriers.

Optionally, the resource unit allocation field includes a first part of bits and a second part of bits, and the first part of bits and the second part of bits are jointly used to indicate a size of the RU and a location of the RU in the M basic bandwidths. Optionally, in an embodiment, information indicated by a value of the first part of bits may include but is not limited to one or more of the following:

when the first part of bits is a first value, it indicates that the RU is located in the Pt basic bandwidth in the M basic bandwidths;

when the first part of bits is a second value, it indicates that the RU is located in the $2^{nd}$ basic bandwidth in the M basic bandwidths;

when the first part of bits is a third value, it indicates that the RU is located in the $3^{rd}$ basic bandwidth in the M basic bandwidths;

when the first part of bits is a fourth value, it indicates that the RU is located in the $4^{th}$ basic bandwidth in the M basic bandwidths;

when the first part of bits is a fifth value, it indicates that the RU is a center RU between the $1^{st}$ basic bandwidth and the $2^{nd}$ basic bandwidth in the M basic bandwidths;

when the first part of bits is a sixth value, it indicates that the RU is a center RU between the $2^{nd}$ basic bandwidth and the $3^{rd}$ basic bandwidth in the M basic bandwidths; or when the first part of bits is a seventh value, it indicates that the RU is a center RU between the $3^{rd}$ basic bandwidth and the $4^{th}$ basic bandwidth in the M basic bandwidths.

Further, in an embodiment, the first part of bits includes at least three bits.

For example, as shown in Table 6, the first part of bits is the first three bits. The first value to the seventh value are 000, 001, 010, 011, 100, 101, and 110. Herein, x1 to x4 represent the second part of bits, and y1 to y4 also represent the second part of bits. When the second part of bits is y1 to y4, the second part of bits may be a null value or a reserved value.

Specifically, if the four basic bandwidths in ascending order of frequencies are the first 2.16 GHz, the second 2.16 GHz, the third 2.16 GHz, and the fourth 2.16 GHz, the information indicated by the value of the first part of bits may include one or more of the following:

when the value of the first part of bits is 000, it indicates that the RU is located on the first 2.16 GHz;

when the value of the first part of bits is 001, it indicates that the RU is located on the second 2.16 GHz;

when the value of the first part of bits is 010, it indicates that the RU is located on the third 2.16 GHz;

when the value of the first part of bits is 011, it indicates that the RU is located on the fourth 2.16 GHz;

when the value of the first part of bits is 100, it indicates that the RU is the first center RU between the first 2.16 GHz and the second 2.16 GHz;

when the value of the first part of bits is 101, it indicates that the RU is the second center RU between the second 2.16 GHz and the third 2.16 GHz;

when the value of the first part of bits is 110, it indicates that the RU is the third center RU between the third 2.16 GHz and the fourth 2.16 GHz; or when the value of the first part of bits is 111, the first part of bits is a reserved value.

Optionally, in another embodiment, one basic bandwidth includes four subcarrier unit sets, and the four subcarrier unit sets in ascending order of frequencies are a first subcarrier unit set, a second subcarrier unit set, a third subcarrier unit set, and a fourth subcarrier unit set.

When a value of the first part of bits is a first value to a fourth value, a meaning indicated by a value of the second part of bits may include one or more of the following:

when the second part of bits is an eighth value, it indicates that the RU is the first subcarrier unit set;

when the second part of bits is a ninth value, it indicates that the RU is the second subcarrier unit set;

when the second part of bits is a tenth value, it indicates that the RU is the third subcarrier unit set;

when the second part of bits is an eleventh value, it indicates that the RU is the fourth subcarrier unit set;

when the second part of bits is a twelfth value, it indicates that the RU is an RU including the first subcarrier unit set and the second subcarrier unit set;

when the second part of bits is a thirteenth value, it indicates that the RU is an RU including the second subcarrier unit set and the third subcarrier unit set;

when the second part of bits is a fourteenth value, it indicates that the RU is an RU including the third subcarrier unit set and the fourth subcarrier unit set;

when the second part of bits is a fifteenth value, it indicates that the RU is an RU including the first subcarrier unit set, the second subcarrier unit set, and the third subcarrier unit set;

when the second part of bits is a sixteenth value, it indicates that the RU is an RU including the second subcarrier unit set, the third subcarrier unit set, and the fourth subcarrier unit set; or when the second part of bits is a seventeenth value, it indicates that the RU is an RU including the first subcarrier unit set, the second subcarrier unit set, the third subcarrier unit set, and the fourth subcarrier unit set.

Optionally, the second part of bits includes at least four bits.

For example, as shown in Table 10, the second part of bits is four bits. Values of the eighth value to the seventeenth value of the second part of bits are 0000, 0001, 0010, 0011, 0100, 0101, 0110, 0111, 1000, and 1001. It should be understood that when the second part of bits is set to another value, for example, 1010, 1011, 1100, 1101, 1110, or 1111, the second part of bits may be a reserved value.

Specifically, as shown in Table 10, in a case in which a value of the first part of bits is a first value to a fourth value, for example, 000, 001, 010, and 011, when the second part of bits is 0000, it indicates that the RU is the first subcarrier unit set (84 or 80 subcarriers); when the second part of bits is 0001, it indicates that the RU is the second subcarrier unit set (84 or 80 subcarriers); when the second part of bits is 0010, it indicates that the RU is the third subcarrier unit set (84 or 80 subcarriers); when the second part of bits is 0011, it indicates that the RU is the fourth subcarrier unit set (84 or 80 subcarriers); when the second part of bits is 0100, it indicates that the RU is the RU (168 or 160 subcarriers) including the first subcarrier unit set and the second subcarrier unit set; when the second part of bits is 0101, it indicates that the RU is the RU (168 or 160 subcarriers) including the second subcarrier unit set and the third subcarrier unit set; when the second part of bits is 0110, it indicates that the RU is the RU (168 or 160 subcarriers) including the third subcarrier unit set and fourth subcarrier unit set; when the second part of bits is 0111, it indicates that the RU is the RU (252 or 240 subcarriers) including the first subcarrier unit set, the second subcarrier unit set, and the third subcarrier unit set; when the second part of bits is 1000, it indicates that the RU is the RU (252 or 240 subcarriers) including the second subcarrier unit set, the third subcarrier unit set, and the fourth subcarrier unit set; or when the second part of bits is 1001, it indicates that the RU is the RU (336 or 320 subcarriers) including the first subcarrier unit set, the second subcarrier unit set, the third subcarrier unit set, and the fourth subcarrier unit set.

It should be noted that 84/80 in Table 10 indicates that one subcarrier unit set may include 84 subcarriers or 80 subcarriers. Table 10 corresponds to two cases. In a first case, all RUs are positive integer multiples of 84. In a second case, all RUs are integer multiples of 80.

TABLE 10

| First subcarrier unit set | Second subcarrier unit set | Third subcarrier unit set | Fourth subcarrier unit set |
|---|---|---|---|
| 84/80 | 84/80 | 84/80 | 84/80 |
| 168/160 | 168/160 | | |
| | | 168/160 | |
| | | | 168/160 |
| 252/240 | | | |
| 252/240 | | | |
| | | 336/320 | |

In an example, an RU indicated by a value of the resource unit allocation field is shown in Table 11.

TABLE 11

| Resource unit allocation field (B6 to B0) | Descriptions | Number of entries |
|---|---|---|
| 000 x1x2x3x4 | When B6 – B4 = 000, it indicates that an RU is located on the first 2.16 GHz, and x1x2x3x4 indicates the RU allocated on the first 2.16 GHz. | 8 |

TABLE 11-continued

| Resource unit allocation field (B6 to B0) | Descriptions | Number of entries |
|---|---|---|
| 001 x1x2x3x4 | When B6 – B4 = 001, it indicates that an RU is located on the second 2.16 GHz, and x1x2x3x4 indicates the RU allocated on the second 2.16 GHz. | 8 |
| 010 x1x2x3x4 | When B6 – B4 = 010, it indicates that an RU is located on the third 2.16 GHz, and x1x2x3x4 indicates the RU allocated on the third 2.16 GHz. | 8 |
| 011 x1x2x3x4 | When B6 – B4 = 011, it indicates that an RU is located on the fourth 2.16 GHz, and x1x2x3x4 indicates the RU allocated on the fourth 2.16 GHz. | 8 |
| 100 y1y2y3y4 | When B6 – B4 = 100, it indicates that an RU is the first center RU between the first 2.16 GHz and the second 2.16 GHz. | 1 |
| 101 y1y2y3y4 | When B6 – B4 = 101, it indicates that an RU is the second center RU between the second 2.16 GHz and the third 2.16 GHz. | 1 |
| 110 y1y2y3y4 | When B6 – B4 = 110, it indicates that an RU is the third center RU between the third 2.16 GHz and the fourth 2.16 GHz. | 1 |
| 111 y1y2y3y4 | Reserved value | 8 | x1x2x3x4 indicates resource unit allocation on associated 2.16 GHz (as shown in Table 10).
y1y2y3y4 is a null bit.

It may be understood that there are a total of 16 values of x1x2x3x4 from 0000 to 1111 (including 0000 and 1111), and 10 values may be selected from the 16 values to indicate the 10 RUs shown in Table 10. For example, there are a total of 10 values of x1x2x3x4 from 0000 to 1001. To be specific, x1x2x3x4 from 0 to 9 indicates the 10 RUs shown in Table 10. For example, one subcarrier unit set includes 84 subcarriers. 0000 to 0011 sequentially indicate four 84-tone RUs, 0100 to 0110 sequentially indicate three 168-tone RUs, 0111 and 1000 sequentially indicate two 252-tone RUs, and 1111 indicates one 336-tone RU.

Alternatively, in another embodiment, one basic bandwidth includes four subcarrier unit sets, and the four subcarrier unit sets in ascending order of frequencies are a first subcarrier unit set, a second subcarrier unit set, a third subcarrier unit set, and a fourth subcarrier unit set.

When a value of the first part of bits is a first value to a fourth value, a meaning indicated by a value of the second part of bits may include one or more of the following:
  when the second part of bits is an eighth value, it indicates that the RU is the first subcarrier unit set;
  when the second part of bits is a ninth value, it indicates that the RU is the second subcarrier unit set;
  when the second part of bits is a tenth value, it indicates that the RU is the third subcarrier unit set;
  when the second part of bits is an eleventh value, it indicates that the RU is the fourth subcarrier unit set;
  when the second part of bits is a twelfth value, it indicates that the RU is an RU including the first subcarrier unit set and the second subcarrier unit set;
  when the second part of bits is a thirteenth value, it indicates that the RU is an RU including the second subcarrier unit set and the third subcarrier unit set;
  when the second part of bits is a fourteenth value, it indicates that the RU is an RU including the third subcarrier unit set and the fourth subcarrier unit set; or
  when the second part of bits is a fifteenth value, it indicates that the RU is an RU including the first subcarrier unit set, the second subcarrier unit set, the third subcarrier unit set, and the fourth subcarrier unit set.

Optionally, the second part of bits includes at least three bits.

For example, as shown in Table 12, the second part of bits is three bits. Values of the eighth value to the fifteenth value of the second part of bits are 000, 001, 010, 011, 100, 101, 110, and 111.

Specifically, as shown in Table 13, in a case in which a value of the first part of bits is a first value to a fourth value, for example, 000, 001, 010, and 011, when the second part of bits is 000, it indicates that the RU is the first subcarrier unit set (84 or 80 subcarriers);
  when the second part of bits is 001, it indicates that the RU is the second subcarrier unit set (84 or 80 subcarriers);
  when the second part of bits is 010, it indicates that the RU is the third subcarrier unit set (84 or 80 subcarriers);
  when the second part of bits is 011, it indicates that the RU is the fourth subcarrier unit set (84 or 80 subcarriers);
  when the second part of bits is 100, it indicates that the RU is an RU (168 or 160 subcarriers) including the first subcarrier unit set and the second subcarrier unit set;
  when the second part of bits is 101, it indicates that the RU is an RU (168 or 160 subcarriers) including the second subcarrier unit set and the third subcarrier unit set;
  when the second part of bits is 110, it indicates that the RU is an RU (168 or 160 subcarriers) including the third subcarrier unit set and the fourth subcarrier unit set; or
  when the second part of bits is 111, it indicates that the RU is an RU (336 or 320 subcarriers) including the first subcarrier unit set, the second subcarrier unit set, the third subcarrier unit set, and the fourth subcarrier unit set.

TABLE 12

| First subcarrier unit set | Second subcarrier unit set | Third subcarrier unit set | Fourth subcarrier unit set |
|---|---|---|---|
| 84/80 | 84/80 | 84/80 | 84/80 |
| 168/160 | | | |
| | 168/160 | | |
| | | 168/160 | |
| 336/320 | | | |

In an example, an RU indicated by a value of the resource unit allocation field is shown in Table 13.

TABLE 13

| Resource unit allocation field (B5 to B0) | Descriptions | Number of entries |
|---|---|---|
| 000 x1x2x3 | When B5 – B3 = 000, it indicates that an RU is located on the first 2.16 GHz, and x1x2x3 indicates the RU allocated on the first 2.16 GHz. | 8 |

TABLE 13-continued

| Resource unit allocation field (B5 to B0) | Descriptions | Number of entries |
|---|---|---|
| 001 x1x2x3 | When B5 − B3 = 001, it indicates that an RU is located on the second 2.16 GHz, and x1x2x3x4 indicates the RU allocated on the second 2.16 GHz. | 8 |
| 010 x1x2x3 | When B5 − B3 = 010, it indicates that an RU is located on the third 2.16 GHz, and x1x2x3x4 indicates the RU allocated on the third 2.16 GHz. | 8 |
| 011 x1x2x3 | When B5 − B3 = 011, it indicates that an RU is located on the fourth 2.16 GHz, and x1x2x3x4 indicates the RU allocated on the fourth 2.16 GHz. | 8 |
| 100 y1y2y3 | When B5 − B3 = 100, it indicates that an RU is the first center RU between the first 2.16 GHz and the second 2.16 GHz. | 1 |
| 101 y1y2y3 | When B5 − B3 = 101, it indicates that an RU is the second center RU between the second 2.16 GHz and the third 2.16 GHz. | 1 |
| 110 y1y2y3 | When B5 − B3 = 110, it indicates that an RU is the third center RU between the third 2.16 GHz and the fourth 2.16 GHz. | 1 |
| 111 y1y2y3 | Reserved value | 8 | x1x2x3 from 0 to 7 indicates resource unit allocation on associated 2.16 GHz (as shown in Table 12).
y1y2y3 is a null bit.

It may be understood that there are a total of eight values of x1x2x3 from 000 to 111, and the eight values may indicate the eight RUs shown in Table 12. For example, there are a total of eight values of x1x2x3 from 000 to 111. To be specific, x1x2x3 from 0 to 7 indicates the eight RUs shown in Table 12. For example, one subcarrier unit set includes 84 subcarriers. 000 to 111 sequentially indicate four 84-tone RUs, 100 to 110 sequentially indicate three 168-tone RUs, and 111 indicates one 336-tone RU.

In an example, the resource scheduling information is carried in a trigger frame. The access point generates and sends the trigger frame, where the trigger frame is used to trigger the station to perform uplink multi-user data transmission. The station determines, based on the resource scheduling information in the trigger frame, a resource unit corresponding to the station, and may send uplink data on the resource unit.

Specifically, the resource scheduling information may be carried in a user field in the trigger frame.

In this embodiment of this application, based on RU allocation of a common field and the user field in the trigger frame and a user physical layer parameter design, flexible uplink scheduling can be implemented, and technical complexity of synchronization can be reduced.

Specifically, in this embodiment of this application, the trigger frame may include a common field and a user field.

Optionally, a format of the user field is shown in Table 14. Specifically, an AID subfield in the user field carries an AID of a station corresponding to the user field. A length is the same as that of a user field in FG60-Header-B.

An RU allocation subfield is used to indicate an RU used when a STA identified by the AID subfield performs uplink data transmission. Specifically, for the resource unit allocation subfield, refer to Table 14 below.

A number of streams (Number of ss) subfield indicates a number of streams sent in a PPDU.

TABLE 14

| Field name | AID | RU allocation | Number of ss | MCS | DCM |
|---|---|---|---|---|---|
| Number of bits | 8 | 6 | 3 | 4 | 1 |

An embodiment of this application provides a resource scheduling method, which may be applied to high-frequency uplink multi-user transmission, to implement high-frequency OFDMA communication. It should be noted that the RU division method in the channel bandwidth in this embodiment of this application may be the RU division method described in Embodiment 1. Certainly, in this embodiment of this application, the RU indication method may alternatively be used independently, and is not limited to the RU division methods in Embodiment 1.

It should be understood that the foregoing examples in FIG. 1 to FIG. 31 are merely intended to help a person skilled in the art understand the embodiments of this application, but are not intended to limit the embodiments of this application to a specific value or a specific scenario in the examples. It is clear that a person skilled in the art may make various equivalent modifications or changes based on the examples shown in FIG. 1 to FIG. 31, and such modifications or changes also fall within the scope of the embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the methods in the embodiments of this application with reference to FIG. 1 to FIG. 31. The following describes apparatuses in embodiments of this application with reference to FIG. 32 to FIG. 35.

Figure 32:
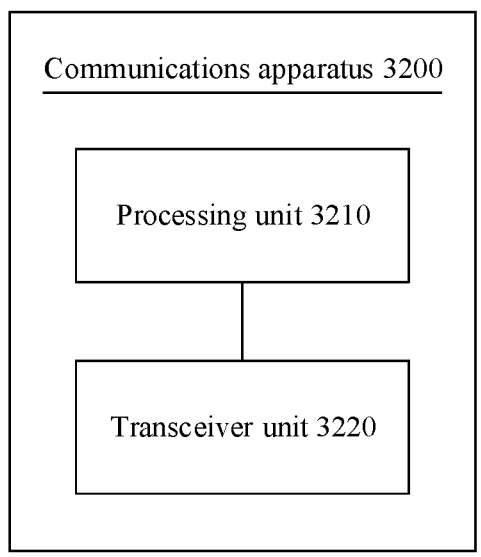
FIG. 32 is a schematic block diagram of a communications apparatus according to an embodiment of this application.

FIG. 32 shows a data transmission communications apparatus 3200 according to an embodiment of this application. The communications apparatus 3200 may include a processing unit 3210 and a transceiver unit 3220.

In an implementation, the communications apparatus 3200 can be configured to implement procedures and steps corresponding to the access point in the method embodiment in FIG. 16.

Specifically, the processing unit is configured to generate a physical protocol data unit PPDU, where a data part of the PPDU is carried on at least one resource unit RU.

The transceiver unit is configured to send the PPDU to at least one station by using a channel bandwidth, where the channel bandwidth includes M basic bandwidths, the basic bandwidth is 2.16 GHz, M is an integer greater than or equal to 1, and the M basic bandwidths are divided into the at least one RU.

Therefore, in this embodiment of this application, the channel bandwidth is divided into one or more RUs, so that different RUs can be allocated to different stations, different frequency resources are allocated to the different stations at a same moment, and a plurality of stations efficiently access a channel, to implement an OFDMA technology in a high-frequency scenario, and improve channel utilization and transmission efficiency.

Optionally, one basic bandwidth includes four subcarrier unit sets in ascending order of frequencies.

Each subcarrier unit set includes 84 subcarriers, each subcarrier unit set includes 80 data subcarriers and four pilot subcarriers, and any two adjacent pilot subcarriers in the four pilot subcarriers are spaced by 20 data subcarriers from each other.

Alternatively, each subcarrier unit set includes 80 subcarriers, each subcarrier unit set includes 76 data subcarriers and four pilot subcarriers, and any two adjacent pilot subcarriers in the four pilot subcarriers are spaced by 19 data subcarriers from each other.

Optionally, one subcarrier unit set constitutes one first RU, two subcarrier unit sets with consecutive frequencies constitute one second RU, three subcarrier unit sets with consecutive frequencies constitute one third RU, and four subcarrier unit sets with consecutive frequencies constitute one fourth RU.

Optionally, when the channel bandwidth includes M=1 basic bandwidth, and is 2.16 GHz, the at least one RU obtained by dividing the one basic bandwidth includes a first part of RUs.

The first part of RUs in ascending order of frequencies is:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

Optionally, when the channel bandwidth includes M=2 basic bandwidths, which include a first basic bandwidth and a second basic bandwidth, and is 4.32 GHz, the at least one RU obtained by dividing the two basic bandwidths includes a first part of RUs, a second part of RUs, and one center RU.

A frequency of the first part of RUs is lower than that of the center RU, and corresponds to the first basic bandwidth; and a frequency of the second part of RUs is higher than that of the center RU, and corresponds to the second basic bandwidth.

The first part of RUs and the second part of RUs in ascending order of frequencies each include:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

A number of subcarriers on the center RU is the same as a number of subcarriers in one subcarrier unit set, the first half of subcarriers on the center RU is located on a left side of a direct current subcarrier and includes two pilot subcarriers, and the second half of subcarriers on the center RU is located on a right side of the direct current subcarrier and includes two pilot subcarriers.

Optionally, when the channel bandwidth includes M=3 basic bandwidths, which are a first basic bandwidth, a second basic bandwidth, and a third basic bandwidth, and is 6.48 GHz, the at least one RU includes a first part of RUs, a second part of RUs, a third part of RUs, a first center RU, and a second center RU.

A frequency of the first part of RUs is lower than that of the first center RU, and corresponds to the first basic bandwidth; a frequency of the second part of RUs is higher than that of the first center RU, and the frequency of the second part of RUs is lower than that of the second center RU and corresponds to the second basic bandwidth; and a frequency of the third part of RUs is higher than that of the second center RU, and corresponds to the third basic bandwidth.

The first part of RUs, the second part of RUs, and the third part of RUs in ascending order of frequencies each include:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

The first center RU is one subcarrier unit set; and the second center RU is one subcarrier unit set.

Optionally, when the channel bandwidth includes M=4 basic bandwidths, which are a first basic bandwidth, a second basic bandwidth, a third basic bandwidth, and a fourth basic bandwidth, and is 8.64 GHz, the at least one RU includes a first part of RUs, a second part of RUs, a third part of RUs, a fourth part of RUs, a first center RU, a second center RU, and a third center RU.

A frequency of the first part of RUs is lower than that of the first center RU, and corresponds to the first basic bandwidth; a frequency of the second part of RUs is higher than that of the first center RU, and the frequency of the second part of RUs is lower than that of the second center RU and corresponds to the second basic bandwidth; a frequency of the third part of RUs is higher than that of the second center RU, and the frequency of the third part of RUs is lower than that of the third center RU and corresponds to the third basic bandwidth; and a frequency of the fourth part of RUs is higher than that of the third center RU, and corresponds to the fourth basic bandwidth.

The first part of RUs, the second part of RUs, the third part of RUs, and the fourth part of RUs in ascending order of frequencies each include:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

The first center RU is one subcarrier unit set; the third center RU is one subcarrier unit set; and a number of subcarriers on the second center RU is the same as a number of subcarriers in one subcarrier unit set, the first half of subcarriers on the second center RU is located on a left side of a direct current subcarrier and includes two pilot subcarriers, and the second half of subcarriers on the second center RU is located on a right side of the direct current subcarrier and includes two pilot subcarriers.

Optionally, the at least one RU includes M−1 center RUs, and each center RU is not an RU located at either end of the at least one RU.

Optionally, the PPDU includes M resource allocation fields, and all the resource allocation fields are the same and each include M index numbers.

The M index numbers are in a one-to-one correspondence with the M basic bandwidths, and each index number is used to indicate a size of an RU obtained by dividing the basic bandwidth corresponding to the index number and a location of the RU in frequency domain.

Optionally, each resource allocation field further includes first indication information used to indicate whether the M−1 center RUs are allocated.

Optionally, the first indication information is a bitmap and includes M−1 bits, and the M−1 bits are in a one-to-one correspondence with the M−1 center RUs.

Optionally, the PPDU includes M resource allocation fields, the M resource allocation fields are in a one-to-one correspondence with the M basic bandwidths, each resource allocation field includes one index number, and the index number is used to indicate a size of an RU obtained by dividing the basic bandwidth corresponding to the resource allocation field and a location of the RU in frequency domain.

Optionally, only M−1 resource allocation fields in the M resource allocation fields further include second indication information used to indicate whether the M−1 center RUs are allocated, and each piece of second indication information corresponds to one of the M−1 center RUs.

Optionally, a remaining resource allocation field further includes second indication information, and the second indication information is a reserved value or a null value.

Optionally, the second indication includes one bit.

Optionally, when a value of the index number is a first value, it indicates that RUs, in ascending order of frequencies, obtained by dividing the corresponding basic bandwidth include four first RUs.

Alternatively, when a value of the index number is a second value, it indicates that RUs, in ascending order of frequencies, obtained by dividing the corresponding basic bandwidth include one second RU, one first RU, and one first RU.

Alternatively, when a value of the index number is a third value, it indicates that RUs, in ascending order of frequencies, obtained by dividing the corresponding basic bandwidth include one first RU, one second RU, and one first RU.

Alternatively, when a value of the index number is a fourth value, it indicates that RUs, in ascending order of frequencies, obtained by dividing the corresponding basic bandwidth include one first RU, one first RU, and one second RU.

Alternatively, when a value of the index number is a fifth value, it indicates that RUs, in ascending order of frequencies, obtained by dividing the corresponding basic bandwidth include two second RUs.

Alternatively, when a value of the index number is a sixth value, it indicates that RUs, in ascending order of frequencies, obtained by dividing the corresponding basic bandwidth include one third RU and one first RU.

Alternatively, when a value of the index number is a seventh value, it indicates that RUs, in ascending order of frequencies, obtained by dividing the corresponding basic bandwidth include one first RU and one third RU.

Alternatively, when a value of the index number is an eighth value, it indicates that RUs, in ascending order of frequencies, obtained by dividing the corresponding basic bandwidth include one fourth RU.

Optionally, the index number includes at least three bits.

Optionally, the resource allocation field is carried in a header B field.

It should be understood that the apparatus 3200 has any function of the access point in the method embodiment in FIG. 16. Details are not described herein again.

It should be understood that the term "unit" in this embodiment of this application may be an application-specific integrated circuit (application-specific integrated circuit, ASIC), an electronic circuit, a processor (for example, a shared processor, a dedicated processor, or a group processor) configured to execute one or more software or firmware programs, a memory, a merge logic circuit, and/or another suitable component that supports the described function.

In an optional example, the apparatus 3200 provided in this application corresponds to the process performed by the access point in the method embodiment in FIG. 16. For functions of the units/modules in the apparatus, refer to the foregoing descriptions. Details are not described herein again.

It should be understood that the apparatus in FIG. 32 may be an access point, or may be a chip or an integrated circuit installed in an access point.

Figure 33:
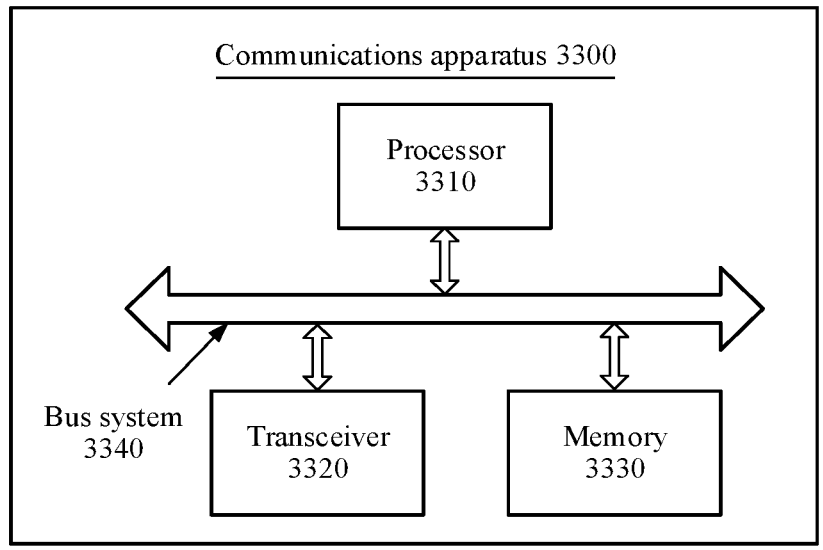
FIG. 33 is a schematic block diagram of a communications apparatus on an access point side according to an embodiment of this application.

FIG. 33 is a schematic structural diagram of a communications apparatus 3300 on an access point side according to an embodiment of this application. The communications apparatus shown in FIG. 33 may be an access point AP, or may be a chip in an access point AP. The communications apparatus 3300 may be applied to the system shown in FIG. 1.

As shown in FIG. 33, the communications apparatus 3300 may include a processor 3310 and a transceiver 3320. The processor 3310 is connected to the transceiver 3320. Optionally, the communications apparatus 3300 further includes a memory 3330, and the memory 3330 is connected to the processor 3310. Further, optionally, the communications apparatus 3300 may further include a bus system 3340. The processor 3310, the memory 3330, and the transceiver 3320 may be connected by using the bus system 3340. The memory 3330 may be configured to store an instruction. The processor 3310 may correspond to the processing unit 3210, and the transceiver 3320 may correspond to the transceiver unit 3220. Specifically, the processor 3310 is configured to execute the instruction to control the transceiver 3320 to receive and send information or signals, and the memory 3330 stores the instruction.

It should be understood that in this embodiment of this application, the processor may be a central processing unit (Central Processing Unit, "CPU" for short), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory may include a read-only memory and a random access memory, and provide an instruction and data for the processor. A part of the memory may further include a nonvolatile random access memory. For example, the memory may further store information about a device type.

The bus system may include a power bus, a control bus, a status signal bus, and the like in addition to a data bus. However, for clear description, various types of buses in the figures are marked as the bus system.

In an implementation process, the steps in the foregoing methods may be completed by using a hardware integrated logic circuit in the processor or an instruction in a form of software. The steps in the methods disclosed with reference to the embodiments of this application may be directly performed and completed by a hardware processor, or may be performed and completed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing methods in combination with hardware of the processor. To avoid repetition, details are not described herein again.

In an implementation, the communications apparatus 3300 shown in FIG. 33 can implement the processes related to the access point in the method embodiment in FIG. 16. The operations and/or the functions of the modules in the communications apparatus 3300 are intended to implement corresponding procedures in the foregoing method embodiment. For details, refer to the descriptions in the foregoing method embodiments. To avoid repetition, detailed descriptions are properly omitted herein.

Figure 34:
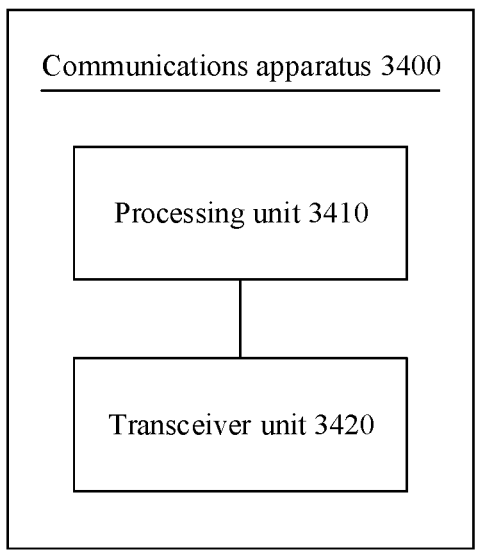
FIG. 34 is a schematic block diagram of a communications apparatus according to another embodiment of this application.

FIG. 34 is a schematic structural diagram of a data transmission communications apparatus according to an embodiment of this application. The communications apparatus 3400 may include:

a processing unit 3410 and a transceiver unit 3420.

In an implementation, the communications apparatus 3400 can perform the actions performed by the station in the method embodiment in FIG. 16.

The transceiver unit is configured to receive a physical protocol data unit PPDU by using a channel bandwidth, where a data part of the PPDU is carried on at least one resource unit RU, the channel bandwidth includes M basic bandwidths, the basic bandwidth is 2.16 GHz, M is an integer greater than or equal to 1, and the M basic bandwidths are divided into the at least one RU.

The processing unit is configured to parse the data part that is of the PPDU and that is carried on the at least one RU.

In this embodiment of this application, the channel bandwidth is divided into one or more RUs, so that different RUs can be allocated to different stations, different frequency resources are allocated to the different stations at a same moment, and a plurality of stations efficiently access a channel, to implement an OFDMA technology in a high-frequency scenario, and improve channel utilization and transmission efficiency.

Optionally, one basic bandwidth includes four subcarrier unit sets in ascending order of frequencies.

Each subcarrier unit set includes 84 subcarriers, each subcarrier unit set includes 80 data subcarriers and four pilot subcarriers, and any two adjacent pilot subcarriers in the four pilot subcarriers are spaced by 20 data subcarriers from each other.

Alternatively, each subcarrier unit set includes 80 subcarriers, each subcarrier unit set includes 76 data subcarriers and four pilot subcarriers, and any two adjacent pilot subcarriers in the four pilot subcarriers are spaced by 19 data subcarriers from each other.

Optionally, one subcarrier unit set constitutes one first RU, two subcarrier unit sets with consecutive frequencies constitute one second RU, three subcarrier unit sets with consecutive frequencies constitute one third RU, and four subcarrier unit sets with consecutive frequencies constitute one fourth RU.

Optionally, when the channel bandwidth includes M=1 basic bandwidth, and is 2.16 GHz, the at least one RU obtained by dividing the one basic bandwidth includes a first part of RUs.

The first part of RUs in ascending order of frequencies is:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

Optionally, when the channel bandwidth includes M=2 basic bandwidths, which include a first basic bandwidth and a second basic bandwidth, and is 4.32 GHz, the at least one RU obtained by dividing the two basic bandwidths includes a first part of RUs, a second part of RUs, and one center RU.

A frequency of the first part of RUs is lower than that of the center RU, and corresponds to the first basic bandwidth; and a frequency of the second part of RUs is higher than that of the center RU, and corresponds to the second basic bandwidth.

The first part of RUs and the second part of RUs in ascending order of frequencies each include:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

A number of subcarriers on the center RU is the same as a number of subcarriers in one subcarrier unit set, the first half of subcarriers on the center RU is located on a left side of a direct current subcarrier and includes two pilot subcarriers, and the second half of subcarriers on the center RU is located on a right side of the direct current subcarrier and includes two pilot subcarriers.

Optionally, when the channel bandwidth includes M=3 basic bandwidths, which are a first basic bandwidth, a second basic bandwidth, and a third basic bandwidth, and is 6.48 GHz, the at least one RU includes a first part of RUs, a second part of RUs, a third part of RUs, a first center RU, and a second center RU.

A frequency of the first part of RUs is lower than that of the first center RU, and corresponds to the first basic bandwidth; a frequency of the second part of RUs is higher than that of the first center RU, and the frequency of the second part of RUs is lower than that of the second center RU and corresponds to the second basic bandwidth; and a frequency of the third part of RUs is higher than that of the second center RU, and corresponds to the third basic bandwidth.

The first part of RUs, the second part of RUs, and the third part of RUs in ascending order of frequencies each include:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

The first center RU is one subcarrier unit set; and the second center RU is one subcarrier unit set.

Optionally, when the channel bandwidth includes M=4 basic bandwidths, which are a first basic bandwidth, a second basic bandwidth, a third basic bandwidth, and a fourth basic bandwidth, and is 8.64 GHz, the at least one RU includes a first part of RUs, a second part of RUs, a third part of RUs, a fourth part of RUs, a first center RU, a second center RU, and a third center RU.

A frequency of the first part of RUs is lower than that of the first center RU, and corresponds to the first basic bandwidth; a frequency of the second part of RUs is higher than that of the first center RU, and the frequency of the second part of RUs is lower than that of the second center RU and corresponds to the second basic bandwidth; a frequency of the third part of RUs is higher than that of the second center RU, and the frequency of the third part of RUs is lower than that of the third center RU and corresponds to the third basic bandwidth; and a frequency of the fourth part of RUs is higher than that of the third center RU, and corresponds to the fourth basic bandwidth.

The first part of RUs, the second part of RUs, the third part of RUs, and the fourth part of RUs in ascending order of frequencies each include:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

The first center RU is one subcarrier unit set; the third center RU is one subcarrier unit set; and a number of subcarriers on the second center RU is the same as a number of subcarriers in one subcarrier unit set, the first half of subcarriers on the second center RU is located on a left side of a direct current subcarrier and includes two pilot subcarriers, and the second half of subcarriers on the second center RU is located on a right side of the direct current subcarrier and includes two pilot subcarriers.

Optionally, the at least one RU includes M−1 center RUs, and each center RU is not an RU located at either end of the at least one RU.

Optionally, the PPDU includes M resource allocation fields, and all the resource allocation fields are the same and each include M index numbers.

The M index numbers are in a one-to-one correspondence with the M basic bandwidths, and each index number is used to indicate a size of an RU obtained by dividing the basic bandwidth corresponding to the index number and a location of the RU in frequency domain.

Optionally, each resource allocation field further includes first indication information used to indicate whether the M−1 center RUs are allocated.

Optionally, the first indication information is a bitmap and includes M−1 bits, and the M−1 bits are in a one-to-one correspondence with the M−1 center RUs.

Optionally, the PPDU includes M resource allocation fields, the M resource allocation fields are in a one-to-one correspondence with the M basic bandwidths, each resource allocation field includes one index number, and the index number is used to indicate a size of an RU obtained by dividing the basic bandwidth corresponding to the resource allocation field and a location of the RU in frequency domain.

Optionally, only M−1 resource allocation fields in the M resource allocation fields further include second indication information used to indicate whether the M−1 center RUs are allocated, and each piece of second indication information corresponds to one of the M−1 center RUs.

Optionally, a remaining resource allocation field further includes second indication information, and the second indication information is a reserved value or a null value.

Optionally, the second indication includes one bit.

Optionally, when a value of the index number is a first value, it indicates that RUs, in ascending order of frequencies, obtained by dividing the corresponding basic bandwidth include four first RUs.

Alternatively, when a value of the index number is a second value, it indicates that RUs, in ascending order of frequencies, obtained by dividing the corresponding basic bandwidth include one second RU, one first RU, and one first RU.

Alternatively, when a value of the index number is a third value, it indicates that RUs, in ascending order of frequencies, obtained by dividing the corresponding basic bandwidth include one first RU, one second RU, and one first RU.

Alternatively, when a value of the index number is a fourth value, it indicates that RUs, in ascending order of frequencies, obtained by dividing the corresponding basic bandwidth include one first RU, one first RU, and one second RU.

Alternatively, when a value of the index number is a fifth value, it indicates that RUs, in ascending order of frequencies, obtained by dividing the corresponding basic bandwidth include two second RUs.

Alternatively, when a value of the index number is a sixth value, it indicates that RUs, in ascending order of frequencies, obtained by dividing the corresponding basic bandwidth include one third RU and one first RU.

Alternatively, when a value of the index number is a seventh value, it indicates that RUs, in ascending order of frequencies, obtained by dividing the corresponding basic bandwidth include one first RU and one third RU.

Alternatively, when a value of the index number is an eighth value, it indicates that RUs, in ascending order of frequencies, obtained by dividing the corresponding basic bandwidth include one fourth RU.

Optionally, the index number includes at least three bits.

Optionally, the resource allocation field is carried in a header B field.

It should be understood that the apparatus 3400 has any function of the station in the method embodiment. Details are not described herein again.

It should be understood that the apparatus in FIG. 34 may be a station, or may be a chip or an integrated circuit installed in a station.

Figure 35:
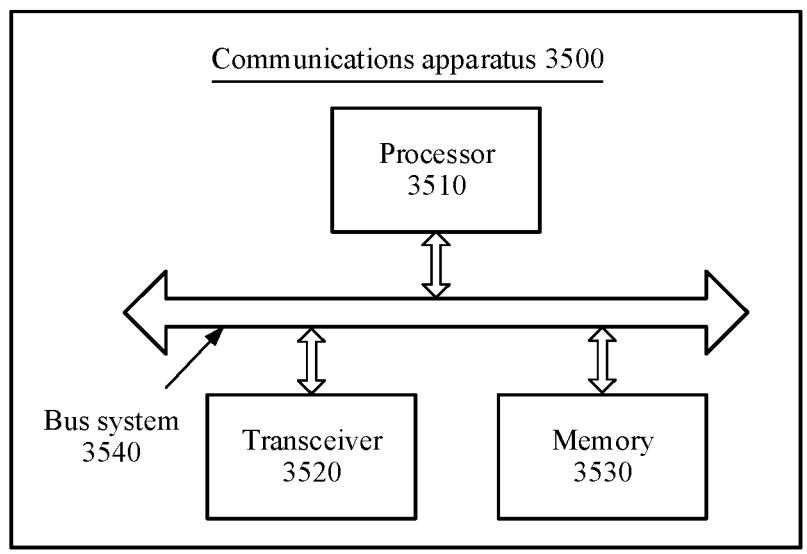
FIG. 35 is a schematic block diagram of a communications apparatus on a station side according to an embodiment of this application.

FIG. 35 is a schematic structural diagram of a communications apparatus on a station side according to an embodiment of this application. The communications apparatus may be a station, or may be a chip or an integrated circuit in a station. The communications apparatus 3500 on a station side may be applied to the system shown in FIG. 1.

As shown in FIG. 35, the apparatus 3500 on a station side may include a processor 3510 and a transceiver 3520. The processor 3510 is connected to the transceiver 3520. Optionally, the communications apparatus 3500 further includes a memory 3530, and the memory 3530 is connected to the processor 3510. Further, optionally, the communications apparatus 3500 may further include a bus system 3540. The processor 3510, the memory 3530, and the transceiver 3520 may be connected by using the bus system 3540. The memory 3530 may be configured to store an instruction. The processor 3510 may correspond to the processing unit 3410, and the transceiver 3520 may correspond to the transceiver unit 3420. Specifically, the processor 3510 is configured to execute the instruction to control the transceiver 3520 to receive and send information or signals, and the memory 3530 is configured to store the instruction.

In an implementation, the apparatus 3500 on a station side shown in FIG. 35 can implement the processes related to the station in the method embodiment in FIG. 16. The operations and/or the functions of the modules in the apparatus 3500 on a station side are intended to implement corresponding procedures in the foregoing method embodiment. For details, refer to the descriptions in the foregoing method embodiments. To avoid repetition, detailed descriptions are properly omitted herein.

In another implementation, the communications apparatus 3200 can perform the actions performed by the access point in the method embodiment in FIG. 18.

Specifically, the processing unit is configured to generates resource indication information, where the resource indication information is used to indicate a size of at least one resource unit RU obtained by dividing a channel bandwidth and a location of the at least one resource unit RU in frequency domain; and the channel bandwidth includes M basic bandwidths, each of the M basic bandwidths is 2.16 GHz, and M is an integer greater than or equal to 1.

The transceiver unit is configured to send the resource indication information to a receive end.

Therefore, in this embodiment of this application, the channel bandwidth is divided into one or more RUs, so that the transmit end can indicate, by using the resource indication information, to allocate different RUs to different receive ends, and the receive end can determine the resource unit allocated by the transmit end, and receive data on a corresponding resource unit. In this embodiment of this application, resources of a plurality of stations can be simultaneously indicated, thereby improving resource indication efficiency.

Optionally, one RU includes N subcarrier unit sets, where N is an integer greater than or equal to 1.

The subcarrier unit set includes 84 subcarriers, each subcarrier unit set includes 80 data subcarriers and four pilot subcarriers, and any two adjacent pilot subcarriers in the four pilot subcarriers are spaced by 20 data subcarriers from each other.

Alternatively, the subcarrier unit set includes 80 subcarriers, each subcarrier unit set includes 76 data subcarriers and four pilot subcarriers, and any two adjacent pilot subcarriers in the four pilot subcarriers are spaced by 19 data subcarriers from each other.

Optionally, the at least one RU includes M−1 center RUs, and each center RU is not an RU located at either end of the at least one RU.

Optionally, the resource indication information includes M resource allocation fields, the M resource allocation fields are the same, and each resource allocation field includes M index numbers. The M index numbers are in a one-to-one correspondence with the M basic bandwidths, and one index number is used to indicate a size of an RU obtained by dividing one corresponding basic bandwidth and a location of the RU in frequency domain.

Optionally, each resource allocation field further includes first indication information used to indicate whether the M−1 center RUs are allocated.

Optionally, the first indication information is a bitmap and includes M−1 bits, and the M−1 bits are in a one-to-one correspondence with the M−1 center RUs.

Optionally, the resource indication information includes M resource allocation fields, the M resource allocation fields are in a one-to-one correspondence with the M basic bandwidths, each resource allocation field includes one index number, and the index number is used to indicate a size of an RU obtained by dividing the basic bandwidth corresponding to the resource allocation field and a location of the RU in frequency domain.

Optionally, only M−1 resource allocation fields in the M resource allocation fields further include second indication information used to indicate whether the M−1 center RUs are allocated, and each piece of second indication information corresponds to one of the M−1 center RUs.

Optionally, a remaining resource allocation field further includes second indication information, and the second indication information is a reserved value or a null value.

Optionally, the second indication includes one bit.

Optionally, one basic bandwidth includes four subcarrier unit sets in ascending order of frequencies. One subcarrier unit set constitutes one first RU, two subcarrier unit sets with consecutive frequencies constitute one second RU, three subcarrier unit sets with consecutive frequencies constitute one third RU, and four subcarrier unit sets with consecutive frequencies constitute one fourth RU.

When a value of the index number is a first value, it indicates that resource units RUs, in ascending order of frequencies, obtained by dividing the corresponding basic bandwidth include four first RUs.

Alternatively, when a value of the index number is a second value, it indicates that resource units RUs, in ascending order of frequencies, obtained by dividing the corresponding basic bandwidth include one second RU, one first RU, and one first RU.

Alternatively, when a value of the index number is a third value, it indicates that resource units RUs, in ascending order of frequencies, obtained by dividing the corresponding basic bandwidth include one first RU, one second RU, and one first RU.

Alternatively, when a value of the index number is a fourth value, it indicates that resource units RUs, in ascending order of frequencies, obtained by dividing the corresponding basic bandwidth include one first RU, one first RU, and one second RU.

Alternatively, when a value of the index number is a fifth value, it indicates that resource units RUs, in ascending order of frequencies, obtained by dividing the corresponding basic bandwidth include two second RUs.

Alternatively, when a value of the index number is a sixth value, it indicates that resource units RUs, in ascending order of frequencies, obtained by dividing the corresponding basic bandwidth include one third RU and one first RU.

Alternatively, when a value of the index number is a seventh value, it indicates that resource units RUs, in ascending order of frequencies, obtained by dividing the corresponding basic bandwidth include one first RU and one third RU.

Alternatively, when a value of the index number is an eighth value, it indicates that resource units RUs, in ascending order of frequencies, obtained by dividing the corresponding basic bandwidth include one fourth RU.

Optionally, the index number includes at least three bits.

It should be understood that the apparatus 3200 has any function of the access point in the method embodiment in FIG. 18. Details are not described herein again.

It should be understood that the term "unit" in this embodiment of this application may be an application-specific integrated circuit (application-specific integrated circuit, ASIC), an electronic circuit, a processor (for example, a shared processor, a dedicated processor, or a group processor) configured to execute one or more software or firmware programs, a memory, a merge logic circuit, and/or another suitable component that supports the described function.

In an optional example, the apparatus 3200 provided in this application corresponds to the process performed by the access point in the method embodiment in FIG. 18. For functions of the units/modules in the apparatus, refer to the foregoing descriptions. Details are not described herein again.

It should be understood that the apparatus in FIG. 32 may be an access point, or may be a chip or an integrated circuit installed in an access point.

In another implementation, the communications apparatus 3300 shown in FIG. 33 can implement the processes related to the access point in the method embodiment in FIG. 18. The operations and/or the functions of the modules in the communications apparatus 3300 are intended to implement corresponding procedures in the foregoing method embodiment. For details, refer to the descriptions in the foregoing method embodiments. To avoid repetition, detailed descriptions are properly omitted herein.

In another implementation, the communications apparatus 3400 can perform the actions performed by the station in the method embodiment in FIG. 18. Specifically, the transceiver unit is configured to receive resource indication information, where the resource indication information is used to indicate a size of at least one resource unit RU obtained by dividing a channel bandwidth and a location of the at least one resource unit RU in frequency domain; and the channel bandwidth includes M basic bandwidths, each of the M basic bandwidths is 2.16 GHz, and M is an integer greater than or equal to 1.

The processing unit is configured to determine, based on the resource indication information, a resource unit allocated by a transmit end.

In this embodiment of this application, the channel bandwidth is divided into one or more RUs, so that the transmit end can indicate, by using the resource indication information, to allocate different RUs to different receive ends, and the receive end can determine the resource unit allocated by the transmit end, and receive data on a corresponding resource unit. In this embodiment of this application, resources of a plurality of stations can be simultaneously indicated, thereby improving resource indication efficiency.

Optionally, one RU includes N subcarrier unit sets, where N is an integer greater than or equal to 1.

The subcarrier unit set includes 84 subcarriers, each subcarrier unit set includes 80 data subcarriers and four pilot subcarriers, and any two adjacent pilot subcarriers in the four pilot subcarriers are spaced by 20 data subcarriers from each other.

Alternatively, the subcarrier unit set includes 80 subcarriers, each subcarrier unit set includes 76 data subcarriers and four pilot subcarriers, and any two adjacent pilot subcarriers in the four pilot subcarriers are spaced by 19 data subcarriers from each other.

Optionally, the at least one RU includes M−1 center RUs, and each center RU is not an RU located at either end of the at least one RU.

Optionally, the resource indication information includes M resource allocation fields, the M resource allocation fields are the same, and each resource allocation field includes M index numbers. The M index numbers are in a one-to-one correspondence with the M basic bandwidths, and one index number is used to indicate a size of an RU obtained by dividing one corresponding basic bandwidth and a location of the RU in frequency domain.

Optionally, each resource allocation field further includes first indication information used to indicate whether the M−1 center RUs are allocated.

Optionally, the first indication information is a bitmap and includes M−1 bits, and the M−1 bits are in a one-to-one correspondence with the M−1 center RUs.

Optionally, the resource indication information includes M resource allocation fields, the M resource allocation fields are in a one-to-one correspondence with the M basic bandwidths, each resource allocation field includes one index number, and the index number is used to indicate a size of an RU obtained by dividing the basic bandwidth corresponding to the resource allocation field and a location of the RU in frequency domain.

Optionally, only M−1 resource allocation fields in the M resource allocation fields further include second indication information used to indicate whether the M−1 center RUs are allocated, and each piece of second indication information corresponds to one of the M−1 center RUs.

Optionally, a remaining resource allocation field further includes second indication information, and the second indication information is a reserved value or a null value.

Optionally, the second indication includes one bit.

Optionally, one basic bandwidth includes four subcarrier unit sets in ascending order of frequencies. One subcarrier unit set constitutes one first RU, two subcarrier unit sets with consecutive frequencies constitute one second RU, three subcarrier unit sets with consecutive frequencies constitute one third RU, and four subcarrier unit sets with consecutive frequencies constitute one fourth RU.

When a value of the index number is a first value, it indicates that resource units RUs, in ascending order of frequencies, obtained by dividing the corresponding basic bandwidth include four first RUs.

Alternatively, when a value of the index number is a second value, it indicates that resource units RUs, in ascending order of frequencies, obtained by dividing the corresponding basic bandwidth include one second RU, one first RU, and one first RU.

Alternatively, when a value of the index number is a third value, it indicates that resource units RUs, in ascending order of frequencies, obtained by dividing the corresponding basic bandwidth include one first RU, one second RU, and one first RU.

Alternatively, when a value of the index number is a fourth value, it indicates that resource units RUs, in ascending order of frequencies, obtained by dividing the corresponding basic bandwidth include one first RU, one first RU, and one second RU.

Alternatively, when a value of the index number is a fifth value, it indicates that resource units RUs, in ascending order of frequencies, obtained by dividing the corresponding basic bandwidth include two second RUs.

Alternatively, when a value of the index number is a sixth value, it indicates that resource units RUs, in ascending order of frequencies, obtained by dividing the corresponding basic bandwidth include one third RU and one first RU.

Alternatively, when a value of the index number is a seventh value, it indicates that resource units RUs, in ascending order of frequencies, obtained by dividing the corresponding basic bandwidth include one first RU and one third RU.

Alternatively, when a value of the index number is an eighth value, it indicates that resource units RUs, in ascending order of frequencies, obtained by dividing the corresponding basic bandwidth include one fourth RU.

Optionally, the index number includes at least three bits.

It should be understood that the apparatus 3400 has any function of the station in the method embodiment. Details are not described herein again.

It should be understood that the apparatus in FIG. 34 may be a station, or may be a chip or an integrated circuit installed in a station.

In another possible implementation, the apparatus 3500 on a station side shown in FIG. 35 can implement the processes related to the station in the method embodiment in FIG. 18. The operations and/or the functions of the modules in the apparatus 3500 on a station side are intended to implement corresponding procedures in the foregoing method embodiment. For details, refer to the descriptions in the foregoing method embodiments. To avoid repetition, detailed descriptions are properly omitted herein.

In another implementation, the communications apparatus 3200 can perform the actions performed by the access point in the method embodiment in FIG. 31.

Specifically, the processing unit is configured to generate resource scheduling information, where the resource scheduling information includes at least one resource unit allocation field and at least one station identifier field; one station identifier field is used to indicate one station, and one resource unit allocation field is used to indicate a resource unit RU allocated to the one station; and the RU is included in M basic bandwidths, the basic bandwidth is 2.16 GHz, and M is a positive integer.

The transceiver unit is configured to send the resource scheduling information.

In this embodiment of this application, based on RU allocation of a common field and a user field in a trigger frame and a user physical layer parameter design, flexible uplink scheduling can be implemented, and technical complexity of synchronization can be reduced.

Optionally, the RU includes N subcarrier unit sets, where N is a positive integer.

The subcarrier unit set includes 84 subcarriers, each subcarrier unit set includes 80 data subcarriers and four pilot subcarriers, and any two adjacent pilot subcarriers in the four pilot subcarriers are spaced by 20 data subcarriers from each other.

Alternatively, the subcarrier unit set includes 80 subcarriers, each subcarrier unit set includes 76 data subcarriers and four pilot subcarriers, and any two adjacent pilot subcarriers in the four pilot subcarriers are spaced by 19 data subcarriers from each other.

Optionally, the resource unit allocation field includes a first part of bits and a second part of bits, and the first part of bits and the second part of bits are jointly used to indicate a size of the RU and a location of the RU in the M basic bandwidths.

Optionally, when the first part of bits is a first value, it indicates that the RU is located in the $1^{st}$ basic bandwidth in the M basic bandwidths.

When the first part of bits is a second value, it indicates that the RU is located in the $2^{nd}$ basic bandwidth in the M basic bandwidths.

When the first part of bits is a third value, it indicates that the RU is located in the $3^{rd}$ basic bandwidth in the M basic bandwidths.

When the first part of bits is a fourth value, it indicates that the RU is located in the $4^{th}$ basic bandwidth in the M basic bandwidths.

When the first part of bits is a fifth value, it indicates that the RU is a center RU between the 1St basic bandwidth and the $2^{nd}$ basic bandwidth in the M basic bandwidths.

When the first part of bits is a sixth value, it indicates that the RU is a center RU between the $2^{nd}$ basic bandwidth and the $3^{rd}$ basic bandwidth in the M basic bandwidths.

When the first part of bits is a seventh value, it indicates that the RU is a center RU between the $3^{rd}$ basic bandwidth and the $4^{th}$ basic bandwidth in the M basic bandwidths.

Optionally, the first part of bits includes at least three bits.

Optionally, one basic bandwidth includes four subcarrier unit sets, and the four subcarrier unit sets in ascending order of frequencies are a first subcarrier unit set, a second subcarrier unit set, a third subcarrier unit set, and a fourth subcarrier unit set.

In a case in which a value of the first part of bits is a first value to a fourth value,
when the second part of bits is an eighth value, it indicates that the RU is the first subcarrier unit set;
when the second part of bits is a ninth value, it indicates that the RU is the second subcarrier unit set;
when the second part of bits is a tenth value, it indicates that the RU is the third subcarrier unit set;
when the second part of bits is an eleventh value, it indicates that the RU is the fourth subcarrier unit set;
when the second part of bits is a twelfth value, it indicates that the RU is an RU including the first subcarrier unit set and the second subcarrier unit set;
when the second part of bits is a thirteenth value, it indicates that the RU is an RU including the second subcarrier unit set and the third subcarrier unit set;
when the second part of bits is a fourteenth value, it indicates that the RU is an RU including the third subcarrier unit set and the fourth subcarrier unit set;
when the second part of bits is a fifteenth value, it indicates that the RU is an RU including the first subcarrier unit set, the second subcarrier unit set, and the third subcarrier unit set;
when the second part of bits is a sixteenth value, it indicates that the RU is an RU including the second subcarrier unit set, the third subcarrier unit set, and the fourth subcarrier unit set; or
when the second part of bits is a seventeenth value, it indicates that the RU is an RU including the first subcarrier unit set, the second subcarrier unit set, the third subcarrier unit set, and the fourth subcarrier unit set.

Optionally, the second part of bits includes at least four bits.

Optionally, one basic bandwidth includes four subcarrier unit sets, and the four subcarrier unit sets in ascending order of frequencies are a first subcarrier unit set, a second subcarrier unit set, a third subcarrier unit set, and a fourth subcarrier unit set.

In a case in which a value of the first part of bits is a first value to a fourth value,
when the second part of bits is an eighth value, it indicates that the RU is the first subcarrier unit set;
when the second part of bits is a ninth value, it indicates that the RU is the second subcarrier unit set;
when the second part of bits is a tenth value, it indicates that the RU is the third subcarrier unit set;
when the second part of bits is an eleventh value, it indicates that the RU is the fourth subcarrier unit set;
when the second part of bits is a twelfth value, it indicates that the RU is an RU including the first subcarrier unit set and the second subcarrier unit set;
when the second part of bits is a thirteenth value, it indicates that the RU is an RU including the second subcarrier unit set and the third subcarrier unit set;

when the second part of bits is a fourteenth value, it indicates that the RU is an RU including the third subcarrier unit set and the fourth subcarrier unit set; or when the second part of bits is a fifteenth value, it indicates that the RU is an RU including the first subcarrier unit set, the second subcarrier unit set, the third subcarrier unit set, and the fourth subcarrier unit set.

Optionally, the second part of bits includes at least three bits.

It should be understood that the apparatus 3200 has any function of the access point in the method embodiment in FIG. 31. Details are not described herein again.

It should be understood that the term "unit" in this embodiment of this application may be an application-specific integrated circuit (application-specific integrated circuit, ASIC), an electronic circuit, a processor (for example, a shared processor, a dedicated processor, or a group processor) configured to execute one or more software or firmware programs, a memory, a merge logic circuit, and/or another suitable component that supports the described function.

In an optional example, a person skilled in the art may understand that the apparatus 3200 provided in this application corresponds to the process performed by the access point in the method embodiment in FIG. 31. For functions of the units/modules in the apparatus, refer to the foregoing descriptions. Details are not described herein again.

It should be understood that the apparatus in FIG. 32 may be an access point, or may be a chip or an integrated circuit installed in an access point.

An access point is used as an example. FIG. 33 is a schematic structural diagram of an access point according to an embodiment of this application. As shown in FIG. 33, the communications apparatus 3300 may be applied to the system shown in FIG. 1, to perform any function of the access point in the method embodiment in FIG. 31.

In still another implementation, the communications apparatus 3300 shown in FIG. 33 can implement the processes related to the access point in the method embodiment in FIG. 31. The operations and/or the functions of the modules in the communications apparatus 3300 are intended to implement corresponding procedures in the foregoing method embodiment. For details, refer to the descriptions in the foregoing method embodiments. To avoid repetition, detailed descriptions are properly omitted herein.

In another implementation, the communications apparatus 3400 can perform the actions performed by the station in the method embodiment in FIG. 31.

Specifically, the transceiver unit is configured to receive resource scheduling information, where the resource scheduling information includes at least one resource unit allocation field and at least one station identifier field; one station identifier field is used to indicate an identifier of one scheduled station, and one resource unit allocation field is used to indicate a resource unit RU allocated to the station; and the RU is included in M basic bandwidths, the basic bandwidth is 2.16 GHz, and M is a positive integer.

The processing unit determines, based on the resource scheduling information, the resource unit allocated to the station.

Therefore, in this embodiment of this application, based on RU allocation of a common field and a user field in a trigger frame and a user physical layer parameter design, flexible uplink scheduling can be implemented, and technical complexity of synchronization can be reduced.

Optionally, the RU includes N subcarrier unit sets, where N is a positive integer.

The subcarrier unit set includes 84 subcarriers, each subcarrier unit set includes 80 data subcarriers and four pilot subcarriers, and any two adjacent pilot subcarriers in the four pilot subcarriers are spaced by 20 data subcarriers from each other.

Alternatively, the subcarrier unit set includes 80 subcarriers, each subcarrier unit set includes 76 data subcarriers and four pilot subcarriers, and any two adjacent pilot subcarriers in the four pilot subcarriers are spaced by 19 data subcarriers from each other.

Optionally, the resource unit allocation field includes a first part of bits and a second part of bits, and the first part of bits and the second part of bits are jointly used to indicate a size of the RU and a location of the RU in the M basic bandwidths.

Optionally, when the first part of bits is a first value, it indicates that the RU is located in the $1^{st}$ basic bandwidth in the M basic bandwidths.

When the first part of bits is a second value, it indicates that the RU is located in the $2^{nd}$ basic bandwidth in the M basic bandwidths.

When the first part of bits is a third value, it indicates that the RU is located in the $3^{rd}$ basic bandwidth in the M basic bandwidths.

When the first part of bits is a fourth value, it indicates that the RU is located in the $4^{th}$ basic bandwidth in the M basic bandwidths.

When the first part of bits is a fifth value, it indicates that the RU is a center RU between the $1^{st}$ basic bandwidth and the $2^{nd}$ basic bandwidth in the M basic bandwidths.

When the first part of bits is a sixth value, it indicates that the RU is a center RU between the $2^{nd}$ basic bandwidth and the $3^{rd}$ basic bandwidth in the M basic bandwidths.

When the first part of bits is a seventh value, it indicates that the RU is a center RU between the $3^{rd}$ basic bandwidth and the $4^{th}$ basic bandwidth in the M basic bandwidths.

Optionally, the first part of bits includes at least three bits.

Optionally, one basic bandwidth includes four subcarrier unit sets, and the four subcarrier unit sets in ascending order of frequencies are a first subcarrier unit set, a second subcarrier unit set, a third subcarrier unit set, and a fourth subcarrier unit set.

In a case in which a value of the first part of bits is a first value to a fourth value, when the second part of bits is an eighth value, it indicates that the RU is the first subcarrier unit set;

when the second part of bits is a ninth value, it indicates that the RU is the second subcarrier unit set;

when the second part of bits is a tenth value, it indicates that the RU is the third subcarrier unit set;

when the second part of bits is an eleventh value, it indicates that the RU is the fourth subcarrier unit set;

when the second part of bits is a twelfth value, it indicates that the RU is an RU including the first subcarrier unit set and the second subcarrier unit set;

when the second part of bits is a thirteenth value, it indicates that the RU is an RU including the second subcarrier unit set and the third subcarrier unit set;

when the second part of bits is a fourteenth value, it indicates that the RU is an RU including the third subcarrier unit set and the fourth subcarrier unit set;

when the second part of bits is a fifteenth value, it indicates that the RU is an RU including the first subcarrier unit set, the second subcarrier unit set, and the third subcarrier unit set;

when the second part of bits is a sixteenth value, it indicates that the RU is an RU including the second subcarrier unit set, the third subcarrier unit set, and the fourth subcarrier unit set; or when the second part of bits is a seventeenth value, it indicates that the RU is an RU including the first subcarrier unit set, the second subcarrier unit set, the third subcarrier unit set, and the fourth subcarrier unit set.

Optionally, the second part of bits includes at least four bits.

Optionally, one basic bandwidth includes four subcarrier unit sets, and the four subcarrier unit sets in ascending order of frequencies are a first subcarrier unit set, a second subcarrier unit set, a third subcarrier unit set, and a fourth subcarrier unit set.

In a case in which a value of the first part of bits is a first value to a fourth value, when the second part of bits is an eighth value, it indicates that the RU is the first subcarrier unit set;

when the second part of bits is a ninth value, it indicates that the RU is the second subcarrier unit set;

when the second part of bits is a tenth value, it indicates that the RU is the third subcarrier unit set;

when the second part of bits is an eleventh value, it indicates that the RU is the fourth subcarrier unit set;

when the second part of bits is a twelfth value, it indicates that the RU is an RU including the first subcarrier unit set and the second subcarrier unit set;

when the second part of bits is a thirteenth value, it indicates that the RU is an RU including the second subcarrier unit set and the third subcarrier unit set;

when the second part of bits is a fourteenth value, it indicates that the RU is an RU including the third subcarrier unit set and the fourth subcarrier unit set; or when the second part of bits is a fifteenth value, it indicates that the RU is an RU including the first subcarrier unit set, the second subcarrier unit set, the third subcarrier unit set, and the fourth subcarrier unit set.

Optionally, the second part of bits includes at least three bits.

It should be understood that the apparatus 3400 has any function of the station in the method embodiment. Details are not described herein again.

It should be understood that the apparatus in FIG. 34 may be a station, or may be a chip or an integrated circuit installed in a station.

In still another implementation, the apparatus 3500 on a station side shown in FIG. 35 can implement the processes related to the station in the method embodiment in FIG. 31. The operations and/or the functions of the modules in the apparatus 3500 on a station side are intended to implement corresponding procedures in the foregoing method embodiment. For details, refer to the descriptions in the foregoing method embodiments. To avoid repetition, detailed descriptions are properly omitted herein.

An embodiment of this application further provides a processing apparatus, including a processor and an interface. The processor is configured to perform data transmission method in any one of the foregoing method embodiments.

It should be understood that the processing apparatus may be a chip. For example, the processing apparatus may be a field programmable gate array (FPGA), an application-specific integrated chip (ASIC), a system on a chip (SoC), a central processing unit (CPU), a network processor (NP), a digital signal processor (DSP), a micro controller unit (MCU), a programmable logic device (PLD), or another integrated chip.

In an implementation process, the steps in the foregoing methods may be completed by using a hardware integrated logic circuit in the processor or an instruction in a form of software. The steps in the methods disclosed with reference to the embodiments of this application may be directly performed and completed by a hardware processor, or may be performed and completed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing methods in combination with hardware of the processor. To avoid repetition, details are not described herein again.

It should be noted that the processor in the embodiments of this application may be an integrated circuit chip, and has a signal processing capability. In an implementation process, the steps in the foregoing method embodiments may be completed by using a hardware integrated logic circuit in the processor or an instruction in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps in the methods disclosed with reference to the embodiments of this application may be directly performed and completed by using a hardware decoding processor, or may be performed and completed by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing methods in combination with hardware of the processor.

It may be understood that the memory in the embodiments of this application may be a volatile memory or a nonvolatile memory, or may include both a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example descriptions rather than limitative descriptions, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the methods described in this specification aims to include but is not limited to these memories and any memory of another proper type.

An embodiment of this application further provides a communications system, including the foregoing access point and station.

An embodiment of this application further provides a computer readable medium. The computer readable medium stores a computer program, and when the computer program is executed by a computer, the method in any one of the foregoing method embodiments is implemented.

An embodiment of this application further provides a computer program product. When the computer program product is executed by a computer, the method in any one of the foregoing method embodiments is implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

It should be understood that the foregoing describes the data transmission method used during downlink transmission in a communications system. However, this application is not limited thereto. Optionally, a solution similar to the foregoing solution may also be used during uplink transmission. To avoid repetition, details are not described herein again.

The network device and the terminal device in the foregoing apparatus embodiments completely correspond to the network device and the terminal device in the method embodiments. A corresponding module or unit performs a corresponding step. For example, the sending module (transmitter) performs the sending step in the method embodiments, the receiving module (receiver) performs the receiving step in the method embodiments, and the processing module (processor) may perform a step other than the sending step and the receiving step. For a function of a specific module, refer to the corresponding method embodiments. The sending module and the receiving module may form a transceiver module, and the transmitter and the receiver may form a transceiver, to jointly implement transceiver functions. There may be one or more processors.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" usually indicates an "or" relationship between the associated objects. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiments are included in at least one embodiment of this application. Therefore, "in one embodiment" or "in an embodiment" that appears throughout the entire specification does not necessarily mean a same embodiment. In addition, these particular features, structures, or characteristics may be combined in one or more embodiments in any proper manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside in a process and/or an execution thread, and a component may be located on one computer and/or distributed between two or more computers. In addition, these components may be executed by various computer readable media that store various data structures. For example, the components may communicate by using a local and/or remote process based on a signal having one or more data packets (for example, data from two components interacting with another component in a local system, a distributed system, and/or across a network such as the internet interacting with another system by using the signal).

It should be further understood that the first, second, third, fourth, and various numbers included in this specification are merely distinguished for convenient description, and are not intended to limit the scope of the embodiments of this application.

It should be understood that the term "and/or" in this specification describes only an association relationship for describing associated objects and may indicate three relationships. For example, A and/or B may indicate the following three cases: Only A exists, both A and B exist, and only B exists.

A person of ordinary skill in the art may be aware that illustrative logical blocks and steps described with reference to the embodiments disclosed in this specification, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, and may be located at one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, applied to a 60 gigahertz (GHz) communications system, and comprising:
generating, by an access point, a physical protocol data unit (PPDU), wherein a data part of the PPDU is carried on at least one resource unit (RU); and
sending, by the access point, the PPDU to at least one station through a channel, wherein a bandwidth of the channel comprises M basic bandwidths, the basic bandwidth is 2.16 GHz, M is an integer greater than or equal to 1, and the M basic bandwidths are divided into the at least one RU,
wherein the PPDU comprises M resource allocation fields, the M resource allocation fields comprises M index numbers, the M index numbers are in a one-to-one correspondence with the M basic bandwidths, and each index number is used to indicate a size of an RU obtained by dividing the basic bandwidth corresponding to the index number and a location of the RU in a frequency domain.

2. The method according to claim 1, wherein one basic bandwidth comprises four subcarrier unit sets in ascending order of frequencies, wherein:
each subcarrier unit set comprises: 84 subcarriers, 80 data subcarriers, and four pilot subcarriers, and any two adjacent pilot subcarriers in the four pilot subcarriers are spaced by 20 data subcarriers from each other; or
each subcarrier unit set comprises: 80 subcarriers, 76 data subcarriers, and four pilot subcarriers, and any two adjacent pilot subcarriers in the four pilot subcarriers are spaced by 19 data subcarriers from each other.

3. The method according to claim 2, wherein one subcarrier unit set constitutes one first RU, two subcarrier unit sets with consecutive frequencies constitute one second RU, three subcarrier unit sets with consecutive frequencies constitute one third RU, and four subcarrier unit sets with consecutive frequencies constitute one fourth RU.

4. The method according to claim 3, wherein when the bandwidth of the channel comprises M=1 basic bandwidth, and is 2.16 GHz, the at least one RU obtained by dividing the one basic bandwidth comprises a first part of RUs,
wherein the first part of RUs in ascending order of frequencies is:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

5. The method according to claim 3, wherein when the bandwidth of the channel comprises M=2 basic bandwidths, which comprise a first basic bandwidth and a second basic bandwidth, and is 4.32 GHz, the at least one RU obtained by dividing the two basic bandwidths comprises a first part of RUs, a second part of RUs, and one center RU,
wherein a frequency of the first part of RUs is lower than that of the center RU, and corresponds to the first basic bandwidth; and
wherein a frequency of the second part of RUs is higher than that of the center RU, and corresponds to the second basic bandwidth;
wherein the first part of RUs and the second part of RUs in ascending order of frequencies each comprise:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU; and
wherein a number of subcarriers on the center RU is the same as a number of subcarriers in one subcarrier unit set, the first half of subcarriers on the center RU is located on a left side of a direct current subcarrier and comprises two pilot subcarriers, and the second half of subcarriers on the center RU is located on a right side of the direct current subcarrier and comprises two pilot subcarriers.

6. The method according to claim 3, wherein when the bandwidth of the channel comprises M=3 basic bandwidths, which are a first basic bandwidth, a second basic bandwidth, and a third basic bandwidth, and is 6.48 GHz, the at least one RU comprises a first part of RUs, a second part of RUs, a third part of RUs, a first center RU, and a second center RU,
wherein a frequency of the first part of RUs is lower than that of the first center RU, and corresponds to the first basic bandwidth;
wherein a frequency of the second part of RUs is higher than that of the first center RU, and the frequency of the second part of RUs is lower than that of the second center RU and corresponds to the second basic bandwidth;
wherein a frequency of the third part of RUs is higher than that of the second center RU, and corresponds to the third basic bandwidth;
wherein the first part of RUs, the second part of RUs, and the third part of RUs in ascending order of frequencies each comprise:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU; and
wherein the first center RU is one subcarrier unit set, and the second center RU is another subcarrier unit set.

7. The method according to claim 3, wherein when the bandwidth of the channel comprises M=4 basic bandwidths, which are a first basic bandwidth, a second basic bandwidth, a third basic bandwidth, and a fourth basic bandwidth, and is 8.64 GHz, the at least one RU comprises a first part of RUs, a second part of RUs, a third part of RUs, a fourth part of RUs, a first center RU, a second center RU, and a third center RU,
wherein a frequency of the first part of RUs is lower than that of the first center RU, and corresponds to the first basic bandwidth;
wherein a frequency of the second part of RUs is higher than that of the first center RU, and the frequency of the second part of RUs is lower than that of the second center RU and corresponds to the second basic bandwidth;
wherein a frequency of the third part of RUs is higher than that of the second center RU, and the frequency of the third part of RUs is lower than that of the third center RU and corresponds to the third basic bandwidth;
wherein a frequency of the fourth part of RUs is higher than that of the third center RU, and corresponds to the fourth basic bandwidth;
wherein the first part of RUs, the second part of RUs, the third part of RUs, and the fourth part of RUs in ascending order of frequencies each comprise:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU;
wherein the first center RU is one subcarrier unit set, and the third center RU is another subcarrier unit set; and
wherein a number of subcarriers on the second center RU is the same as a number of subcarriers in one subcarrier unit set, the first half of subcarriers on the second center RU is located on a left side of a direct current subcarrier and comprises two pilot subcarriers, and the second half of subcarriers on the second center RU is located on a right side of the direct current subcarrier and comprises two pilot subcarriers.

8. The method according to claim 1, wherein the at least one RU comprises M−1 center RUs, and each center RU is not an RU located at either end of the at least one RU.

9. The method according to claim 8, wherein the M resource allocation fields are the same and each of the M resource allocation fields comprises the M index numbers.

10. The method according to claim 9, wherein each resource allocation field further comprises first indication information used to indicate whether the M−1 center RUs are allocated.

11. The method according to claim 10, wherein the first indication information is a bitmap and comprises M−1 bits, and the M−1 bits are in a one-to-one correspondence with the M−1 center RUs.

12. The method according to claim 8, wherein the M resource allocation fields are in a one-to-one correspondence with the M basic bandwidths, each resource allocation field of the M resource allocation fields comprises one index number of the M index numbers, and the index number is used to indicate a size of an RU obtained by dividing the basic bandwidth corresponding to the respective resource allocation field and a location of the RU in a frequency domain.

13. The method according to claim 12, wherein only M−1 resource allocation fields in the M resource allocation fields further comprise second indication information used to indicate whether the M−1 center RUs are allocated, and each piece of second indication information corresponds to one of the M−1 center RUs.

14. The method according to claim 13, wherein a remaining resource allocation field further comprises second indication information, and the second indication information is a reserved value or a null value.

15. The method according to claim 13, wherein the second indication information comprises one bit.

16. The method according to claim 9, wherein:
when a value of the index number is a first value, it indicates that RUs, in ascending order of frequencies, obtained by dividing the corresponding basic bandwidth comprise four first RUs; or
when a value of the index number is a second value, it indicates that RUs, in ascending order of frequencies, obtained by dividing the corresponding basic bandwidth comprise one second RU, one first RU, and one first RU; or
when a value of the index number is a third value, it indicates that RUs, in ascending order of frequencies, obtained by dividing the corresponding basic bandwidth comprise one first RU, one second RU, and one first RU; or
when a value of the index number is a fourth value, it indicates that RUs, in ascending order of frequencies, obtained by dividing the corresponding basic bandwidth comprise one first RU, one first RU, and one second RU; or
when a value of the index number is a fifth value, it indicates that RUs, in ascending order of frequencies, obtained by dividing the corresponding basic bandwidth comprise two second RUs; or
when a value of the index number is a sixth value, it indicates that RUs, in ascending order of frequencies, obtained by dividing the corresponding basic bandwidth comprise one third RU and one first RU; or
when a value of the index number is a seventh value, it indicates that RUs, in ascending order of frequencies, obtained by dividing the corresponding basic bandwidth comprise one first RU and one third RU; or
when a value of the index number is an eighth value, it indicates that RUs, in ascending order of frequencies, obtained by dividing the corresponding basic bandwidth comprise one fourth RU.

17. The method according to claim 16, wherein the index number comprises at least three bits.

18. The method according to claim 9, wherein the resource allocation field is carried in a header B field.

19. A data transmission method, applied to a 60 gigahertz (GHz) communications system, and comprising:
receiving, by a station, a physical protocol data unit (PPDU) through a channel, wherein a data part of the PPDU is carried on at least one resource unit (RU), a bandwidth of the channel comprises M basic bandwidths, the basic bandwidth is 2.16 GHz, M is an integer greater than or equal to 1, and the M basic bandwidths are divided into the at least one RU; and
parsing, by the station, the data part that is of the PPDU and that is carried on the at least one RU,
wherein the PPDU comprises M resource allocation fields, the M resource allocation fields comprises M index numbers, the M index numbers are in a one-to-one correspondence with the M basic bandwidths, and each index number is used to indicate a size of an RU obtained by dividing the basic bandwidth corresponding to the index number and a location of the RU in a frequency domain.

20. The method according to claim 19, wherein one basic bandwidth comprises four subcarrier unit sets in ascending order of frequencies, wherein:
each subcarrier unit set comprises 84 subcarriers, 80 data subcarriers, and four pilot subcarriers, and any two adjacent pilot subcarriers in the four pilot subcarriers are spaced by 20 data subcarriers from each other; or
each subcarrier unit set comprises 80 subcarriers, 76 data subcarriers, and four pilot subcarriers, and any two adjacent pilot subcarriers in the four pilot subcarriers are spaced by 19 data subcarriers from each other.

21. The method according to claim 20, wherein one subcarrier unit set constitutes one first RU, two subcarrier unit sets with consecutive frequencies constitute one second RU, three subcarrier unit sets with consecutive frequencies constitute one third RU, and four subcarrier unit sets with consecutive frequencies constitute one fourth RU.

22. The method according to claim 21, wherein when the bandwidth of the channel comprises M=1 basic bandwidth, and is 2.16 GHz, the at least one RU obtained by dividing the one basic bandwidth comprises a first part of RUs, and
wherein the first part of RUs in ascending order of frequencies is:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU.

23. The method according to claim 21, wherein when the bandwidth of the channel comprises M=2 basic bandwidths, which comprise a first basic bandwidth and a second basic bandwidth, and is 4.32 GHz, the at least one RU obtained by dividing the two basic bandwidths comprises a first part of RUs, a second part of RUs, and one center RU,
wherein a frequency of the first part of RUs is lower than that of the center RU, and corresponds to the first basic bandwidth;
wherein a frequency of the second part of RUs is higher than that of the center RU, and corresponds to the second basic bandwidth;
wherein the first part of RUs and the second part of RUs in ascending order of frequencies each comprise:
four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU; and
wherein a number of subcarriers on the center RU is the same as a number of subcarriers in one subcarrier unit set, the first half of subcarriers on the center RU is located on a left side of a direct current subcarrier and comprises two pilot subcarriers, and the second half of subcarriers on the center RU is located on a right side of the direct current subcarrier and comprises two pilot subcarriers.

24. The method according to claim 21, wherein when the bandwidth of the channel comprises M=3 basic bandwidths, which are a first basic bandwidth, a second basic bandwidth, and a third basic bandwidth, and is 6.48 GHz, the at least one RU comprises a first part of RUs, a second part of RUs, a third part of RUs, a first center RU, and a second center RU,
wherein a frequency of the first part of RUs is lower than that of the first center RU, and corresponds to the first basic bandwidth;
wherein a frequency of the second part of RUs is higher than that of the first center RU, and the frequency of the second part of RUs is lower than that of the second center RU and corresponds to the second basic bandwidth;

wherein a frequency of the third part of RUs is higher than that of the second center RU, and corresponds to the third basic bandwidth;

wherein the first part of RUs, the second part of RUs, and the third part of RUs in ascending order of frequencies each comprise:

four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU; and wherein the first center RU is one subcarrier unit set, and the second center RU is another subcarrier unit set.

25. The method according to claim 21, wherein when the bandwidth of the channel comprises M=4 basic bandwidths, which are a first basic bandwidth, a second basic bandwidth, a third basic bandwidth, and a fourth basic bandwidth, and is 8.64 GHz, the at least one RU comprises a first part of RUs, a second part of RUs, a third part of RUs, a fourth part of RUs, a first center RU, a second center RU, and a third center RU, wherein a frequency of the first part of RUs is lower than that of the first center RU, and corresponds to the first basic bandwidth;

wherein a frequency of the second part of RUs is higher than that of the first center RU, and the frequency of the second part of RUs is lower than that of the second center RU and corresponds to the second basic bandwidth;

wherein a frequency of the third part of RUs is higher than that of the second center RU, and the frequency of the third part of RUs is lower than that of the third center RU and corresponds to the third basic bandwidth;

wherein a frequency of the fourth part of RUs is higher than that of the third center RU, and corresponds to the fourth basic bandwidth;

wherein the first part of RUs, the second part of RUs, the third part of RUs, and the fourth part of RUs in ascending order of frequencies each comprise:

four first RUs; or
one second RU, one first RU, and one first RU; or
one first RU, one second RU, and one first RU; or
one first RU, one first RU, and one second RU; or
one second RU and one second RU; or
one third RU and one first RU; or
one first RU and one third RU; or
one fourth RU;

wherein the first center RU is one subcarrier unit set;
wherein the third center RU is one subcarrier unit set; and
wherein a number of subcarriers on the second center RU is the same as a number of subcarriers in the one subcarrier unit set, the first half of subcarriers on the second center RU is located on a left side of a direct current subcarrier and comprises two pilot subcarriers, and the second half of subcarriers on the second center RU is located on a right side of the direct current subcarrier and comprises two pilot subcarriers.

26. The method according to claim 19, wherein the at least one RU comprises M−1 center RUs, and each center RU is not an RU located at either end of the at least one RU.

27. The method according to claim 26, wherein the M resource allocation fields are the same and each of the M resource allocation fields comprises the M index numbers.

28. The method according to claim 27, wherein each resource allocation field further comprises first indication information used to indicate whether the M−1 center RUs are allocated.

29. The method according to claim 28, wherein the first indication information is a bitmap and comprises M−1 bits, and the M−1 bits are in a one-to-one correspondence with the M−1 center RUs.

30. The method according to claim 26, wherein the M resource allocation fields are in a one-to-one correspondence with the M basic bandwidths, each of the M resource allocation fields comprises one index number of the M index numbers, and the index number is used to indicate a size of an RU obtained by dividing the basic bandwidth corresponding to the respective resource allocation field and a location of the RU in frequency domain.

31. The method according to claim 30, wherein only M−1 resource allocation fields in the M resource allocation fields further comprise second indication information used to indicate whether the M−1 center RUs are allocated, and each piece of second indication information corresponds to one of the M−1 center RUs.

32. The method according to claim 31, wherein a remaining resource allocation field further comprises second indication information, and the second indication information is a reserved value or a null value.

33. The method according to claim 31, wherein the second indication information comprises one bit.

34. The method according to claim 27, wherein:

when a value of the index number is a first value, it indicates that RUs, in ascending order of frequencies, obtained by dividing the corresponding basic bandwidth comprise four first RUs; or when a value of the index number is a second value, it indicates that RUs, in ascending order of frequencies, obtained by dividing the corresponding basic bandwidth comprise one second RU, one first RU, and one first RU; or when a value of the index number is a third value, it indicates that RUs, in ascending order of frequencies, obtained by dividing the corresponding basic bandwidth comprise one first RU, one second RU, and one first RU; or when a value of the index number is a fourth value, it indicates that RUs, in ascending order of frequencies, obtained by dividing the corresponding basic bandwidth comprise one first RU, one first RU, and one second RU; or when a value of the index number is a fifth value, it indicates that RUs, in ascending order of frequencies, obtained by dividing the corresponding basic bandwidth comprise two second RUs; or when a value of the index number is a sixth value, it indicates that RUs, in ascending order of frequencies, obtained by dividing the corresponding basic bandwidth comprise one third RU and one first RU; or when a value of the index number is a seventh value, it indicates that RUs, in ascending order of frequencies, obtained by dividing the corresponding basic bandwidth comprise one first RU and one third RU; or when a value of the index number is an eighth value, it indicates that RUs, in ascending order of frequencies, obtained by dividing the corresponding basic bandwidth comprise one fourth RU.

35. The method according to claim 34, wherein the index number comprises at least three bits.

36. The method according to claim 27, wherein the resource allocation field is carried in a header B field.

37. A communications apparatus, comprising a processor and a transceiver, wherein:
- the processor is configured to generate a physical protocol data unit (PPDU), wherein a data part of the PPDU is carried on at least one resource unit (RU); and
- the transceiver is configured to send the PPDU to at least one station through a channel, wherein a bandwidth of the channel comprises M basic bandwidths, the basic bandwidth is 2.16 GHz, M is an integer greater than or equal to 1, and the M basic bandwidths are divided into the at least one RU,
- wherein the PPDU comprises M resource allocation fields, the M resource allocation fields comprises M index numbers, the M index numbers are in a one-to-one correspondence with the M basic bandwidths, and each index number is used to indicate a size of an RU obtained by dividing the basic bandwidth corresponding to the index number and a location of the RU in a frequency domain.

38. A communications apparatus, comprising a processor and a transceiver, wherein:
- the transceiver is configured to receive a physical protocol data unit (PPDU) through a channel, wherein a data part of the PPDU is carried on at least one resource unit (RU), a bandwidth of the channel comprises M basic bandwidths, the basic bandwidth is 2.16 GHz, M is an integer greater than or equal to 1, and the M basic bandwidths are divided into the at least one RU; and
- the processor is configured to parse the data part that is of the PPDU and that is carried on the at least one RU,
- wherein the PPDU comprises M resource allocation fields, the M resource allocation fields comprises M index numbers, the M index numbers are in a one-to-one correspondence with the M basic bandwidths, and each index number is used to indicate a size of an RU obtained by dividing the basic bandwidth corresponding to the index number and a location of the RU in a frequency domain.

\* \* \* \* \*